(12) United States Patent
Komatsu et al.

(10) Patent No.: US 9,764,488 B2
(45) Date of Patent: Sep. 19, 2017

(54) DEVICE FOR FORMING SEPARATION STARTING POINT, STACK MANUFACTURING APPARATUS, AND METHOD FOR FORMING SEPARATION STARTING POINT

(71) Applicant: Semiconductor Energy Laboratory Co., Ltd., Atsugi-shi, Kanagawa-ken (JP)

(72) Inventors: Ryu Komatsu, Isehara (JP); Kohei Yokoyama, Fujisawa (JP); Masakatsu Ohno, Utsunomiya (JP); Satoru Idojiri, Tochigi (JP); Hisao Ikeda, Zama (JP); Yasuhiro Jinbo, Isehara (JP); Hiroki Adachi, Tochigi (JP); Yoshiharu Hirakata, Ebina (JP); Shingo Eguchi, Atsugi (JP); Daiki Nakamura, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 370 days.

(21) Appl. No.: 14/468,801

(22) Filed: Aug. 26, 2014

(65) Prior Publication Data
US 2015/0059986 A1 Mar. 5, 2015

(30) Foreign Application Priority Data

Aug. 30, 2013 (JP) ................................ 2013-179697
Mar. 6, 2014 (JP) ................................ 2014-043408

(51) Int. Cl.
*C03B 33/027* (2006.01)
*C03B 33/07* (2006.01)
(Continued)

(52) U.S. Cl.
CPC ............... *B26D 3/282* (2013.01); *B26D 3/08* (2013.01); *B26F 1/3826* (2013.01);
(Continued)

(58) Field of Classification Search
CPC ......... Y10T 156/1082; Y10T 156/1195; Y10T 156/1348; Y10T 156/1793;
(Continued)

(56) References Cited

U.S. PATENT DOCUMENTS 6,953,735 B2   10/2005   Yamazaki et al.
7,736,964 B2    6/2010   Yamamoto et al.
(Continued)

FOREIGN PATENT DOCUMENTS

JP   2010-153813   7/2010
JP   2012-190794  10/2012

*Primary Examiner* — Linda L Gray
(74) *Attorney, Agent, or Firm* — Robinson Intellectual Property Law Office; Eric J. Robinson

(57) ABSTRACT

A device for forming a separation starting point that allows separation of a surface layer of a processed member to form a remaining portion is provided. A manufacturing device of a stack including a support and a remaining portion of a processed member whose surface layer is separated is provided. The device for forming the separation starting point includes a stage that supports the processed member, a cutter that faces the stage, a head portion that supports the cutter, an arm portion that supports the head portion, and a moving mechanism that relatively moves the cutter to the stage.

6 Claims, 26 Drawing Sheets

(51) Int. Cl.
*B26D 3/08* (2006.01)
*G02F 1/13* (2006.01)
*B26D 3/28* (2006.01)
*B26F 1/38* (2006.01)
*C03B 33/037* (2006.01)

(52) U.S. Cl.
CPC ............ *C03B 33/027* (2013.01); *C03B 33/07* (2013.01); *C03B 33/037* (2013.01); *G02F 1/1303* (2013.01); *Y02P 40/57* (2015.11); *Y10T 83/0281* (2015.04); *Y10T 156/1051* (2015.01); *Y10T 156/1082* (2015.01); *Y10T 156/1126* (2015.01); *Y10T 156/1137* (2015.01); *Y10T 156/1168* (2015.01); *Y10T 156/1195* (2015.01); *Y10T 156/12* (2015.01); *Y10T 156/1348* (2015.01); *Y10T 156/1788* (2015.01); *Y10T 156/1793* (2015.01); *Y10T 156/1928* (2015.01); *Y10T 156/1933* (2015.01); *Y10T 156/1939* (2015.01); *Y10T 156/1961* (2015.01); *Y10T 156/1967* (2015.01); *Y10T 156/1994* (2015.01)

(58) Field of Classification Search
CPC ......... Y10T 156/1788; Y10T 156/1967; Y10T 156/1168; Y10T 156/1994; Y10T 156/1126; Y10T 156/1137; Y10T 156/1928; Y10T 156/1933; Y10T 156/1939; Y10T 156/1052; Y10T 156/1961; C03B 33/027; C03B 33/07; C03B 33/074; C03B 33/076; C03B 33/078; C03B 33/037; B26D 3/08; B26D 3/085; B26D 3/12; B26D 1/04; B26F 1/18; B26F 1/3826; G02F 1/1301; B32B 38/10; B32B 38/04; B32B 43/003; B32B 43/006

See application file for complete search history.

(56) References Cited

U.S. PATENT DOCUMENTS

| | | | |
|---|---|---|---|
| 8,610,155 B2 | 12/2013 | Hatano et al. | |
| 9,333,736 B2 | 5/2016 | Kumakura et al. | |
| 9,455,418 B2 | 9/2016 | Ohno et al. | |
| 2003/0121599 A1* | 7/2003 | Yamamoto | H01L 21/67132 156/247 |
| 2012/0217516 A1 | 8/2012 | Hatano et al. | |
| 2015/0044792 A1 | 2/2015 | Aoyama et al. | |
| 2015/0068683 A1 | 3/2015 | Ohno et al. | |
| 2015/0214124 A1* | 7/2015 | Buxbaum | H01L 22/14 438/17 |
| 2016/0243812 A1 | 8/2016 | Kumakura et al. | |

* cited by examiner

DEVICE FOR FORMING SEPARATION STARTING POINT, STACK MANUFACTURING APPARATUS, AND METHOD FOR FORMING SEPARATION STARTING POINT

BACKGROUND OF THE INVENTION

1. Field of the Invention

The present invention relates to an object, a method, or a manufacturing method. In addition, the present invention relates to a process, a machine, manufacture, or a composition of matter. In particular, the present invention relates to, for example, a semiconductor device, a display device, a light-emitting device, a power storage device, a driving method thereof, or a manufacturing method thereof. In particular, one embodiment of the present invention relates to a method for forming a separation starting point, a device for forming a separation starting point, or a stack manufacturing apparatus.

2. Description of the Related Art

The social infrastructures relating to means for transmitting information have advanced. This has made it possible to acquire, process, and send out many pieces and various kinds of information with the use of an information processor not only at home or office but also at other visiting places.

With this being the situation, portable information processors are under active development.

For example, portable information processors are often used outdoors, and force might be accidentally applied by dropping to the information processors and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

SUMMARY OF THE INVENTION

An object of one embodiment of the present invention is to provide a device for forming a separation starting point that allows separation of a surface layer of a processed member to form of a remaining portion. Another object is to provide a novel method for forming a separation starting point. Another object is to provide a manufacturing apparatus of a stack including a support and a remaining portion of a processed member from which a surface layer is separated. Another object is to provide a novel manufacturing apparatus. The other object is to provide an apparatus that is manufactured with the use of a novel manufacturing apparatus.

Note that descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a device for forming a separation starting point which includes a stage that can support a processed member, a cutter that faces the stage, a head portion that supports the cutter, an arm portion that supports the head portion, and a moving mechanism that relatively determines a position of the cutter to the stage. The processed member is provided with the separation starting point that allows separation of a surface layer to form a remaining portion. The cutter can cut the processed member while leaving part of the processed member. The moving mechanism can relatively move the cutter along the stage.

Another embodiment of the present invention is a device for forming a separation starting point which includes a stage that can support a processed member, a cutter that faces the stage, a head portion that supports the cutter, an arm portion that supports the head portion, and a moving mechanism that relatively determines a position of the cutter to the stage. The moving mechanism places the cutter so that the processed member is cut to a predetermined depth while leaving part of the processed member, and relatively moves the cutter along the stage.

The above-described device for forming the separation starting point includes the stage that supports the processed member, the cutter that faces the stage, the head portion that supports the cutter, the arm portion that supports the head portion, and the moving mechanism that relatively moves the cutter to the stage. With such a structure, the processed member is cut while leaving part of the processed member, and thus can be provided with the separation starting point. Consequently, it is possible to provide a device for forming a separation starting point that allows separation of a surface layer of a processed member to form a remaining portion.

Another embodiment of the present invention is the above-described device for forming the separation starting point that includes a camera taking an image of a cut portion of the processed member, and an image processing portion processing an image taken by the camera. The image processing portion determines whether the separation starting point is formed along the cut portion or not.

Furthermore, another embodiment of the present invention is the above-described device for forming the separation starting point that includes a camera taking an image of a cut portion of the processed member, and an image processing portion processing an image taken by the camera. The stage can support the processed member in which a marker is formed near the cut portion. The image processing portion detects a change in an image of the marker and determines whether the separation starting point is formed along the cut portion or not.

The above-described device for forming the separation starting point that is one embodiment of the present invention includes the camera taking an image of the cut portion of the processed member and the image processing portion processing an image taken by the camera. With such a structure, it is possible to check whether the separation starting point that allows separation of the surface layer of the processed member is formed or not. Consequently, it is possible to provide a device for forming a separation starting point that allows separation of a surface layer of a processed member to form a remaining portion.

Another embodiment of the present invention is a stack manufacturing apparatus including a loader unit feeding a processed member provided with the separation starting point that allows separation of one surface layer of the processed member to form a remaining portion; a starting point forming unit forming a separation starting point by cutting the processed member while leaving part of the processed member; a separating unit separating the one surface layer of the processed member to form a remaining portion; an attaching unit to which a support is fed and which attaches the support to the remaining portion with an adhesive layer; a support feeding unit feeding the support; and an unloader unit transporting a stack including the remaining portion and the support attached each other with the adhesive layer.

In the manufacturing apparatus of the stack, the starting point forming unit includes a device for forming a separation starting point which includes a stage that can support the processed member, a cutter that faces the stage, a head portion that supports the cutter, an arm portion that supports the head portion, and a moving mechanism that relatively determines a position of the cutter to the stage. The cutter can cut the processed member while leaving part of the processed member. The moving mechanism relatively moves the cutter along the stage.

The above stack manufacturing apparatus of one embodiment of the present invention includes the loader unit feeding the processed member; the starting point forming unit forming a separation starting point by cutting one surface of the processed member while leaving part of the processed member; the separating unit separating the remaining portion; the attaching unit attaching the support to the remaining portion; the support feeding unit feeding the support; and the unloader unit transporting a stack including the remaining portion and the support attached to each other with the adhesive layer. Thus, the support can be attached to the remaining portion of the processed member formed by separating the surface layer. As a result, it is possible to provide a manufacturing apparatus of a stack including a support and a remaining portion of a processed member from which a surface layer is separated.

Another embodiment of the present invention is a stack manufacturing apparatus including a first loader unit feeding a processed member provided with the separation starting point that allows separation of one surface layer of the processed member to form a first remaining portion and allows separation of the other surface layer which is cut while leaving part of the other surface layer to form a second remaining portion; a first separating unit separating the one surface layer of the processed member to form the first remaining portion; a first attaching unit to which a first support is fed and which attaches the first support to the first remaining portion with a first adhesive layer; a support feeding unit feeding the first support and a second support; a first unloader unit transporting a first stack including the first remaining portion and the first support attached to each other with the first adhesive layer; a second loader unit feeding the first stack; a starting point forming unit forming the separation starting point by cutting the first stack while leaving part of the first stack; a second separating unit separating one surface layer of the first stack to form the second remaining portion; a second attaching unit to which the second support is fed and which attaches the second support to the second remaining portion with a second adhesive layer; and a second unloader unit transporting a second stack including the second remaining portion and the second support attached to each other with the second adhesive layer.

In the manufacturing apparatus of the stack, the starting point forming unit includes a device for forming a separation starting point which includes a stage that can support the processed member, a cutter that faces the stage, a head portion that supports the cutter, an arm portion that supports the head portion, and a moving mechanism that relatively determines a position of the cutter to the stage. The cutter can cut the processed member while leaving part of the processed member. The moving mechanism relatively moves the cutter along the stage.

The above stack manufacturing apparatus of one embodiment of the present invention includes the first loader unit feeding the processed member; the first separating unit separating the first remaining portion; the first attaching unit attaching the first support to the first remaining portion; the support feeding unit feeding the first support and the second support; the first unloader unit transporting the first stack including the first remaining portion and the first support attached to each other with the first adhesive layer; the second loader unit feeding the first stack; the starting point forming unit forming the separation starting point by cutting one surface of the first stack while leaving part of the first stack; the second separating unit separating the second remaining portion; the second attaching unit attaching the second support to the second remaining portion; and the second unloader unit transporting a second stack including the second remaining portion and the second support attached to each other with the second adhesive layer. Thus, both of the surface layers of the processed member are separated to form the second remaining portion, and the first support and the second support can be attached to the second remaining portion. As a result, it is possible to provide a manufacturing apparatus of a stack including a support and a remaining portion of a processed member from which one surface layer is separated.

Another embodiment of the present invention is a device for forming a separation starting point which includes a stage that can support a first stack, a cutter that faces the stage, a first head portion that holds the cutter, a first arm portion that holds the first head portion, a pressing tool that faces the stage, a second head portion that holds the pressing tool, a second arm portion that holds the second head portion, and a moving mechanism that can relatively determine positions of the cutter and the pressing tool to the stage.

The moving mechanism can relatively determine the position of the cutter to the stage so that the first stack is cut while leaving part of the first stack and a cut portion is peeled from a remaining part. In addition, the moving mechanism can relatively determine the position of the pressing tool to the stage so that the vicinity of the cut portion of the first stack is pressed onto the stage.

In the above-described device for forming the separation starting point, the stage can support the first stack in which a substrate, a separation layer, a layer to be separated, a first support, and a protective film are placed in this order.

The above-described device for forming the separation starting point includes a cutter with which the first stack is cut while leaving part of the first stack and the cut portion is peeled from a remaining part, and a pressing tool that can be moved so as to press the vicinity of the remaining part of the first stack onto the stage.

With such a structure, in a step in which the cut portion is peeled from the separation starting point formed by cutting the first stack while leaving part of the first stack to carry on the separation, the protective film which is unintentionally separated from the first support can be in close contact with the first support. Consequently, a novel device for forming a separation starting point can be provided.

Another embodiment of the present invention is a method for forming a separation starting point including the following steps. In a first step, a first stack in which a substrate, a separation layer, a layer to be separated, a first support, and a protective film are placed in this order over the substrate is cut while leaving the substrate; thus, an end portion is formed in the layer to be separated. In a second step, the end portion is peeled from the substrate. In a third step, the vicinity of the end portion is pressed onto the substrate.

The above-described method for forming the separation starting point includes the first step in which the first stack is cut while leaving substrate to form the end portion in the layer to be separated, the second step in which the end portion is peeled from the substrate, and the third step in which the vicinity of the end portion is pressed onto the substrate.

In the step in which the end portion formed by cutting the layer to be separated is peeled from the substrate, the protective film which is unintentionally separated from the first support can be in close contact with the first support. Consequently, a novel device for forming a separation starting point can be provided.

In the above-described method for forming the separation starting point, in the third step, the vicinity of the end portion is pressed onto the substrate while a position where the vicinity of the end portion is pressed is shifted in a direction opposite to a direction in which the end portion is peeled from the substrate and the separation is carried on.

Thus, for example, a gas or a liquid which enters between the first support and the protective film in the first stack is pushed, so that the protective film can be in close contact with the first support. This makes it possible to prevent unintentional separation of the protective film from the first support. Consequently, a novel device for forming a separation starting point can be provided.

In the above-described method for forming the separation starting point, a liquid is supplied to the end portion in the first step and/or the second step.

Thus, a force required for the separation and/or static electricity incident to the separation can be reduced. Consequently, a novel device for forming a separation starting point can be provided.

Another embodiment of the present invention is a stack manufacturing apparatus including a first loader unit feeding a processed member; a first separating unit separating one surface layer of the processed member to form a first remaining portion; a first attaching unit to which a first support is fed and which attaches the first support to the first remaining portion with a first adhesive layer; a support feeding unit feeding the first support and a second support; a first unloader unit transporting a first stack including the first remaining portion and the first support attached to each other with the first adhesive layer; a second loader unit fed with and feeding the first stack; a starting point forming unit forming a separation starting point by cutting the first stack while leaving part of the first stack; a second separating unit separating one surface layer of the first stack to form a second remaining portion; a second attaching unit to which the second support is fed and which attaches the second support to the second remaining portion with a second adhesive layer; and a second unloader unit transporting a second stack including the second remaining portion and the second support attached to each other with the second adhesive layer.

The starting point forming unit includes the device for forming a separation starting point.

In the above-described stack manufacturing apparatus, the starting point forming unit includes a device for forming a separation starting point including a cutter with which the first stack is cut while leaving part of the first stack and the cut portion is peeled from a remaining part, and a pressing tool that can be moved so as to press the vicinity of the remaining part of the first stack onto the stage.

With such a structure, in a step in which the cut portion is peeled from the separation starting point formed by cutting the first stack while leaving part of the first stack to carry on the separation, the protective film which is unintentionally separated from the first support can be in close contact with the first support. Consequently, a novel device for forming a separation starting point can be provided.

One embodiment of the present invention makes it possible to provide a device for forming a separation starting point that allows separation of a surface layer of a processed member to form a remaining portion. In addition, a method for forming a separation starting point can be provided. In addition, a manufacturing device of a stack including a support and a remaining portion of a processed member from which a surface layer is separated can be provided. Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF THE DRAWINGS

In the accompanying drawings:

FIGS. 3A to 3B-2, are schematic views illustrating a structure of a device for forming a separation starting point of one embodiment.

FIGS. 5A-1 to 5E-2 are schematic views illustrating a process for manufacturing a stack of one embodiment;

FIGS. 6A-1 to 6E-2 are schematic views illustrating a process for manufacturing a stack of one embodiment;

FIGS. 8A-1 to 8E-2 are schematic views illustrating a process for manufacturing a stack of one embodiment;

FIGS. 9A-1 to 9E-2 are schematic, views illustrating a process for manufacturing a stack of one embodiment;

FIGS. 11A-1 to 11C-2 are schematic views illustrating structures of processed members of one embodiment;

FIGS. 20A-1 to 20D-2 are schematic views illustrating a method for manufacturing a stack including an opening, according to one embodiment;

DETAILED DESCRIPTION OF THE INVENTION

Figure 1A:
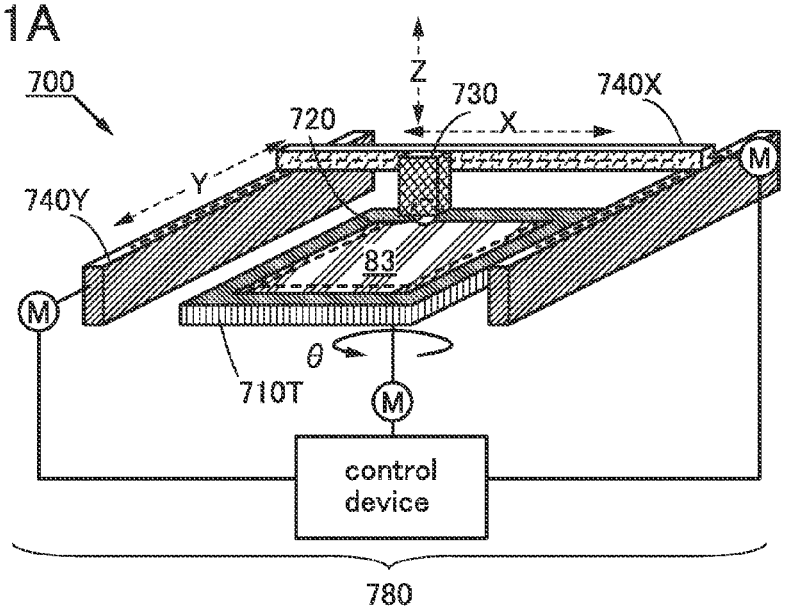
FIG. 1A to 1C are schematic views illustrating a structure of a device for forming a separation starting point of one embodiment.

A device for forming the separation starting point which is one embodiment of the present invention includes a stage that supports the processed member, a cutter that faces the stage, a head portion that supports the cutter, an arm portion that supports the head portion, and a moving mechanism that relatively moves the cutter to the stage.

With such a structure, the processed member is cut while leaving part of it, and thus can be provided with the separation starting point that allows separation of a surface layer of the processed member. Consequently, it is possible to provide a device for forming a separation starting point that allows separation of a surface layer of a processed member to form of a remaining portion.

The above stack manufacturing apparatus of one embodiment of the present invention includes the loader unit feeding the processed member; the starting point forming unit forming a separation starting point by cutting one surface of the processed member while leaving part of the processed member; the separating unit separating the remaining portion; the attaching unit attaching the support to the remaining portion; the support feeding unit feeding the support; and the unloader unit transporting a stack including the remaining portion and the support attached to each other with the adhesive layer.

Thus, the support can be attached to the remaining portion of the processed member formed by separating a surface layer. As a result, a manufacturing apparatus of a stack including a support and a remaining portion of a processed member whose one surface layer is separated. In this specification, a surface layer refers to a layer on a surface of a processed member or a stack. A structure of the surface layer is not limited to a single-layer structure, and can be a stacked-layer structure. Furthermore, a remaining portion refers to part of the processed member or the stack that does not include one surface layer.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

(Embodiment 1)

In this embodiment, a structure of a device for forming a separation starting point that is one embodiment of the present invention is described with reference to FIGS. 1A to 1C, FIGS. 2A-1 to 2D-2, and FIGS. 3A to 3B-2.

Figures 1, 1B:
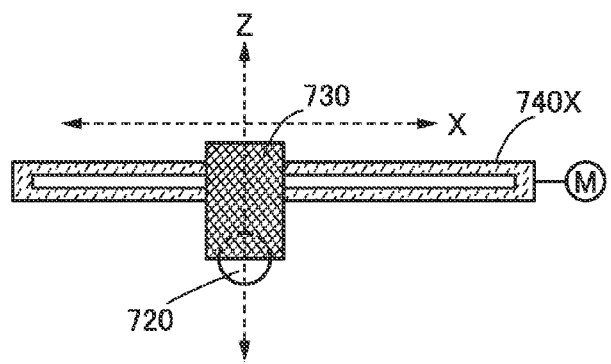
FIGS. 2A-1 to 2D-2 are schematic views illustrating a process for forming a separation starting point of one embodiment.
Figures 1, 1B, 2:
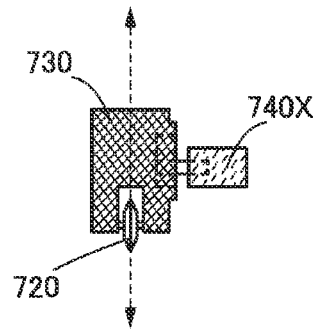
Figure 1C:
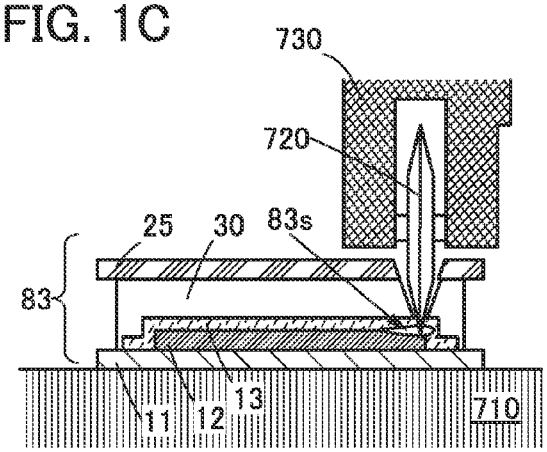
Figures 1, 1B, 2, 3:
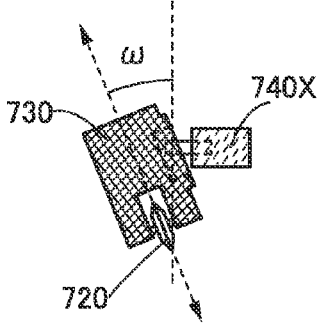

FIGS. 1A to 1C are schematic views illustrating a, structure of a device 700 for forming a separation starting point (hereinafter also referred to as forming device 700) that is one embodiment of the present invention.

FIGS. 2A-1 to 2D-2 are schematic views illustrating steps of forming a separation starting point in a processed member 83 with the use of the forming device 700 that is one embodiment of the present invention.

Figure 3A:
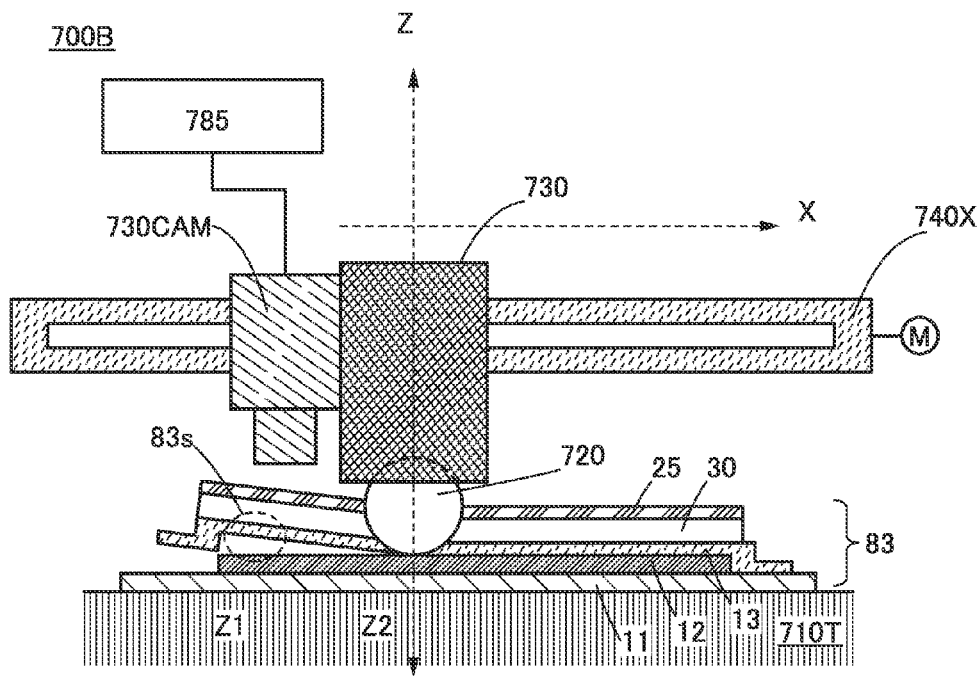
Figures 1, 3B:
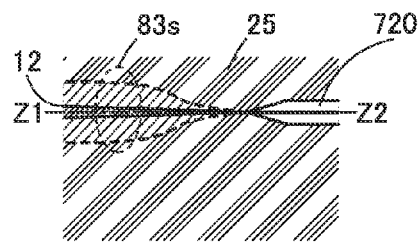
Figures 2, 3B:
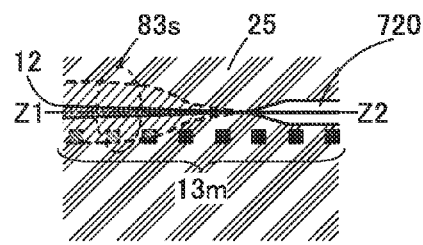

FIGS. 3A to 3B-2 are schematic views illustrating a device 700B for forming a separation starting point (hereinafter also referred to as forming device 700B).

The forming device 700 described in this embodiment includes a stage 710T that can support a processed member 83 in which a separation starting point is formed to allow separation of a surface layer to form a remaining portion, a cutter 720 that faces the stage 710T, a head portion 730 that supports the cutter 720, an arm portion 740X and an arm portion 740Y that support the head portion 730, and a moving mechanism 780 that determines a position of the cutter 720 which is relative to the stage 710T (see FIG. 1A).

The cutter 720 can cut the processed member 83 while leaving part of the processed member 83.

The moving mechanism 780 relatively moves the cutter 720 along the stage 710T.

The forming device 700 described in this embodiment includes the stage 710T that supports the processed member, the cutter 720 that faces the stage 710T, the head portion 730 that supports the cutter 720, the arm portion 740X and the arm portion 740Y that support the head portion 730, and the moving mechanism that relatively moves the cutter 720 to the stage 710T. With such a structure, the processed member 83 is cut while leaving part of it, and thus can be provided with the separation starting point that allows separation of a surface layer of the processed member. Consequently, it is possible to provide a device for forming a separation starting point that allows separation of a surface layer of a processed member to form a retraining portion.

Components of the forming device 700 described as an example in this embodiment will be described below.

<<Stage>>

The stage 710T includes a flat portion. The flat portion can support or fix the processed member 83. Examples of a mechanism that allows fixing of the sheet-like processed member 83 include a suction chuck and an electrostatic chuck.

The flat portion of the stage 710T can rotate along a plane including the flat portion (rotate in a θ direction). As a mechanism that allows the rotation of the flat portion of the stage 710T, an electric motor such as a servomotor or a stepper motor can be used.

With the stage 710T including the flat portion that can rotate, the moving direction of the cutter 720 that is relative to the stage 710T can be easily rotated. For example, the cutter 720 is moved in one direction to cut the processed member 83 and then, the stage 710T is turned 90° and the cutter 720 is moved in another direction to cut the processed member 83. As a result, the processed member 83 can be cut in the two directions perpendicular to each other.

Note that the processed member 83 in which a separation starting point 83s is formed includes a first substrate 11, a first separation layer 12 over the first substrate 11, a first layer 13 to be separated (hereinafter simply referred to as first layer 13) whose one surface is in contact with the first separation layer 12, a bonding layer 30 whose one surface is in contact with the other surface of the first layer 13, and a base 25 which is in contact with the other surface of the bonding layer 30 (see FIG. 1C). Detailed description of a structure of the processed member 83 is described in Embodiment 4.

<<Cutter>>

The cutter 720 cuts part of the processed member 83 that is on a side where the cutter 720 is placed so as to leave part of the processed member 83 that is on the stage 710T side (the cutting is also referred to as half-cutting).

Any cutter can be used as the cutter 720 as long as it can cut part of the processed member 83 and hardly cuts the remaining part thereof. For example, a knife with a sharp tip, a laser beam, and the like can be given.

In the processed member 83 described in this embodiment, the base 25 and the bonding layer 30 contain a flexible resin, and the first substrate 11 contains glass.

In this case, for example, a round blade which is capable of rotating and made of steel can be used as the cutter 720. Alternatively, a knife including a fixed tip may be used.

The head portion 730 presses the cutter 720 to the processed member 83. Although the cutter 720 can cut the base 25 and the bonding layer 30 which are made of a resin, the cutter 720 cannot cut the first substrate 11 made of glass. Then, the moving mechanism moves the cutter 720 along the flat portion of the stage 710T. Thus, the cutter 720 cuts the base 25 and the bonding layer 30 while leaving the first substrate 11.

Note that the cutter 720 damages the first layer 13 and the first separation layer 12, whereby part of the first layer 13 is separated from the first separation layer 12 (see FIG. 1C). As a result, the separation starting point 83s is formed along the cut portion.

The separation starting point 83s is a portion where part of the first layer 13 is separated or easily separated from the first separation layer 12, and a portion to be the starting point of separation that is carried on in the surrounding area.

When a force applied to separate the first layer 13 from the first separation layer 12 is concentrated at the first layer 13, the first layer 13 might be broken. To separate the first layer 13 from the first separation layer 12 without breaking the first layer 13, the force applied to separate the first layer 13 needs to be concentrated at a position between the first separation layer 12 and the first layer 13.

It can be said that the separation starting point 83s makes it possible to concentrate the force applied to separate the first layer 13 from the first separation layer 12 at the position between the first separation layer 12 and the first layer 13.

Note that when a rigid material, such as glass, a ceramic, or a single crystal substrate, is used for the base 25, the base 25 may be cut while leaving the first substrate 11 in the following manner: a surface of the base 25 is scratched with the cutter 720 and then a stress is applied to the scratch. Thus, the separation starting point 83s can be formed.

<<Head Portion>>

The head portion 730 supports the cutter 720 (see FIGS. 1B-1 to 1B-3).

The head portion 730 may include a mechanism for controlling a pressing force or a pressing depth at the time of pressing the cutter 720 to the processed member (in other words, pressing in the Z-axis direction).

Furthermore, the head portion 730 may include a mechanism for controlling a pressing angle at the time of pressing the cutter 720 to the processed member.

Specifically, the head portion 730 allows the cutter 720 to enter the processed member at an angle of 90° (see FIG. 1B-2). In addition, the cutter 720 can enter the processed member at an angle smaller than 90° by ω (see FIG. 1B-3). A change in the sharpness of the cutter 720 associated with its use might occur, and thus the separation starting point is less likely to be formed in some cases. The angle at which the cutter 720 enters the processed member may be changed on the basis of the usage experience of the cutter 720. This makes it possible to prevent occurrence of the case where the separation starting point is not formed. For example, a plurality of notches may be provided to fix the angle of the cutter 720, which makes it possible to fix the cutter 720 at an angle selected from various angles. For example, the angle may be changed discontinuously from 20° to 45°.

<<Arm Portion>>

The arm portion 740X supports the head portion 730 so that the head portion 730 can be moved in the X-axis direction, and the arm portion 740Y supports the arm portion 740X so that the arm portion 740X can be moved in the Y-axis direction (see FIG. 1).

For example, the head portion 730 is mounted on a slider that is included in the arm portion 740X and can be moved in the X-axis direction, and the arm portion 740X is mounted on a slider that is included in the arm portion 740Y and can be moved in the Y-axis direction; thus, the head portion 730 can be moved along the flat portion of the stage 710T.

<<Moving Mechanism>>

The moving mechanism 780 determines the position of the cutter 720 relative to the stage 710T. The moving mechanism 780 includes a mechanism for moving the cutter 720 and a control device that controls the position of the cutter 720, for example.

As the mechanism for moving the cutter 720, a mechanism for moving the sliders included in the arm portion 740X and the arm portion 740Y can be given. Examples of the mechanism for moving the sliders include an air cylinder and electric motors such as a servomotor and a stepper motor. The control device detects the position and the move distance of the cutter 720 or gives an instruction.

<Method for Forming Separation Starting Point>

A method for forming the separation starting point 83s so as to surround part of the processed member 83 with the use of the forming device 700 is described with reference to FIGS. 2A-1 to 2D-2.

FIGS. 2A-1 to 2D-2 are schematic views illustrating steps of forming the separation starting point 83s with the use of the forming device 700 that is one embodiment of the present invention. FIGS. 2A-1, 2B-1, 2C-1, and 2D-1 are cross-sectional views illustrating structures of the processed member. FIGS. 2A-2, 2B-2, 2C-2, and 2D-2 are top views corresponding to the cross-sectional views.

Figures 1, 2A:
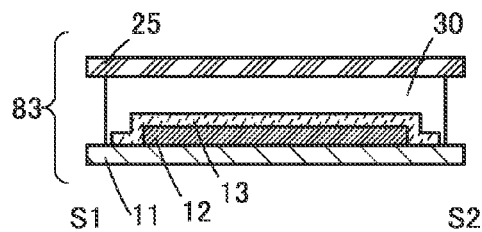
Figures 2, 2A:
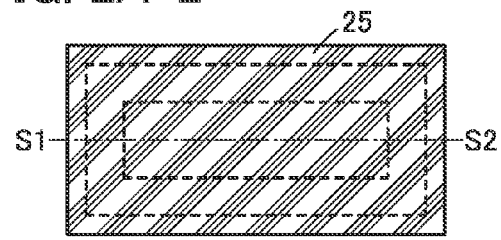

The structure of the processed member 83 illustrated in FIGS. 2A-1 and 2A-2 is the same as that illustrated in FIG. 1C. The structure is described in detail in Embodiment 4.

<<First Step>>

Figures 1, 2B:
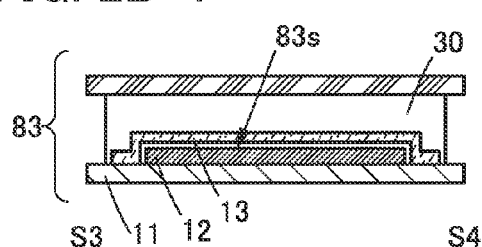
Figures 2, 2B:
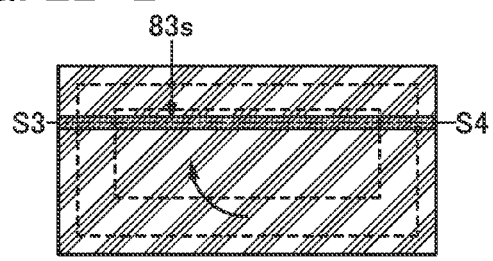

In the first step, the base 25 and the bonding layer 30 are cut from the base 25 side so that the first substrate 11 is left; that is, the processed member 83 is cut so that part of the processed member 83 is left. Thus, part of the first layer 13 that is in the vicinity of newly formed end portions of the bonding layer 30 is peeled from the first separation layer 12, so that the separation starting point 83s is formed. Note that FIG. 2B-1 illustrates the first layer 13 that is peeled from and floats over the first separation layer 12 in a cross section along line S3-S4 passing through the cut portion. FIG. 2B-2 illustrates its top view.

The base 25 and the bonding layer 30 may be cut repeatedly. When the cutting is repeated, it is possible to inhibit occurrence of the case where the separation starting point is not formed. The cutting may be repeated along the same line; the first cutting and the second cutting may be performed along different lines to form cut portions parallel to each other.

Alternatively, the cutting may be performed while the positions of the cutting are shifted by 0.5 mm or more and 5 mm or less, preferably 1 mm or more and 3 mm or less so that the base 25 and the bonding layer 30 are cut to have a band shape. The band-shaped base 25 and the band-shaped bonding layer 30 can be used as a test piece to check whether the separation starting point is formed or not.

Furthermore, in cutting the base 25 and the bonding layer 30 or after the cutting, a liquid which promotes separation is preferably supplied to the cut portion. A portion where the band-shaped base 25 and the band-shaped bonding layer 30 are cut functions as a space in which the liquid is stored, and thus the liquid can be supplied to the separation starting point. Note that water can be used as the liquid which promotes the separation, for example.

<<Second Step>>

Figures 1, 2C:
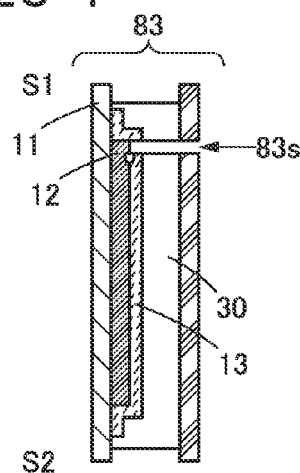
Figures 2, 2C:
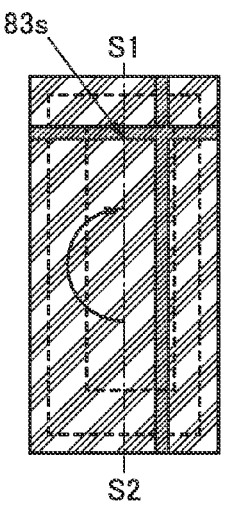

In the second step, the stage 710T is turned 90°, and part of the processed member 83 is cut to be perpendicular to the portion cut in the first step. FIG. 2C-1 illustrates a cross section along line S1-S2 intersecting with the cut portion, and FIG. 2C-2 illustrates a top view.

<<Third Step>>

Figures 1, 2D:
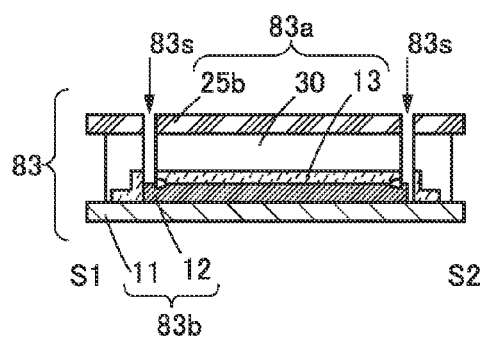
Figures 2, 2D:
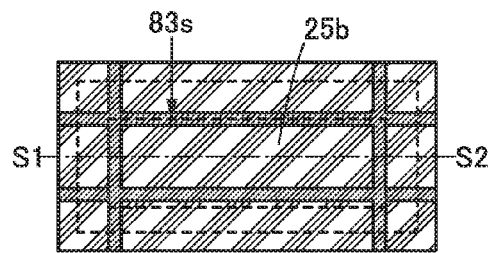

In the third step, the second step is repeated. Thus, the separation starting point 83s is formed to surround part of the processed member 83. FIG. 2D-1 illustrates a cross section along line S1-S2 intersecting with the cut portion, and FIG. 2D-2 illustrates a top view.

Note that the separation starting point 83s is formed to surround the first layer 13 which is surrounded by the cut portions.

A surface layer 83b including the first substrate 11 and the first separation layer 12 is separated to form the remaining portion including a base 25b, the bonding layer 30, and the first layer 13.

<Modification Example 1>

The forming device described in Modification Example 1 of this embodiment is different from the above-described forming device 700 in that the moving mechanism 780 which places the cutter 720 so that the processed member is cut to a predetermined depth while leaving part of the processed member is included, and a cutter capable of cutting the processed member 83 without leaving part of the processed member 83 can be used as the cutter 720.

The forming device described in Modification Example 1 of this embodiment includes the stage 710T that can support the processed member 83 in which a separation starting point is formed to allow separation of a surface layer to form a remaining portion, the cutter 720 that faces the stage 710T, the head portion 730 that supports the cutter 720, the arm portion 740X and the arm portion 740Y that support the head portion 730, and the moving mechanism 780 that relatively determines a position of the cutter 720 to the stage 710T (see FIG. 1A).

The moving mechanism 780 places the cutter 720 so that the processed member 83 is cut to a predetermined depth while leaving part of the processed member 83, and relatively moves the cutter along the stage 710T.

With such a structure, the processed member is cut while leaving part of it, and thus can be provided with the separation starting point that allows separation of a surface layer of the processed member. Consequently, it is possible to provide a device for forming a separation starting point that allows separation of a surface layer of a processed member to form a remaining portion.

Description is given of structures of the moving mechanism 780 and the cutter 720 that can be used in the forming device in Modification Example 1 of this embodiment. Note that the other components can have the same structures as those in the above-described forming device 700.

<<Moving Mechanism>>

The moving mechanism 780 places the cutter 720 so that the processed member 83 is cut to a predetermined depth while leaving part of the processed member 83. For example, a height of the cutter 720 from the stage 710T can be adjusted so that part of the processed member 83 is cut and the rest thereof is not cut.

Specifically, a structure may be employed in which the head portion 730 is provided with a sensor that senses the contact of the cutter 720, and after the sensor senses the contact, the cutter 720 is moved with the moving mechanism while being pressed to a predetermined depth in the Z-axis direction.

Thus, it is possible to cut the processed member 83 while leaving part of the processed member 83.

<<Cutter>>

A cutter used as the cutter 720 can cut part or the whole depth of the processed member 83. The moving mechanism 780 places the cutter 720 apart from a flat portion of the stage by a predetermined distance and moves the cutter 720 along the flat portion of the stage; therefore, the cutter 720 can cut the processed member 83 while leaving part of the processed member 83.

Thus, even when a structure in which the processed member 83 is easily cut is employed, the separation starting point can be formed by cutting the processed member 83 while leaving part of the processed member 83. Consequently, the device for forming the separation starting point which allows separation of the surface layer of the processed member to form the remaining portion can be provided.

<Modification Example 2>

Modification Example 2 of this embodiment is described with reference to FIGS. 3A, 3B-1, and 3B-2.

FIGS. 3A, 3B-1, and 3B-2 are the schematic views illustrating the forming device 700B. FIG. 3A is a cross-sectional view illustrating a state where the cutter 720 of the forming device 700B cuts the processed member 83. FIG. 3B-1 is the schematic top view of an image of the processed member 83 cut with the cutter 720 along line Z1-Z2 in FIG. 3A.

Note that the forming device 700B is different from the above-described forming device 700 in that a camera 730CAM taking an image of a cut portion and an image processing portion 785 processing the image are included, and the image processing portion 785 determines whether the separation starting point is formed or not.

The forming device described in Modification Example 2 of this embodiment includes the camera 730CAM taking an image of the processed member cut with the cutter 720 while leaving part of the processed member, and the image processing portion 785 processing the image taken by the camera 730CAM. In addition, the image processing portion 785 determines whether the separation starting point 83s is formed along the cut portion or not (see FIGS. 3A and 3B-1).

<Modification Example 3>

Modification Example 3 of this embodiment is described with reference to FIGS. 3A, 3B-1, and 3B-2.

FIG. 3B-2 is a schematic top view of an image of markers arranged in the processed member 83 cut with the cutter 720 along line Z1-Z2 in FIG. 3A.

Note that the forming device described in Modification Example 3 of this embodiment is different from the above-described forming device 700 in that the camera 730CAM taking an image of the cut portion and the image processing portion 785 processing the image are included, and the image processing portion 785 determines whether the separation starting point is formed or not by detecting the position or a change in the appearance of the markers formed in the processed member.

The forming device described in Modification Example 3 of this embodiment includes the camera 730CAM taking an image of the processed member cut with the cutter 720 while leaving part of the processed member, and the image processing portion 785 processing the image taken by the camera 730CAM.

In addition, the stage 710T can support the processed member 83 in which the markers are formed near the cut portion. The image processing portion 785 detects a change in an image of the markers, and thus determines whether the separation starting point is formed along the cut portion or not (see FIGS. 3A and 3B-2).

The forming devices described in Modification Examples 2 and 3 in this embodiment each include the camera 730CAM taking an image of the processed member cut with the cutter 720 while leaving part of the processed member, and the image processing portion 785 processing the image. Thus, it is possible to check whether the separation starting point that allows separation of the surface layer of the processed member is formed or not. Consequently, the device for forming the separation starting point which allows separation of the surface layer of the processed member to form the remaining portion can be provided.

Components of the forming device 700B in any of the modification examples in this embodiment will be described below.

<<Camera>>

The camera 730CAM takes an image of a portion cut with the cutter 720, and supplies data of the image. For example, a CCD camera, a CMOS camera, or the like can be used. The camera 730CAM is placed in a position where an image of the portion cut with the cutter 720 can be taken.

For example, the head portion 730 may support the camera 730CAM and the cutter 720. With such a structure, an image of the processed member 83 just after being cut with the cutter 720 can be taken. Specifically, to allow the taking of an Image of the portion cut with the cutter, the camera 730CAM is placed on the opposite side of a direction in which the cutter 720 is relatively moved to the processed member 83 (sec FIG. 3A).

FIG. 3B-1 illustrates the schematic view of the image of the processed member 83 cut with the cutter 720 which is taken by the camera 730CAM. The base 25, the cutter 720 with a round blade that cuts the base the separation starting point 83s expanded from the cut portion, and the first separation layer 12 exposed in the cut portion are illustrated.

When the separation starting point 83s is formed between the first separation layer 12 and the first layer 13 in the cut portion, an atmosphere, water, or the like enters the separation starting point 83s. As a result, a region with a different hue is formed along the cut portion (i.e., a region shown by the dashed line in FIG. 3B-1).

Note that lighting may be used together with the camera 730CAM. The lighting may be placed on the camera 730CAM side of the processed member 83 or may be placed on the stage 710T side of the processed member 83.

<<Marker>>

Markers 13m are arranged near a portion cut with the cutter 720. For example, the markers are arranged in the cut portion or arranged apart from the cut portion by 1 cm or less. Specifically, the markers are formed on or in the first layer 13 in the processed member 83. The shape of the marker 13m is not particularly limited, and can be a circle, a square, a cross, or the like. In addition, the markers 13m are preferably formed using a film which does not transmit light used in observation (e.g., a film of a metal or the like), in which case the markers are easily observed.

When the cutter 720 cuts part of the processed member 83 to form the separation starting point, an atmosphere, water, or the like enters the separation starting point 83s. Accordingly, the first layer 13 on or in which the markers are formed is peeled off the first separation layer 12. As a result, a region where the appearance of the markers 13m arranged along the cut portion is changed is formed (i.e., a region shown by the dashed line in FIG. 3B-2). As the change in the appearance of the markers 13m, a change in the concentration in the image of the markers 13m, a change in the outline thereof, or the like can be given.

<<Image Processing Portion>>

An image data is supplied to the image processing portion 785, and the image data is processed by the image processing portion 785. When a result obtained by processing the image data exceeds a predetermined threshold value, the image processing portion 785 determines the formation of the separation starting point and supplies the determined result.

For example, when a region with a different hue is formed along the cut portion as a result of the formation of the separation starting point, the image processing portion 785 processes an image of the region that is taken by the camera. 730CAM just after the movement of the cutter 720, determines whether the concentration of the image exceeds the threshold value or not, and outputs the determined result. Specifically, whether the concentration of a predetermined region exceeds the threshold value or not may be determined by changing the image data into binary data.

For example, when a region with a change in the appearance of the markers 13m is formed as a result of the formation of the separation starting point along the cut portion, the image processing portion 785 processes an image of the markers 13m in the region that is taken by the camera 730CAM just after the movement of the cutter 720, determines whether the concentration of the image exceeds the threshold value or not, and outputs the determined result. Specifically, whether the concentration of a predetermined region exceeds the threshold value or not may be determined by changing the image data into binary data.

This embodiment can be combined with any of the other embodiments in this specification as appropriate.

(Embodiment 2)

In this embodiment, description is given of a structure of a stack manufacturing apparatus that is one embodiment of the present invention with reference to FIG. 4, FIGS. 5A-1 to 5E-2, and FIGS. 6A-1 to 6E-2.

Figure 4:
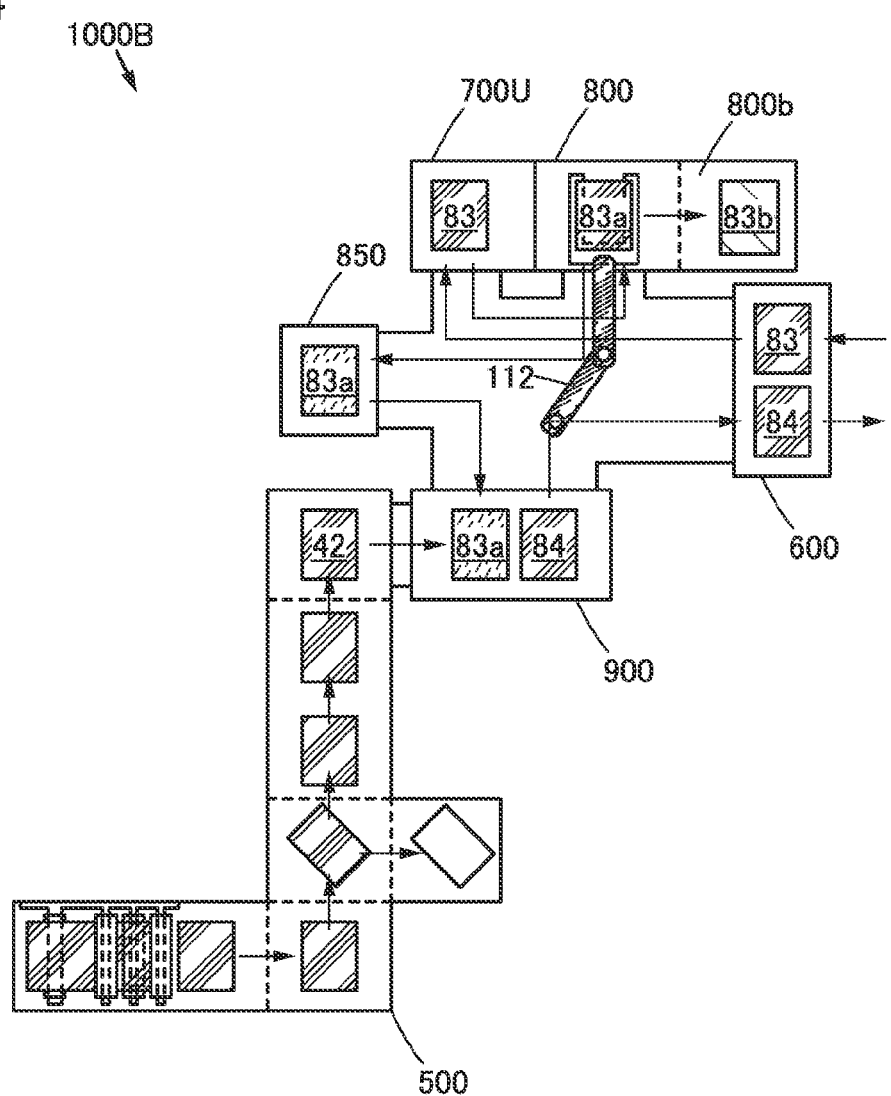
FIG. 4 is a schematic view illustrating a structure of a stack manufacturing apparatus of one embodiment.

FIG. 4 is a schematic diagram illustrating a structure of a stack manufacturing apparatus 1000B that is one embodiment of the present invention, and the conveyance path of a processed member and a stack in a process.

FIGS. 5A-1 to 5E-2 and FIGS. 6A-1 to 6E-2 are schematic views illustrating a process for manufacturing a stack with the use of the stack manufacturing apparatus 1000B that is one embodiment of the present invention.

FIGS. 5A-1, 5B-1, 5D-1, and 5E-1 on the left side are cross-sectional views illustrating structures of a processed member and a stack. FIGS. 5A-2, 5B-2, 5D-2, and 5E-2 on the right side are top views corresponding to the cross-sectional views.

The stack manufacturing apparatus 1000B in this embodiment includes a loader unit 600, a starting point forming unit 700U, a separating unit 800, an attaching unit 900, a support feeding unit 500, and an unloader unit (see FIG. 4).

The loader unit 600 feeds the processed member 83 in which a separation starting point is formed to allow separation of a surface layer to form a remaining portion. Note that the loader unit 600 can also serve as an unloader unit.

The starting point forming unit 700U cuts the processed member 83 while leaving part of the processed member 83, whereby a separation starting point is formed. In other words, one surface of the processed member 83 is cut so as to leave part of the processed member 83; thus, the separation starting point is formed.

The separating unit 800 separates one surface layer of the processed member 83 to form a remaining portion 83*a*.

A support 42 is fed into the attaching unit 900, and the attaching unit 900 attaches the support 42 to the remaining portion 83*a* with the use of an adhesive layer 32.

The support feeing unit 500 feeds the support 42.

The loader unit 600 also serving as the unloader unit transports a stack 84 including the remaining portion 83*a* and the support 42 which are attached to each other with the adhesive layer 32.

The starting point forming unit 700U includes the forming device 700.

The forming device 700 includes a stage that can support the processed member 83, a cutter that faces the stage, a head portion that supports the cutter, an arm portion that supports the head portion, and a moving mechanism that relatively determines the position of the cutter to the stage.

The cutter can cut the processed member while leaving part of the processed member.

The moving mechanism relatively moves the cutter along the stage.

The stack manufacturing apparatus 1000B described in this embodiment includes the loader unit 600 feeding the processed member; the starting point forming unit 700U forming a separation starting point by cutting the processed member from one surface of the processed member while leaving part of the processed member; the separating unit 800 separating the remaining portion; the attaching unit 900 attaching the support to the remaining portion; the support feeing unit 500 feeding the support; and the unloader unit transporting a stack including the remaining portion, the adhesive layer, and the support attached to the remaining portion with the adhesive layer. Thus, the support can be attached to the remaining portion of the processed member formed by separating a surface layer. As a result, a manufacturing apparatus of a stack including a support and a remaining portion of a processed member whose one surface layer is separated.

Furthermore, the stack manufacturing apparatus 1000B in this embodiment includes a storage portion 800*b*, a cleaning device 850, a conveying mechanism 112, and the like.

The storage portion 800*b* stores the one surface layer 83*b* separated from the processed member 83.

The cleaning device 850 cleans the remaining portion 83*a* obtained from the processed member 83.

The conveying mechanism 112 conveys the processed member 83, the remaining portion 83*a* obtained from the processed member 83, and the stack 84.

The following describes individual components included in the stack manufacturing apparatus that is one embodiment of the present invention.

<<Loader Unit>>

The loader unit 600 feeds the processed member 83. For example, a multistage storage capable of storing a plurality of processed members 83 can be included so that the conveying mechanism 112 can convey the processed members 83 successively.

Furthermore, the loader unit 600 in this embodiment also serves as the unloader unit. The loader unit 600 transports the stack 84 including the remaining portion 83*a* and the support 42 which are attached to each other with the adhesive layer 32. For example, a multistage storage capable of storing a plurality of stacks 84 can be included so that the conveying mechanism 112 can convey the stacks 84 successively.

<<Starting Point Forming Unit>>

The starting point forming unit 700U includes the device for forming the separation starting point that is described in Embodiment 1. The starting point forming unit 700U cuts the processed member 83 while leaving part of the processed member 83, and thus forms the separation starting point that allows separation of the surface layer of the processed member 83.

<<Separating Unit>>

The separating unit 800 includes a mechanism for holding one surface layer of the processed member 83 and a mechanism for holding the other surface layer facing the one surface layer. Both mechanisms are pulled away from each other, whereby the one surface layer of the processed member 83 is separated to form the remaining portion 83*a*.

<<Attaching Unit>>

The attaching unit 900 includes a mechanism for forming the adhesive layer 32 and a bonding mechanism for attaching the remaining portion 83*a* and the support 42 to each other with the use of the adhesive layer 32.

Examples of the mechanism for forming the adhesive layer 32 include a dispenser for applying a liquid adhesive and a device feeding an adhesive sheet shaped as a sheet in advance.

Note that the adhesive layer 32 may be formed on the remaining portion 83*a* and/or the support 42. Specifically, the support 42 on which the adhesive layer 32 is formed in advance may be used.

Examples of the bonding mechanism for attaching the remaining portion 83*a* and the support include mechanisms for applying pressure that are controlled to apply a constant pressure or provide a uniform gap, such as a pair of rollers, a flat plate and a roller, and a pair of flat plates facing each other.

<<Support Feeding Unit>>

The support feeding unit 500 feeds the support 42. For example, the support feeding unit 500 unrolls a film which is fed in a rolled shape, cuts the film to a predetermined length, activates a surface of the film, and feeds the film as the support 42.

A method for manufacturing the stack 84 from the processed member 83 with the use of the stack processing apparatus 1000B is described below with reference to FIG. 4 and FIGS. 5A-1 to 5E-2.

Figures 1, 5A:
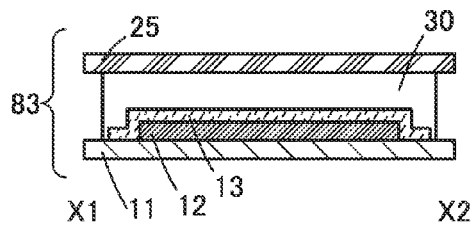
Figures 2, 5A:
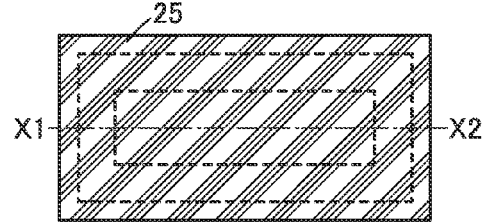
Figures 1, 5B:
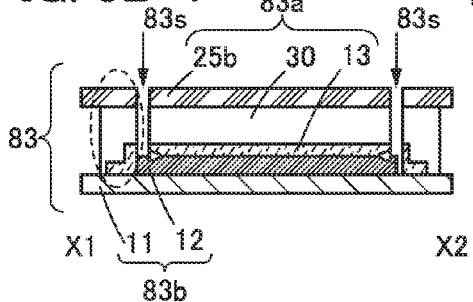
Figures 2, 5B:
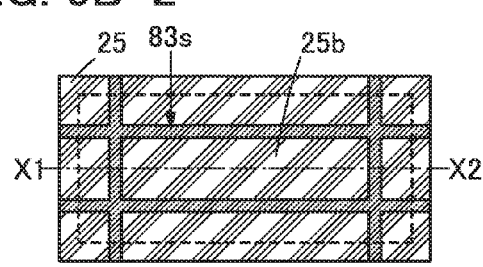

The processed member 83 includes the first substrate 11, the first separation layer 12 over the first substrate 11, the first layer 13 whose one surface is in contact with the first separation layer 12, the bonding layer 30 whose one surface is in contact with the other surface of the first layer 13, and the base 25 which is in contact with the other surface of the bonding layer 30 (see FIGS. 5A-1 and 5A-2). Detailed description of the structure of the processed member 83 is described in Embodiment 4.

<<First Step>>

The processed member 83 is conveyed to the loader unit 600. The loader unit 600 feeds the processed member 83 and the conveying mechanism 112 conveys the processed member 83.

<<Second Step>>

The processed member 83 is fed into the starting point forming unit 700U. The forming device in the starting point forming unit 700U cuts the base 25 from the base 25 side so that the first substrate 11 is left; that is, the processed member 83 is cut so that part of the processed member 83 is left. Thus, part of the first layer 13 that is in the vicinity of newly formed end portions of the bonding layer 30 is peeled from the first separation layer 12, so that the separation starting point 83s is formed (see FIGS. 5B-1 and 5B-2).

The starting point forming unit 700U feeds the processed member 83 provided with the separation starting point 83s, and the conveying mechanism 112 conveys the processed member 83.

<<Third Step>>

The processed member 83 provided with the separation starting point 83s is fed into the separating unit 800.

Figure 5C:
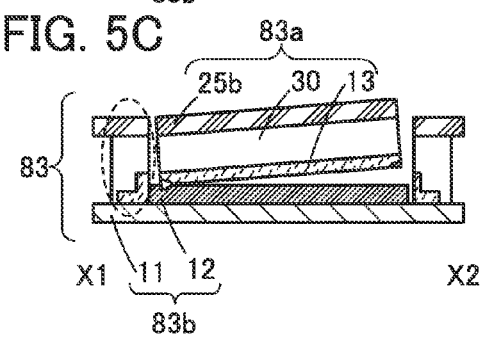
Figures 1, 5D:
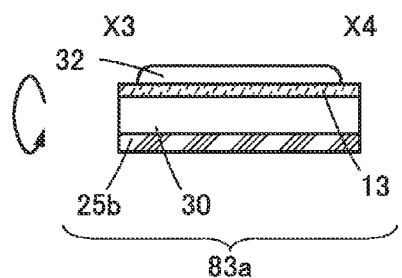
Figures 2, 5D:
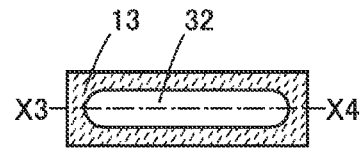
Figures 1, 5E:
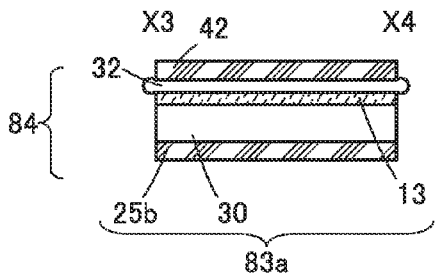
Figures 2, 5E:
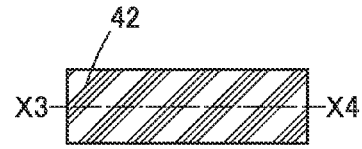

The separating unit 800 separates the one surface layer 83b of the processed member 83. Specifically, from the separation starting point 83s formed in the vicinity of a portion where the base 25 and the bonding layer 30 are cut, the base 25 is separated from the first separation layer 12 together with the first layer 13 (see FIG. 5C).

Through this step, the remaining portion 83a can be obtained from the processed member 83. Specifically, the remaining portion 83a includes the first layer 13, the bonding layer 30 whose one surface is in contact with the first layer 13, and the base 25b in contact with the other surface of the bonding layer 30.

The separating unit 800 feeds the remaining portion 83a, and the conveying mechanism 112 conveys the remaining portion 83a. The remaining portion 83a is fed into the cleaning device 850, and the cleaning device 850 cleans the fed remaining portion 83a.

<<Fourth Step>>

The conveying mechanism 112 conveys the remaining portion 83a, and the support feeding unit 500 feeds the support 42. The remaining portion 83a and the support 42 are fed into the attaching unit 900.

The attaching unit 900 forms the adhesive layer 32 on the fed remaining portion 83a (see FIGS. 5D-1 and 5D-2), and attaches the remaining portion 83a and the first support 42 to each other with the use of the adhesive layer 32.

Through this step, the stack 84 is obtained from the remaining portion 83a. Specifically, the stack 84 includes the support 42, the adhesive layer 32, the first layer 13, the bonding layer 30 whose one surface is in contact with the first layer 13, and the base 25b in contact with the other surface of the bonding layer 30 (see FIGS. 5E-1 and 5E-2).

The attaching unit 900 feeds the stack 84, and the conveying mechanism 112 conveys the stack 84.

<<Fifth Step>>

The conveying mechanism 112 conveys the stack 84, and the stack 84 is fed into the loader unit 600 also serving as the unloader unit.

Through this step, the stack 84 is ready to be transported.

<<Other Step>>

Note that when it takes time to cure the adhesive layer 32, the stack 84 in which the adhesive layer 32 is not cured yet is preferably transported to cure the adhesive layer 32 outside the stack processing apparatus 1000B, in which case occupancy time of the apparatus can be reduced.

<Modification Example 1>

A method for manufacturing the stack 84 from the processed member 83 with the use of the stack processing apparatus 1000B is described below with reference to FIG. 4 and FIGS. 6A-1 to 6E-2.

Note that a difference between the manufacturing method of the stack 84 described in Modification Example 1 of this embodiment and the above-described manufacturing method of the stack 84 lies in the method for cutting the processed member 83 so as to leave part of the processed member 83 that is used to form the separation starting point 83s in the vicinity of the end portions of the bonding layer 30. In the manufacturing method in Modification Example 1, the first substrate 11 is cut from the first substrate 11 side so that the base 25 is left.

FIGS. 6A-1, 6B-1, 6D-1, and 6E-1 on the left side are cross-sectional views illustrating structures of a processed member and a stack. FIGS. 6A-2, 6B-2, 6D-2, and 6E-2 on the right side are top views corresponding to the cross-sectional views.

Figures 1, 6A:
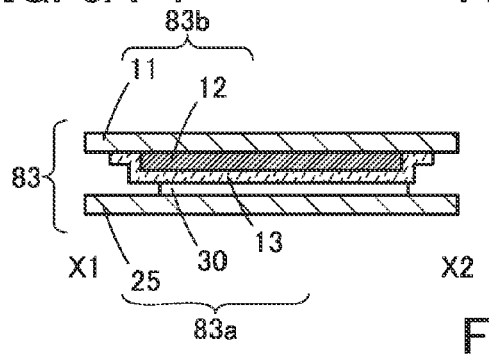
Figures 2, 6A:
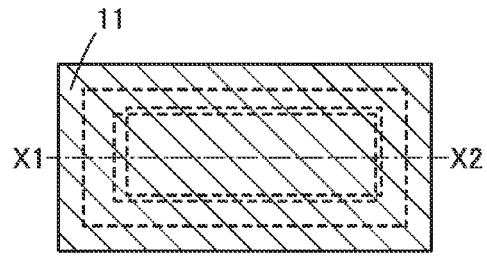
Figures 1, 6B:
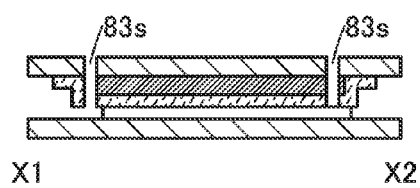
Figures 2, 6B:
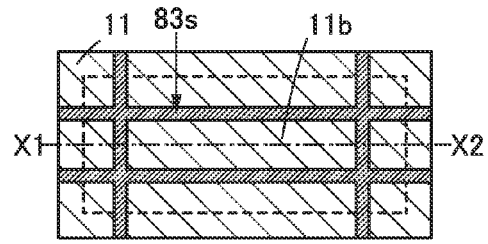

The processed member 83 includes the first substrate 11, the first separation layer 12 on the first substrate 11, the first layer 13 whose one surface is in contact with the first separation layer 12, the bonding layer 30 whose one surface is in contact with the other surface of the first layer 13, and the base 25 which is in contact with the other surface of the bonding layer 30 (see FIGS. 6A-1 and 6A-2). Detailed description of the structure of the processed member 83 is described in Embodiment 4.

<<First Step>>

The processed member 83 is conveyed to the loader unit 600. The loader unit 600 feeds the processed member 83 and the conveying mechanism 112 conveys the processed member 83.

<<Second Step>>

The processed member 83 is fed into the starting point forming unit 700U. The forming device in the starting point forming unit 700U cuts the first substrate 11 from the first substrate 11 side so that the base 25 is left; that is, the processed member 83 is cut so that part of the processed member 83 is left. Thus, part of the first layer 13 that is in the vicinity of newly formed end portions of the bonding layer 30 is peeled from the first separation layer 12, so that the separation starting point 83s is formed (see FIGS. 6B-1 and 6B-2).

The starting point forming unit 700U feeds the processed member 83 provided with the separation starting point 83s, and the conveying mechanism 112 conveys the processed member 83.

<<Third Step>>

The processed member 83 provided with the separation starting point 83s is fed into the separating unit 800.

Figure 6C:
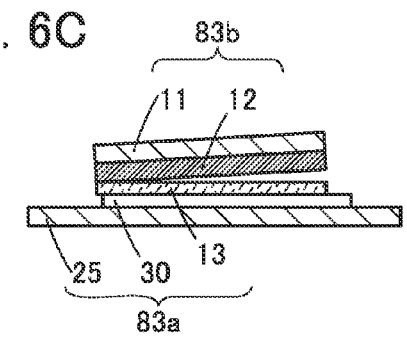
Figures 1, 6D:
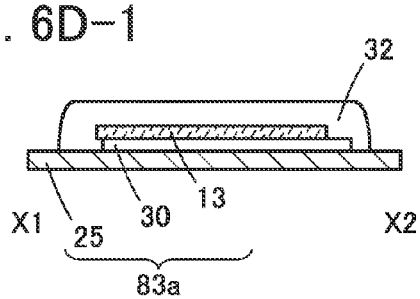
Figures 2, 6D:
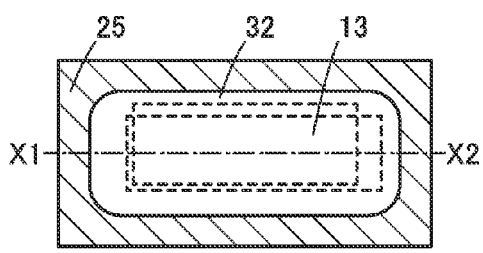
Figures 1, 6E:
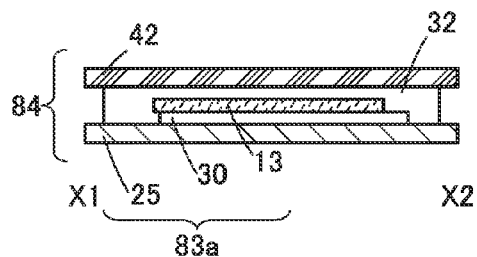
Figures 2, 6E:
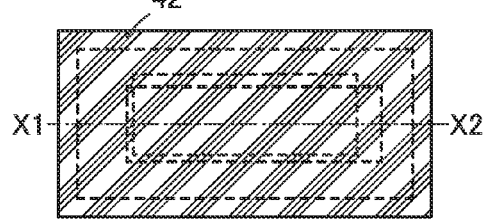

The separating unit 800 separates the one surface layer 83b of the processed member 83. Specifically, from the separation starting point 83s formed in the vicinity of the end portion of the bonding layer 30 in a portion where the first substrate 11 is cut, the base 25 is separated from the first layer 13 together with the first separation layer 12 (see FIG. 6C).

Through this step, the retraining portion 83a can be obtained from the processed member 83. Specifically, the remaining portion 83a includes the first layer 13, the bonding layer 30 whose one surface is in contact with the first layer 13, and the base 25 in contact with the other surface of the bonding layer 30

The separating unit 800 feeds the remaining portion 83a, and the conveying mechanism 112 conveys the remaining portion 83a.

<<Fourth Step>>

The support feeding unit 500 feeds the support 42. The remaining portion 83a and the support 42 are fed into the attaching unit 900.

The attaching unit 900 forms the adhesive layer 32 on the fed remaining portion 83a (see FIGS. 6D-1 and 6D-2), and attaches the remaining portion 83a and the support 42 to each other with the use of the adhesive layer 32.

Through this step, the stack 84 is obtained from the remaining portion 83a. Specifically, the stack 84 includes the support 42, the adhesive layer 32, the first layer 13, the bonding layer 30 whose one surface is in contact with the first layer 13, and the base 25 in contact with the other surface of the bonding layer 30 (see FIGS. 6E-1 and 6E-2).

The attaching unit 900 feeds the stack 84, and the conveying mechanism 112 conveys the stack 84.

<<Fifth Step>>

The conveying mechanism 112 conveys the stack 84, and the stack 84 is fed into the loader unit 600 also serving as the unloader unit.

Through this step, the stack 84 is ready to be transported.

<<Other Step>>

Note that when it takes time to cute the adhesive layer 32, the stack 84 in which the adhesive layer 32 is not cured yet is preferably transported to cure the adhesive layer 32 outside the stack processing apparatus 1000B, in which case occupancy time of the apparatus can be reduced.

This embodiment can be combined with any of the other embodiments in this specification as appropriate.

(Embodiment 3)

In this embodiment, description is given of a structure of a stack manufacturing apparatus that is one embodiment of the present invention with reference to FIG. 7, FIGS. 8A-1 to 8E-2, and FIGS. 9A-1 to 9E-2.

Figure 7:
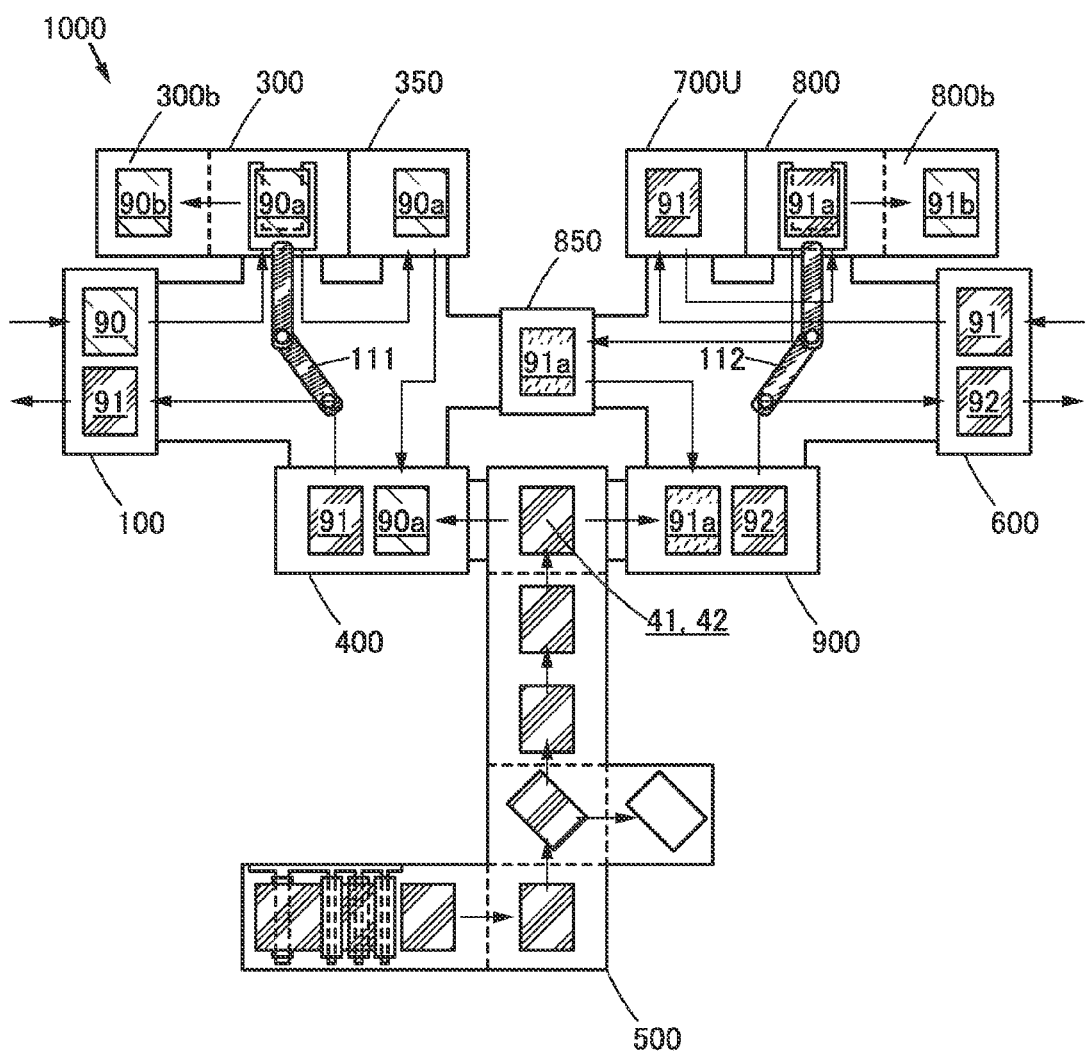
FIG. 7 is a schematic view illustrating a structure of a stack manufacturing apparatus of one embodiment.

FIG. 7 is a schematic diagram illustrating a structure of a stack manufacturing apparatus 1000 that is one embodiment of the present invention, and the conveyance path of a processed member and a stack in a process.

FIGS. 8A-1 to 14E-2 and FIGS. 9A-1 to 9E-2 are schematic views illustrating a process for manufacturing a stack with the use of the stack manufacturing apparatus 1000 that is one embodiment of the present invention. FIGS. 8A-1, 8B-1, 8D-1, and 8E-1 and FIGS. 9A-1, 9D-1, and 9E-1 on the left side are cross-sectional views illustrating structures of a processed member and a stack. FIGS. 8A-2, 8B-2, 8D-2, and 8E-2 and FIGS. 9A-2, 9D-2, and 9E-2 on the right side are top views corresponding to the cross-sectional views.

The stack processing apparatus 1000 in this embodiment includes a first loader unit 100, a first separating unit 300, a first attaching unit 400, the support feeding unit 500, the second loader unit 600, the starting point forming unit 700U, the second separating unit 800, and the second attaching unit 900.

The first loader unit 100 can feed a processed member 90. Note that the first loader unit 100 can also serve as a first unloader unit.

The first separating unit 300 separates one surface layer 90b of the processed member 90 to form a first remaining portion 90a (see FIG. 7 and FIGS. 8A-1, 8A-2, 8B-1, 8B-2, and 8C).

The first attaching unit 400 is fed with the first remaining portion 90a and the first support 41, and attaches the first support 41 to the first remaining portion 90a with the use of a first adhesive layer 31 (see FIG. 7 and FIGS. 8D-1, 8D-2, 8E-1, and 8E-2).

The support feeding unit 500 feeds the first support 41 and the second support 42 (see FIG. 7).

The first loader unit 100 also serving as the first unloader unit is fed with and transports a stack 91 including the first remaining portion 90a and the first support 41 that are attached to each other with the first adhesive layer 31 (see FIG. 7, FIG. 8E-1, and FIG. 8E-2).

The second loader unit 600 can be fed with and feed the stack 91. Note that the second loader unit 600 can also serve as a second unloader unit.

Figures 1, 9A:
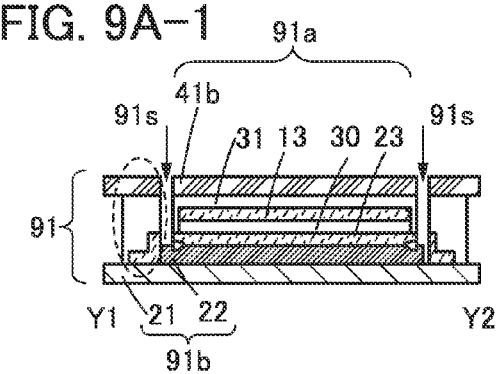
Figures 2, 9A:
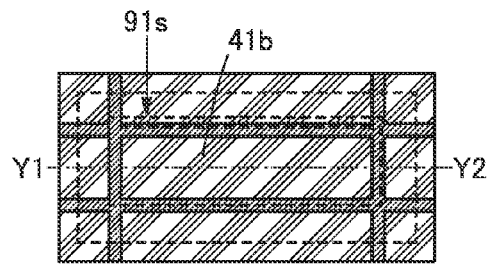

The starting point forming unit 700U forms separation starting points 91s in the vicinity of end portions of the first remaining portion 90a and a first support 41b in the stack 91 (see FIGS. 9A-1 and 9A-2).

Figure 9B:
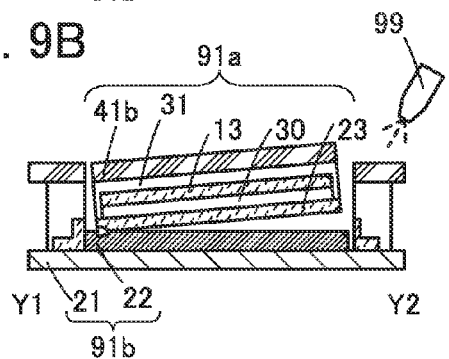

The second separating unit 800 separates one surface layer 91b of the stack 91 to form a second remaining portion 91a (see FIGS. 9A-1 and 9B).

The second attaching unit 900 is fed with the second support 42, and attaches the second support 42 to the second remaining portion 91a with the use of the second adhesive layer 32 (see FIGS. 9D-1, 9D-2, 9E-1, and 9E-2).

The second loader unit 600 also serving as the second unloader unit transports a stack 92 including the second remaining portion 91a and the second support 42 that are attached to each other with the second adhesive layer 32 (see FIG. 7 and FIGS. 9E-1 and 9E-2).

The stack manufacturing apparatus in this embodiment includes the first loader unit 100 that feeds the processed member 90 and transports the stack 91 including the first remaining portion 90a and the first support 41 attached to each other with the first adhesive layer 31; the first separating unit 300 that separates the first remaining portion 90a; the first attaching unit 400 that attaches the first support 41 to the first remaining portion 90a; and the support feeding unit 500 that feeds the first support 41 and the second support 42; the second loader unit 600 that feeds the stack 91 and transports the stack 92 including the second remaining portion 91a and the second support 42 attached to each other with the second adhesive layer 32; the starting point forming unit 700U that for us a separation starting point; the second separating unit 800 that separates the second remaining portion 91a; and the second attaching unit 900 that attaches the second support 42 to the second remaining portion 91a. This structure makes it possible to separate the both surface layer of the processed member 90 to form the second remaining portion 91a, and attach the first support 41 and the second support 42. Consequently, a novel manufacturing apparatus of the stack 92 including the second remaining portion 91a of the processed member, the first support 41, and the second support 42 can be provided.

Furthermore, the stack processing apparatus 1000 in this embodiment includes a first storage portion 300b, the second storage portion 800b, a first cleaning device 350, the second cleaning device 850, a conveying mechanism 111, the conveying mechanism 112, and the like.

The first storage portion 300b stores the one surface layer 90b separated from the processed member 90.

The second storage portion 800b stores the one surface layer 91b separated from the stack 91.

The first cleaning device 350 cleans the first remaining portion 90a obtained from the processed member 90.

The second cleaning device 850 cleans the second remaining portion 91a obtained from the stack 91.

The conveying mechanism 111 conveys the processed member 90, the first remaining portion 90a obtained from the processed member 90, and the stack 91.

The conveying mechanism 112 conveys the stack 91, the second remaining portion 91a obtained from the stack 91, and the stack 92.

The following describes individual components included in the stack manufacturing apparatus that is one embodiment of the present invention.

<<First Loader Unit>>

The first loader unit 100 can be fed with and feed the processed member 90. For example, to allow the conveying mechanism 111 to convey a plurality of processed members 90 successively, a multistage storage capable of storing the plurality of processed members 90 can be included.

Furthermore, the first loader unit 100 in this embodiment also serves as the first unloader unit. The first loader unit 100 transports the stack 91 including the first remaining portion 90a, the first adhesive layer 31, and the first support 41 attached to the first remaining portion 90a with the first adhesive layer 31. For example, to allow the conveying mechanism 111 to convey a plurality of stacks 91 successively, a multistage storage capable of storing the plurality of stacks 91 can be included.

<<First Separating Unit>>

The first separating unit 300 includes a mechanism for holding one surface layer of the processed member 90 and a mechanism for holding the other surface layer facing the one surface layer. Both mechanisms are pulled away from each other, whereby the one surface layer of the processed member 90 is separated to form the first remaining portion 90a.

<<First Attaching Unit>>

The first attaching unit 400 includes a mechanism for forming the first adhesive layer 31 and a bonding mechanism for attaching the first remaining portion 90a and the first support 41 with the first adhesive layer 31 provided therebetween.

Examples of the mechanism for forming the first adhesive layer 31 include a dispenser for applying a liquid adhesive, screen printing, and a device feeding an adhesive sheet shaped as a sheet in advance.

Note that the first adhesive layer 31 may be formed on the first remaining portion 90a and/or the first support 41. Specifically, the first support 41 on which the sheet-like first adhesive layer 31 is formed in advance may be used.

Examples of the bonding mechanism for attaching the first remaining portion 90a and the first support include mechanisms for applying pressure that are controlled to apply a constant pressure or provide a uniform gap, such as a pair of rollers, a flat plate and a roller, and a pair of flat plates facing each other.

<<Support Feeding Unit>>

The support feeding unit 500 feeds the first support 41. For example, the support feeding unit 500 includes a sheet feeding portion in which a stack of a film and a protective film fed in a rolled shape is unrolled and cut to a predetermined length, a positioning portion in which the cut film is placed at a predetermined position, a separation portion in which the protective film is peeled from the film, a pretreatment portion in which the surface of the film from which the protective film is removed is cleaned and/or activated, and a delivery chamber which feeds the cleaned and/or activated film as the first support 41.

<<Second Loader Unit>>

The second loader unit 600 can have the same structure as the first loader unit.

Furthermore, the second loader unit 600 in this embodiment also serves as the second unloader unit.

<<Starting Point Forming Unit>>

The starting point forming unit 700U includes the forming device 700 described in Embodiment 1.

The starting point forming unit 700U includes a cutting mechanism which cuts the first support 41 and the first adhesive layer 31 and separates part of a second layer 23 to be separated (hereinafter simply referred to as the second layer 23) from a second separation layer 22, for example.

Specifically, the cutting mechanism includes one or a plurality of blades which have a sharp tip, and relatively moves the blade to the stack 91.

<<Second Separating Unit>>

The second separating unit 800 includes a mechanism for holding one surface layer of the stack 91 and a mechanism for holding the other surface layer facing the one surface layer. Both mechanisms are pulled away from each other, whereby the one surface layer of the stack 91 is separated to form the second remaining portion 91a.

<<Second Attaching Unit>>

The second attaching unit 900 includes a mechanism for forming the second adhesive layer 32 and a bonding mechanism for attaching the second remaining portion 91a and the second support 42 to each other with the use of the second adhesive layer 32.

The mechanism for forming the second adhesive layer 32 can have a structure similar to that of the first attaching unit 400.

Note that the second adhesive layer 32 may be formed on the second remaining portion 91a and/or the second support 42. Specifically, the second support 42 on which the second adhesive layer 32 is formed in advance may be used.

The bonding mechanism for attaching the second remaining portion 91a and the second support 42 to each other can have a structure similar to that of the first attaching unit 400.

<Manufacturing Method of Stack>

A method for manufacturing the stack 92 from the processed member 90 with the use of the stack manufacturing apparatus 1000 is described below with reference to FIG. 7, FIGS. 8A-1 to 8E-2, and FIGS. 9A-1 to 9E-2.

Figures 1, 8A:
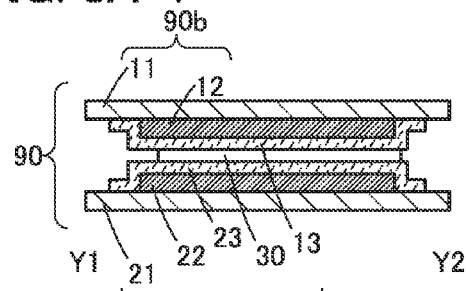
Figures 2, 8A:
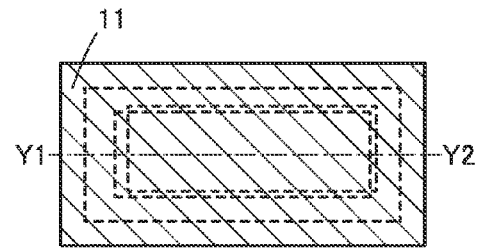
Figures 1, 8B:
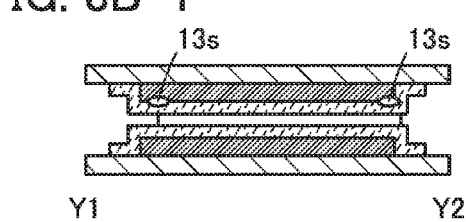
Figures 2, 8B:
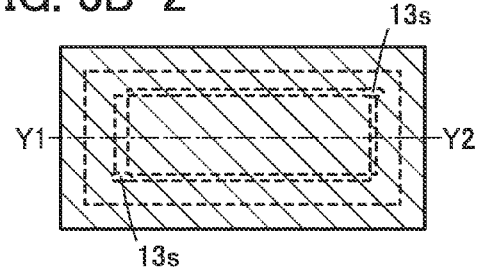

The processed member 90 includes the first substrate 11, the first separation layer 12, the first layer 13 whose one surface is in contact with the first separation layer 12, the bonding layer 30 whose one surface is in contact with the other surface of the first layer 13, the second layer 23 whose one surface is in contact with the other surface of the bonding layer 30, the second separation layer 22 whose one surface is in contact with the other surface of the second layer 23, and a second substrate 21 in this order (see FIGS. 8A-1 and 8A-2). Note that in this embodiment, description is given of a case of using the processed member 90 in which the separation starting points 13s are formed in advance in the vicinity of end portions of the bonding layer 30 (see FIGS. 8B-1 and 8B-2). Note that the detailed description of the structure of the processed member 90 is described in Embodiment 4.

<<First Step>>

The processed member 90 in which the separation starting points 13s are provided in the vicinity of the end portions of the bonding layer 30 is prepared.

The separation starting point 13s is formed by separating part of the first layer 13 from the first substrate 11.

For example, part of the first layer 13 can be separated from the first separation layer 12 by inserting a sharp tip into the first layer 13 from the first substrate 11 side or by a method using laser or the like (e.g., a laser ablation method). Accordingly, the separation starting point 13s can be formed.

For example, the processed member 90 in which the separation starting point 13s are formed is prepared. The processed member 90 is fed from the first loader unit 100 to the first separating unit 300 by being conveyed with the conveying mechanism 111.

<<Second Step>>

The first separating unit 300 separates the one surface layer 90b of the processed member 90. As a result, the first remaining portion 90a is obtained from the processed member 90.

Figure 8C:
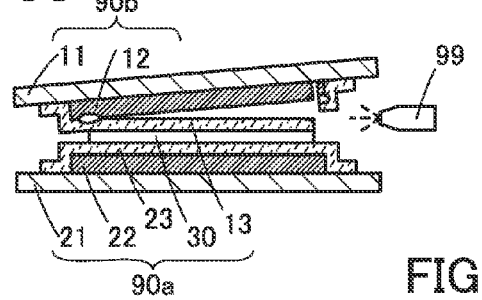

Specifically, from the separation starting point 13s formed in the vicinity of the end portion of the bonding layer 30, the first substrate 11 and the first separation layer 12 are separated from the first layer 13 (see FIG. 8C). Through this step, the first remaining portion 90a including the first layer 13, the bonding layer 30 whose one surface is in contact with the first layer 13, the second layer 23 whose one surface is in contact with the other surface of the bonding layer 30, the second separation layer 22 whose one surface is in contact with the other surface of the second layer 23, and the second substrate 21 in this order is obtained.

Note that the separation may be performed while the vicinity of the interface between the first separation layer 12 and the first layer 13 is irradiated with ions to remove static electricity. Specifically, the ions may be generated by an ionizer.

Furthermore, separation of the first layer 13 from the first separation layer 12 may be performed by injecting a liquid into the interface between the first layer 13 and the first separation layer 12. Alternatively, the liquid may be ejected and sprayed by a nozzle 99. For example, as the liquid injected or sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing a tungsten oxide is used as the first separation layer 12 it is preferable that the first layer 13 be separated while a liquid containing water is injected or sprayed because a stress applied to the first layer 13 due to the separation can be reduced.

The transfer mechanism 112 can transfer and feed the first remaining portion 90a. The first cleaning device 350 fed with the first remaining portion 90a can clean and feed the first remaining portion 90a.

<<Third Step>>

The first adhesive layer 31 is formed on the first remaining portion 90a (see FIGS. 8D-1 and 8D-2) and the first remaining portion 90a is bonded to the first support 41 with the first adhesive layer 31. Through this step, the first stack 91 is obtained from the first remaining portion 90a.

Figures 1, 8D:
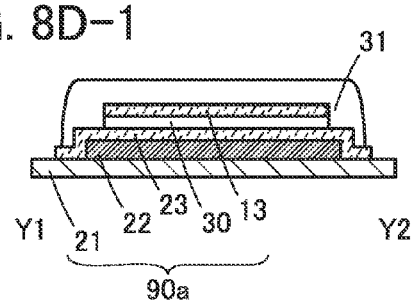
Figures 2, 8D:
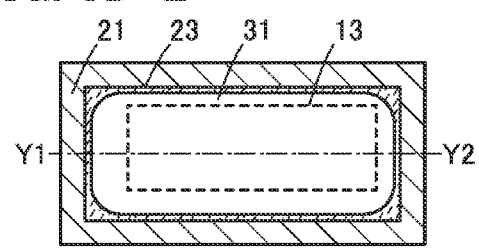
Figures 1, 8E:
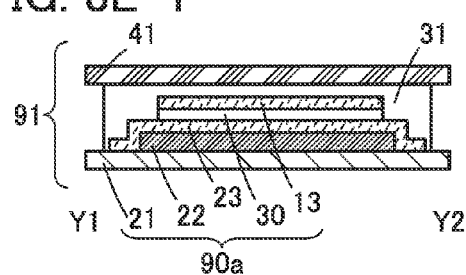
Figures 2, 8E:
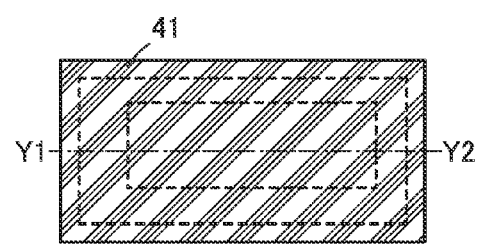

Specifically, the first stack 91 including the first support 41, the first adhesive layer 31, the first layer 13, the bonding layer 30 whose one surface is in contact with the first layer 13, the second layer 23 whose one surface is in contact with the other surface of the bonding layer 30, the second separation layer 22 whose one surface is in contact with the other surface of the second layer 23, and the second substrate 21 in this order is obtained (see FIGS. 8E-1 and 8E-2).

The conveying mechanism 111 conveys the first remaining portion 90a, and the support feeding unit 500 feeds the first support 41. The first attaching unit 400 is fed with the first remaining portion 90a and the first support 41, and attaches the first remaining portion 90a and the first support 41 to each other with the use of the first adhesive layer 31.

<<Fourth Step>>

The conveying mechanism 111 conveys the first stack 91, and the first loader unit 100 also serving as the first unloader unit is fed with the first stack 91 and transports the first stack 91.

Note that when it takes time to cure the first adhesive layer 31, the first stack 91 in which the first adhesive layer 31 is not cured yet can be transported to cure the first adhesive layer 31 outside the stack processing apparatus 1000. Thus, occupancy time of the apparatus can be reduced.

<<Fifth Step>>

The first stack 91 is prepared. The first stack 91 is conveyed to the second loader unit 600. The first stack 91 is fed from the second loader unit 600 to the starting point forming unit 700U by being conveyed with the conveying mechanism 112 see FIG. 7).

<<Sixth Step>>

The starting point forming unit 700U peels part of the second layer 23 in the vicinity of the end portion of the first adhesive layer 31 of the stack 91 from the second substrate 21 to form the separation starting points 91s. The forming device in the starting point forming unit 700U cuts the first support 41 and the first adhesive layer 31 from the first support 41 side so that the second substrate 21 is left; thus, part of the stack 91 is left.

Specifically, the first adhesive layer 31 and the first support 41 in a region which is over the second separation layer 22 and in which the second layer 23 is provided are cut with a blade or the like including a sharp tip, and along a newly formed end portion of the first adhesive layer 31, the second layer 23 is partly separated from the second substrate 21 (see FIGS. 9A-1 and 9A-2).

Through this step, the separation starting points 91s are formed in the vicinity of newly formed end portions of the first support 41b and the first adhesive layer 31.

For example, part of the second layer 23 in the vicinity of the end portion of the first adhesive layer 31 of the stack 91 is peeled from the second substrate 21 to form the separation starting points 91s.

<<Seventh Step>>

Figure 9C:
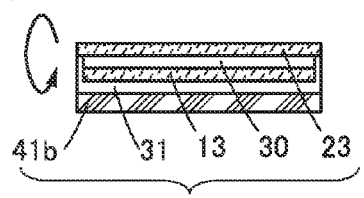
Figures 1, 9D:
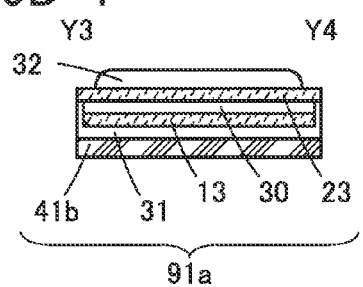
Figures 2, 9D:
Figures 1, 9E:
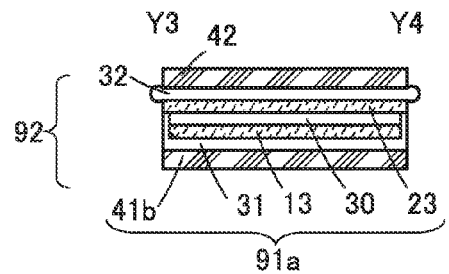
Figures 2, 9E:
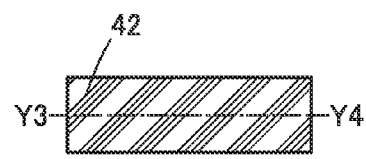

The second remaining portion 91a is separated from the first stack 91. Thus, the second remaining portion 91a is obtained from the first stack 91 (see FIG. 9C). Specifically, from the separation starting point 91s formed in the vicinity of the end portion of the first adhesive layer 31, the second substrate 21 is separated from the second layer 23 together with the second separation layer 22. Thus, the second remaining portion 91a including the first support 41b, the first adhesive layer 31, the first layer 13, the bonding layer 30 whose one surface is in contact with the first layer 13, and the second layer 23 whose one surface is in contact with the other surface of the bonding layer 30 in this order is obtained.

Note that the separation may be performed while the vicinity of the interface between the second separation layer 22 and the second layer 23 is irradiated with ions to remove static electricity. Specifically, the ions may be generated by an ionizer.

Furthermore, separation of the second layer 23 from the second separation layer 22 may be performed by injecting a liquid into the interface between the second layer 23 and the second separation layer 22. Alternatively, the liquid may be ejected and sprayed by the nozzle 99. For example, as the liquid injected or sprayed, water, a polar solvent, or the like can be used.

By injecting the liquid, an influence of static electricity and the like generated with the separation can be reduced. Alternatively, the separation may be performed while a liquid that dissolves the separation layer is injected.

In particular, in the case where a film containing a tungsten oxide is used as the second separation layer 22, it is preferable that the second layer 23 be separated while a liquid containing water is injected or sprayed because a stress applied to the second layer 23 due to the separation can be reduced.

<<Eighth Step>>

The conveying mechanism 112 conveys the second remaining portion 91a, and turns the second remaining portion 91a so that the second layer 23 faces upward. In the second cleaning device 850, the fed second remaining portion 91a is cleaned.

The conveying mechanism 112 conveys the second remaining portion 91a, and the support feeding unit 500 feeds the second support 12.

Note that the second remaining portion 91a may be directly fed into the second attaching unit 900 without being fed into the second cleaning device 850.

<<Ninth Step>>

The second attaching unit 900 forms the second adhesive layer 32 on the fed second remaining portion 91a (see FIGS. 8D-1 and 8D-2).

The second attaching unit 900 attaches the second remaining portion 91a to the second support 42 with the use of the second adhesive layer 32. Through this step, the second stack 92 is obtained from the second remaining portion 91a (see FIGS. 8E-1 and 8E-2).

Specifically, the second stack including the first support 41b, the first adhesive layer 31, the first layer 13, the bonding layer 30 whose one surface is in contact with the first layer 13, the second layer 23 whose one surface is in contact with the other surface of the bonding layer 30, the second adhesive layer 32, and the second support 42 in this order is obtained.

<<Tenth Step>>

The conveying mechanism 112 conveys the second stack 92, and the second loader unit 600 also serving as the second unloader unit is fed with the second stack 92 and transports the second stack 92.

<Modification Example>

In the modification example of this embodiment, a method for manufacturing the stack 92 from the processed member 90 with the use of the stack processing apparatus 1000, which is different from the above-described method, is described with reference to FIGS. 8A-1 to 8E-2, FIGS. 9A-1 to 9E-2, and FIG. 10.

Figure 10:
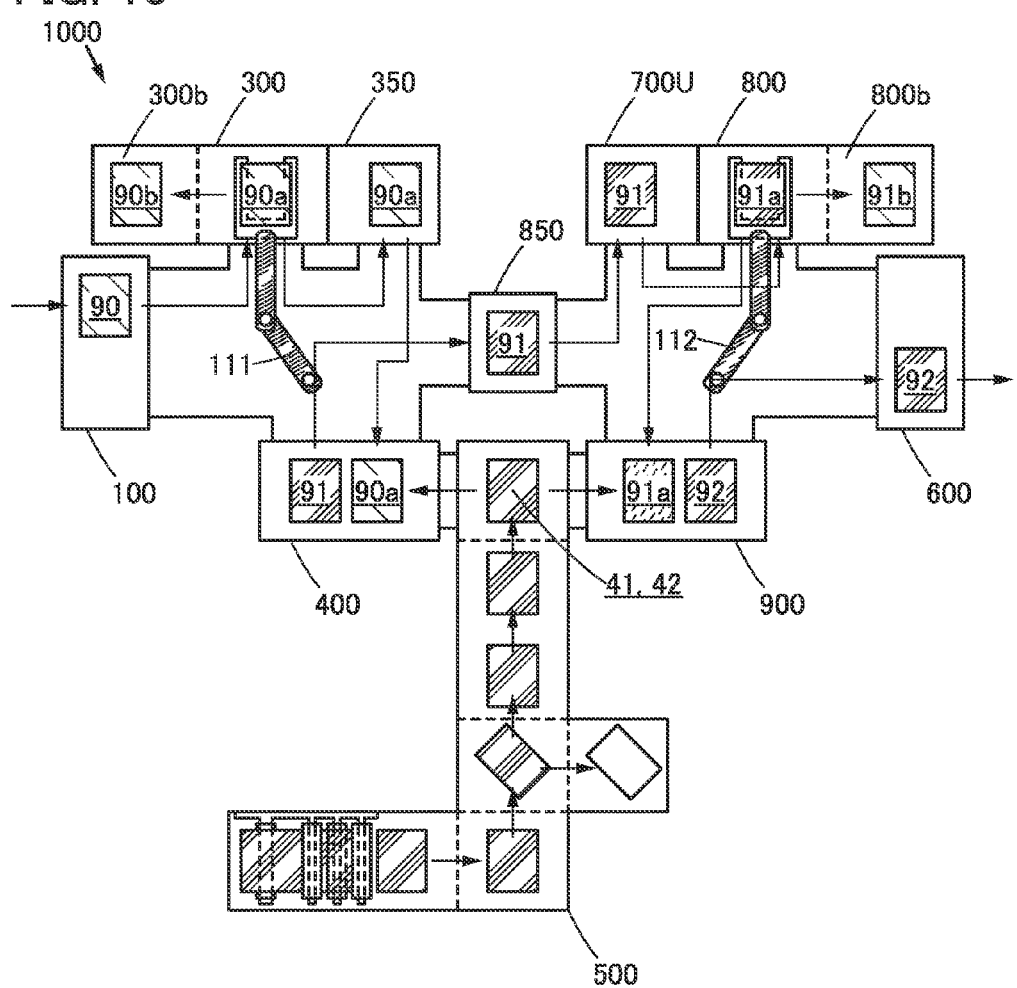
FIG. 10 is a schematic view illustrating a structure of a stack manufacturing apparatus of one embodiment.

FIG. 10 is a schematic diagram illustrating a structure of the stack processing apparatus 1000 that is one embodiment of the present invention, and the conveyance path of a processed member and a stack in a process.

Specifically, the differences between the method in this modification example and the above-described method are as follows: in the fourth step, the conveying mechanism 111 conveys the first stack 91 and the first stack 91 is fed into the second cleaning device 850; in the fifth step, the conveying mechanism 112 conveys the first stack 91 and the first stack 91 is fed into the starting point forming unit 700U; and in the eighth step, the second remaining portion 91a is fed into the second attaching unit 900. Thus, different portions will be described in detail below. Refer to the above description for portions where the same methods can be employed.

<Modification Example of Fourth Step>

The conveying mechanism 111 conveys the stack 91 and the stack 91 is fed into the second cleaning device 850.

In the modification example of this embodiment, the second cleaning device 850 is used as a delivery chamber in which the conveying mechanism 111 delivers the stack 91 to the conveying mechanism 112 (see FIG. 10).

The use of the second cleaning device 850 as a delivery chamber enables the first stack 91 to be continuously processed without being transported from the stack processing apparatus 1000.

<Modification Example of Fifth Step>

The conveying mechanism 112 conveys the stack 91, and the stack 91 is fed into the starting point forming unit 700U.

<<Modification Example of Eighth Step>>

The conveying mechanism 112 conveys the second remaining portion 91a, and turns the second remaining portion 91a so that the second layer 23 faces upward. The second remaining portion 91a is fed into the second attaching unit 900.

<Manufacturing Method of Stack Including Opening>

A manufacturing method of a stack including an opening in a support is described with reference to FIGS. 20A-1 to 20D-2.

FIGS. 20A-1 to 20D-2 illustrate the manufacturing method of a stack including an opening which exposes part of a layer to be separated in a support. In FIGS. 20A-1 to 20D-2, cross-sectional views of a structure of a stack are illustrated on the left side, and top views corresponding to the cross sectional views are illustrated on the right side.

FIGS. 20A-1 to 20B-2 illustrate a method for manufacturing a second stack 92c having an opening by using a second support 42b which is smaller than the first support 41b.

FIGS. 20C-1 to 20D-2 illustrate a method for manufacturing a second stack 92d having an opening formed in the second support 42.

<<Example 1 of Manufacturing Method of Stack Including Opening in a Support>>

A manufacturing method of a stack has the same step as the above ninth step except that the second support 42b which is smaller than the first support 41b is used instead of the second support 42. By the manufacturing method, a stack in which part of the second layer 23 is exposed can be manufactured (see FIGS. 20A-1 and 20A-2).

A liquid adhesive can be used as the second adhesive layer 32. Alternatively, an adhesive whose fluidity is inhibited and which is formed in a single wafer shape in advance (also referred to as a sheet-like adhesive) can be used. By using the sheet-like adhesive, the amount of part of the adhesive layer 32 that extends beyond the second support 42b can be small. In addition, the adhesive layer 32 can have uniform thickness easily.

Figures 1, 20A:
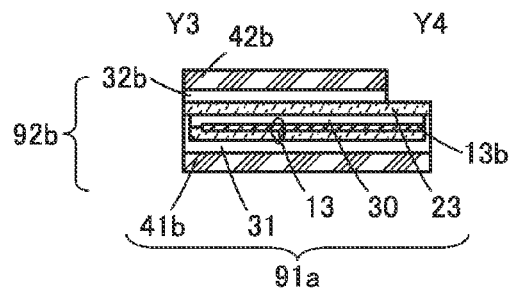
Figures 2, 20A:
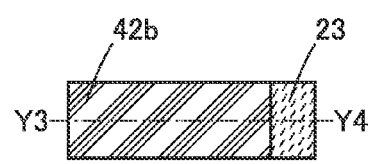
Figures 1, 20B:
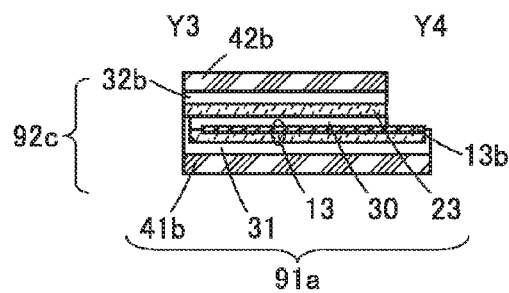
Figures 2, 20B:
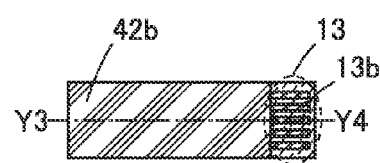
Figures 1, 20C:
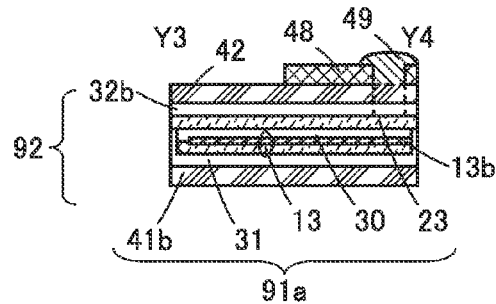
Figures 2, 20C:

Alternatively, part of the exposed part of the second layer 23 is cut off, and the first layer 13 may be exposed (see FIGS. 20B-1 and 20B-2).

Specifically, with a blade or the like which has a sharp tip, a slit is formed in the exposed second layer 23. Then, for example, an adhesive tape or the like is attached to part of the exposed second layer 23 to concentrate stress near the slit, and the part of the exposed second layer 23 is separated together with the attached tape or the like, whereby the part of the second layer 23 can be selectively removed.

Moreover, a layer which can suppress the bonding power of the bonding layer 30 to the first layer 13 may be selectively formed on part of the first layer 13. For example, a material which is not easily bonded to the bonding layer 30 may be selectively formed. Specifically, an island-shaped organic material may be deposited. Thus, part of the bonding layer 30 can be selectively removed together with the second layer 23 easily. As a result, the first layer 13 can be exposed.

Note that for example, in the case where the first layer 13 includes a functional layer and the conductive layer 13b electrically connected to the functional layer, the conductive layer 13b can be exposed in an opening in the second stack 92c. Thus, the conductive layer 13b exposed in the opening can be used as a terminal that can be supplied with and supply a signal.

As a result, the conductive layer 13b part of which is exposed in the opening can be used as a terminal that can extract a signal supplied by the functional layer. Alternatively, the conductive layer 13b can be used as a terminal that can be supplied with a signal from an external device.

<<Example 2 of Manufacturing Method of Stack Including Opening in a Support>>

A mask 48 having an opening formed to overlap with an opening formed in the second support 42 is formed on the second stack 92. Next, a solvent 49 is dropped into the opening in the mask 48. Thus, with the solvent 49, the second support 42 exposed in the opening in the mask 48 can be swelled or dissolved (see FIGS. 20C-1 and 20C-2).

After the extra solvent 49 is removed, stress is applied by rubbing the second support 42 exposed in the opening in the mask 48 or the like. Thus, the second support 42 or the like in a portion overlapping with the opening in the mask 48 can be removed.

Figures 1, 20D:
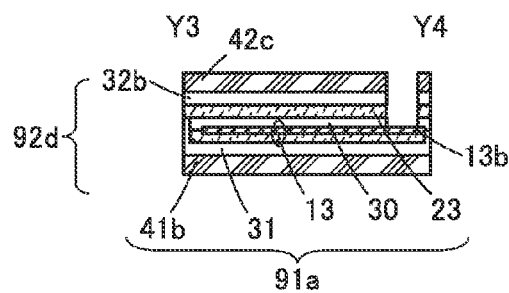
Figures 2, 20D:
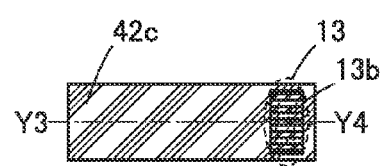

Moreover, with a solvent with which the bonding layer 30 is swelled or dissolved, the first layer 13 can be exposed (see FIGS. 20D-1 and 20D-2).

This embodiment can be combined with any of the other embodiments in this specification as appropriate.

(Embodiment 4)

In this embodiment, a structure of a processed member that can be used for the stack manufacturing apparatus that is one embodiment of the present invention is described with reference to FIGS. 11A-1 to 11C-2.

FIGS. 11A-1 to 11C-2 are schematic views illustrating a structure of a processed member that can be used to form a stack with the use of the stack manufacturing apparatus that is one embodiment of the present invention.

Figures 1, 11A:
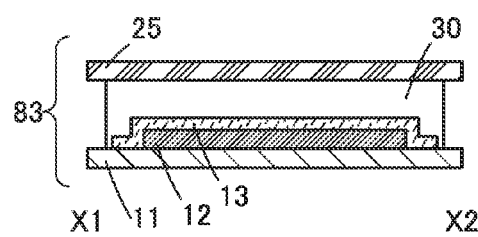
Figures 2, 11A:
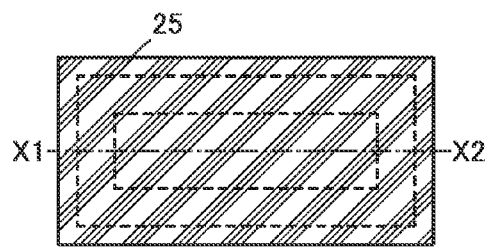

FIG. 11A-1 is a cross-sectional view illustrating a structure of the processed member 83, and FIG. 11A-2 is a top view corresponding to the cross-sectional view.

Figures 1, 11B:
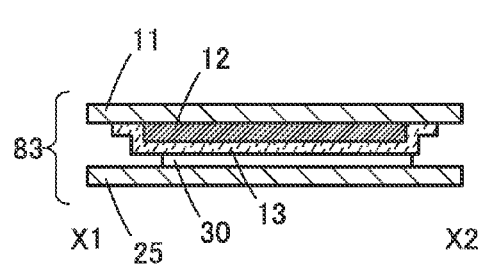
Figures 2, 11B:
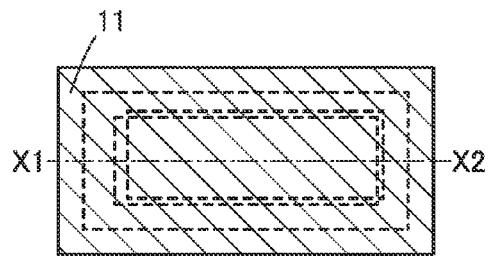

FIG. 11B-1 is a cross-sectional view illustrating another structure of the processed member 83, and FIG. 11B-2 is a top view corresponding to the cross-sectional view.

Figures 1, 11C:
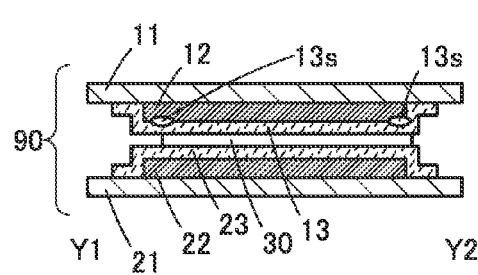
Figures 2, 11C:
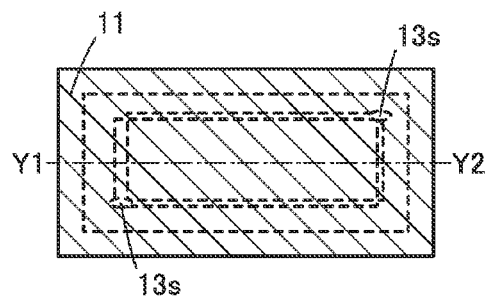

FIG. 11C-1 is a cross-sectional view illustrating a structure of the processed member 90, and FIG. 11C-2 is a top view corresponding to the cross-sectional view.

<Example 1 of Processed Member>

The processed member 83 includes the first substrate 11, the first separation layer 12 on the first substrate 11, the first layer 13 whose one surface is in contact with the first separation layer 12, the bonding layer 30 whose one surface is in contact with the other surface of the first layer 13, and the base 25 which is in contact with the other surface of the bonding layer 30 (FIGS. 11A-1 and 11A-2 and FIGS. 11B-1 and 11B-2), <Example 2 of Processed Member>

The processed member 90 includes the first substrate 11, the first separation layer 12 on the first substrate 11, the first layer 13 whose one surface is in contact with the first separation layer 12, the bonding layer 30 whose one surface is in contact with the other surface of the first layer 13, the second layer 23 whose one surface is in contact with the other surface of the bonding layer 30, the second separation layer 22 whose one surface is in contact with the other surface of the second layer 23, and the second substrate 21 in contact with the other surface of the second separation layer 22 (FIGS. 11C-1 and 11C-2).

Note that the separation starting points 13s may be provided in the vicinity of the end portions of the bonding layer 30.

Components of each of the stacks described in this embodiment are described below.

<<First Substrate>>

There is no particular limitation on the first substrate 11 as long as the first substrate 11 has heat resistance high enough to withstand a manufacturing process and a thickness and a size which can be used in a manufacturing apparatus.

Examples of a material that can be used for the first substrate 11 include glass, a ceramic, a metal, an inorganic material, and a resin.

Specifically, as the glass, non-alkali glass, soda-lime glass, potash glass, crystal glass, or the like can be given. As the metal, SUS, aluminum, or the like can be given.

The first substrate 11 may have a single-layer structure, a stacked-layer structure, or the like. For example, a stacked-layer structure including a base and an insulating layer that prevents diffusion of impurities contained in the base may be employed. Specifically, a structure can be employed in which glass and various base layers that prevent diffusion of impurities contained in the glass, such as a silicon oxide layer, a silicon nitride layer, and a silicon oxynitride layer, are stacked.

<<First Separation Layer>>

There is no particular limitation on the first separation layer 12 as long as the first separation layer 12 can be used to separate the first layer 13 formed thereon and has heat resistance high enough to withstand the manufacturing process.

As a material that can be used for the first separation layer 12, an inorganic material, an organic material, or the like can be given.

Specific examples of the inorganic material include a metal, an alloy, a compound, and the like that contain any of the following elements: tungsten, molybdenum, titanium, tantalum, niobium, nickel, cobalt, zirconium, zinc, ruthenium, rhodium, palladium, osmium, iridium, and silicon.

Specific examples of the organic material include polyimide, polyester, polyolefin, polyamide, polycarbonate, an acrylic resin, and the like.

The first separation layer 12 may have a single-layer structure, a stacked-layer structure, or the like. For example, a stacked-layer structure including a layer containing tungsten and a layer containing an oxide of tungsten can be employed.

The layer containing an oxide of tungsten may be formed by stacking another layer with a layer containing tungsten; for example, the layer containing an oxide of tungsten may be formed by stacking a film containing oxygen, such as a silicon oxide film or a silicon oxynitride film, with a layer containing tungsten.

The layer containing an oxide of tungsten may be formed by performing thermal oxidation treatment, oxygen plasma treatment, nitrous oxide ($N_2O$) plasma treatment, treatment with a solution having strong oxidizing power (e.g., ozone water), or the like on a surface of a layer containing tungsten.

<<First layer to be Separated>>

There is no particular limitation on the first layer 13 as long as the first layer 13 can be separated from the first separation layer 12 and has heat resistance high enough to withstand the manufacturing process.

As a material that can be used for layer 13, an inorganic material, an organic material, or the like can be given.

The first layer 13 may have a single-layer structure, a stacked-layer structure, or the like. For example, a structure may be employed in which a functional layer overlapping with the first separation layer 12 and an insulating layer that is provided between the first separation layer 12 and the functional layer to prevent diffusion of impurities which impair the characteristics of the functional layer are stacked.

Specifically, a structure can be employed in which a silicon oxynitride layer, a silicon nitride layer, and the functional layer are stacked in this order over the first separation layer 12.

Examples of the functional layer that can be used for the first layer 13 include a functional circuit, a functional element, an optical element, and a functional film; and a layer including a plurality of layers selected from the above examples. Specific examples are a pixel circuit of a display, device, a driver circuit of the display device, a display element, a color filter, and a moisture-proof film; and a layer including a plurality of layers selected from the above examples.

<<Bonding Layer>>

There is no particular limitation on the bonding layer 30 as long as the bonding layer 30 bonds the first layer 13 and the base 25 to each other.

As a material that can be used for the bonding layer 30, an inorganic material, an organic resin, or the like can be given.

Specifically, a glass layer with a melting point of 400° C. or lower, preferably 300° C. or lower, an adhesive, or the like can be used.

Examples of the adhesive that can be used for the bonding layer 30 include a light curable adhesive such as a UV curable adhesive, a reactive curable adhesive, a heat curable adhesive, and an anaerobic adhesive.

Examples of such adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin.

<<Base>>

There is no particular limitation on the base 25 as long as the base 25 has heat resistance high enough to withstand a manufacturing process and a thickness and a size which can be used in a manufacturing apparatus.

A material of the base 25 can be the same as that of the first substrate 11, for example.

<<Separation Starting Point>>

In the processed member 90, the separation starting points 13s may be provided in the vicinity of the end portions of the bonding layer 30.

The separation starting points 13s are formed by peeling part of the first layer 13 from the first separation layer 12 side.

The separation starting points 13s can be formed by inserting a sharp tip into the first layer 13 from the first substrate 11 side; alternatively, the separation starting points 13s can be formed by peeling part of the first layer 13 from the first separation layer 12 by a noncontact method using a laser or the like (e.g., a laser ablation method).

<<Second Substrate>>

As the second substrate 21, the same substrate as the first substrate 11 can be used. Alternatively, the second substrate 21 and the first substrate 11 do not need to have the same structure.

<<Second Separation Layer>>

As the second separation layer 22, the same layer as the first separation layer 12 can be used. Alternatively, the second separation layer 22 and the first separation layer 12 do not need to have the same structure.

<<Second Layer to be Separated>>

The second layer 23 can have the same structure as the first layer 13. Alternatively, the second layer 23 can have a structure different from that of the first layer 13.

For example, a structure may be employed in which the first layer 13 includes a functional circuit and the second layer 23 includes a functional layer that prevents diffusion of impurities into the functional circuit.

Specifically, a structure may be employed in which the first layer 13 includes a pixel circuit of a display device, a driver circuit of the display device, and a light-emitting element that is connected to the pixel circuit and emits light to the second layer, and the second layer 23 includes a color filter and a moisture-proof film.

This embodiment can be combined with any of the other embodiments in this specification as appropriate.

(Embodiment 5)

In this embodiment, description is given of an example of a flexible light-emitting device (light-emitting panel) that can be manufactured with the use of any of the stack manufacturing apparatuses described in Embodiments 2 and 3.

<Specific Example 1>

Figure 12A:
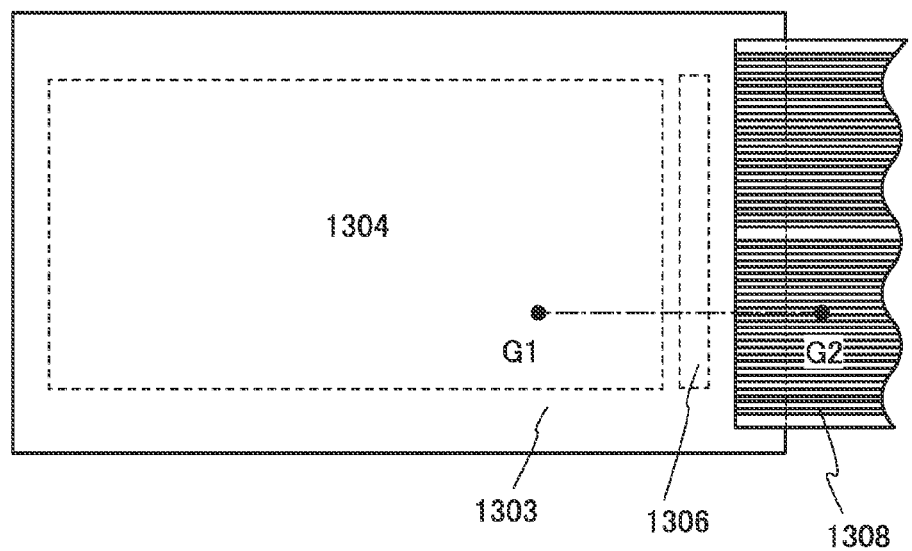
FIGS. 12A and 12B illustrate a light-emitting panel of one embodiment.
Figure 16A:
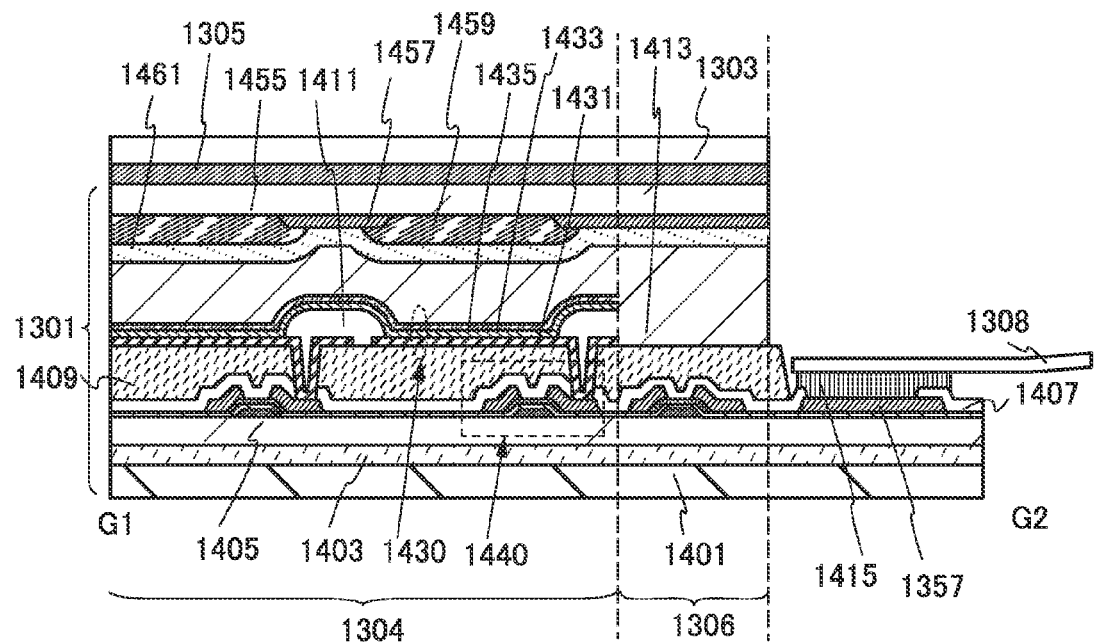
FIGS. 16A and 16B each illustrate light-emitting panel of one embodiment.

FIG. 12A is a plan view of a flexible light-emitting panel, and FIG. 123 is an example of a cross-sectional view taken along dashed-dotted line G1-G2 in FIG. 12A. In addition, examples of another cross-sectional view are illustrated in FIGS. 16A and 163.

Figure 12B:
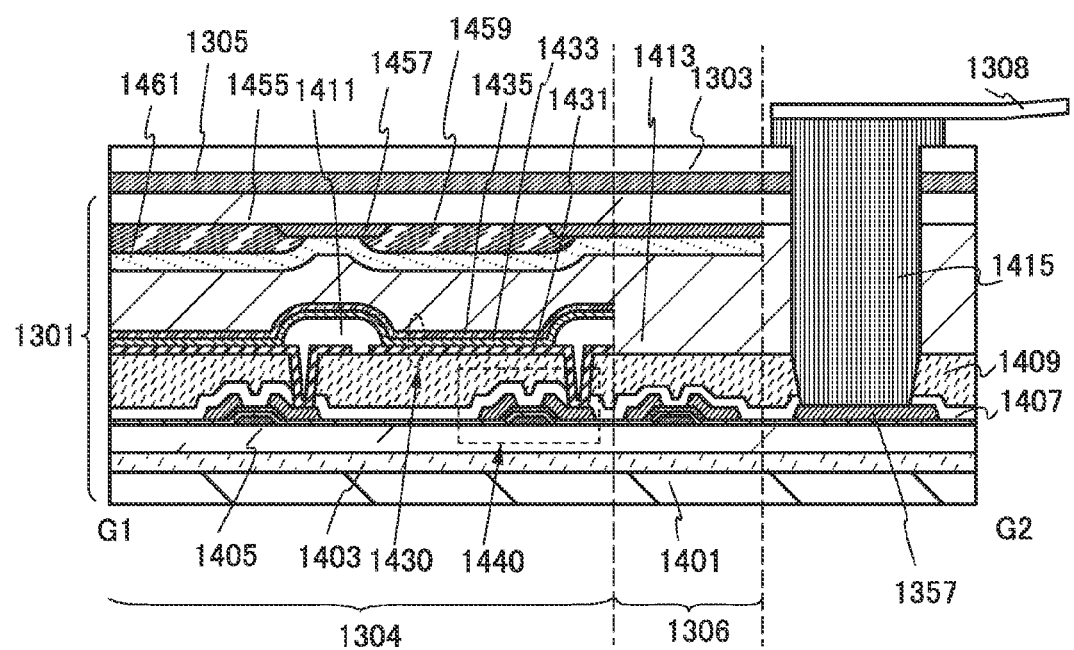

The light-emitting panel illustrated in FIG. 12B includes an element layer 1301, an adhesive layer 1305, and a substrate 1303. The element layer 1301 includes a substrate 1401, an adhesive layer 1403, an insulating layer 1405, a transistor 1440, a conductive layer 1357, an insulating layer 1407, an insulating layer 1409, a light-emitting element 1430, an insulating layer 1411, a sealing layer 1413, an insulating layer 1461, a coloring layer 1459, a light-blocking layer 1457, and an insulating layer 1455.

The conductive layer 1357 is electrically connected to an FPC 1308 via a connector 1415.

The light-emitting element 1430 includes a lower electrode 1431, an EL layer 1433, and an upper electrode 1435. The lower electrode 1431 is electrically connected to a source electrode or a drain electrode of the transistor 1440. An end portion of the lower electrode 1431 is covered with the insulating layer 1411. The light-emitting element 1430 has a top emission structure. The upper electrode 1435 has a light-transmitting property and transmits light emitted from the EL layer 1433.

Figure 16B:
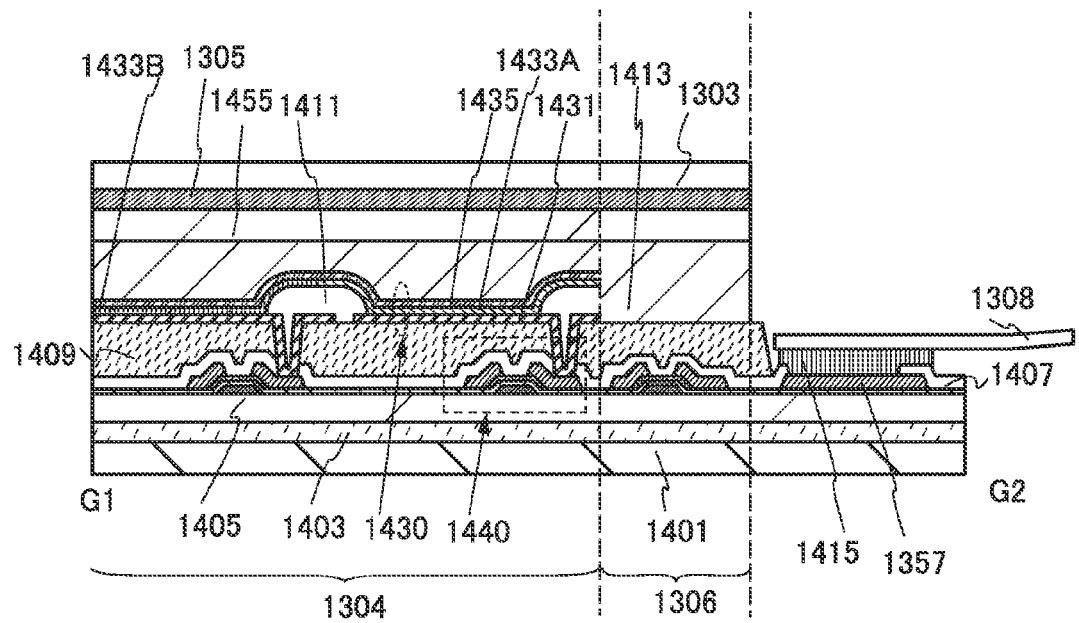

Note that as illustrated in FIG. 16B, with the use of an EL layer 1433A and an EL layer 1433B, the EL layers may be separately provided for each pixel. In this case, different colors are emitted in the pixels; therefore, the coloring layer 1459 is not necessarily provided.

The coloring layer 1459 is provided to overlap with the light-emitting element 1430, and the light-blocking layer 1457 is provided to overlap with the insulating layer 1411. The coloring layer 1459 and the light-blocking layer 1457 are covered with the insulating layer 1461. A space between the light-emitting element 1430 and the insulating layer 1461 is filled with the sealing layer 1413.

The light-emitting panel includes a plurality of transistors in a light extraction portion 1304 and a driver circuit portion 1306. The transistor 1440 is provided over the insulating layer 1405. The insulating layer 1405 and the substrate 1401 are attached to each other with the adhesive layer 1403. The insulating layer 1455 and the substrate 1303 are attached to each other with the adhesive layer 1305. It is preferable to use films with low water permeability for the insulating layer 1405 and the insulating layer 1455, in which case an impurity such as water can be prevented from entering the light-emitting element 1430 or the transistor 1440, leading to improved reliability of the light-emitting panel. The adhesive layer 1403 can be formed using a material similar to that of the adhesive layer 1305.

The light-emitting panel in Specific Example 1 can be manufactured in the following manner: the insulating layer 1405, the transistor 1440, and the light-emitting element 1430 are formed over a formation substrate with high heat resistance; the formation substrate is separated; and the insulating layer 1405, the transistor 1440, and the light-emitting element 1430 are transferred to the substrate 1401 and attached thereto with the adhesive layer 1403. The light-emitting panel in Specific Example 1 can be manufactured in the following manner: the insulating layer 1455, the coloring layer 1459, and the light-blocking layer 1457 are formed over a formation substrate with high heat resistance; the formation substrate is separated; and the insulating layer 1455, the coloring layer 1459, and the light-blocking layer 1457 are transferred to the substrate 1303 and attached thereto with the adhesive layer 1305.

In the case where a material with high water permeability and low heat resistance (e.g., resin) is used for a substrate, it is impossible to expose the substrate to high temperature in the manufacturing process. Thus, there is a limitation on conditions for forming a transistor and an insulating film over the substrate. In the manufacturing method of this embodiment, a transistor and the like can be formed over a formation substrate having high heat resistance; thus, a highly reliable transistor and an insulating film with sufficiently low water permeability can be formed. Then, the transistor and the insulating film are transferred to the substrate 1303 or the substrate 1401, whereby a highly reliable light-emitting panel can be manufactured. Thus, with one embodiment of the present invention, a thin or/and lightweight light-emitting device with high reliability can be provided. Details of the manufacturing method will be described later.

The substrate 1303 and the substrate 1401 are each preferably formed using a material with high toughness. Thus, a display device with high impact resistance that is less likely to be broken can be provided. For example, when the substrate 1303 is an organic resin substrate and the substrate 1401 is a substrate formed using a thin metal material or a thin alloy material, a light-emitting panel that is more lightweight and less likely to be broken as compared with the case where a glass substrate is used can be provided.

A metal material and an alloy material, which have high thermal conductivity, are preferred because they can easily conduct heat to the whole substrate and accordingly can prevent a local temperature rise in the light-emitting panel. The thickness of a substrate using a metal material or an alloy material is preferably greater than or equal to 10 μm and less than or equal to 200 μm, further preferably greater than or equal to 20 μm and less than or equal to 50 μm.

Further, when a material with high thermal emissivity is used for the substrate 1401, the surface temperature of the light-emitting panel can be prevented from rising, leading to prevention of breakage or a decrease in reliability of the light-emitting panel. For example, the substrate 1401 may have a stacked-layer structure of a metal substrate and a layer with high thermal emissivity (the layer can be formed using a metal oxide or a ceramic material, for example).

<Specific Example 2>

Figure 13A:
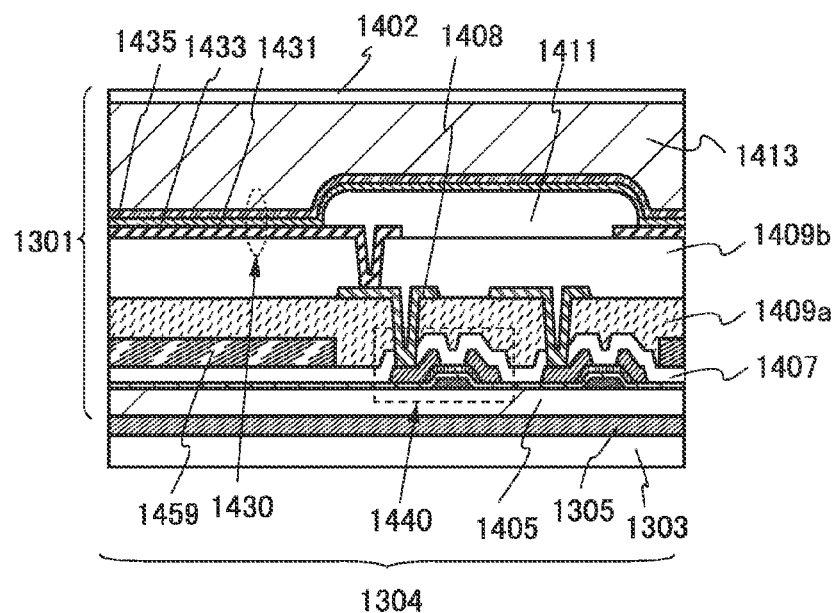
FIGS. 13A and 13B illustrate a light-emitting panel of one embodiment.

FIG. 13A illustrates another example of the light extraction portion 1304 in the light-emitting panel, The light extraction portion 1304 illustrated in FIG. 13A includes the substrate 1303, the adhesive layer 1305, a substrate 1402, the insulating layer 1405, the transistor 1440, the insulating layer 1407, a conductive layer 1408, an insulating layer 1409a, an insulating layer 1409b, the light-emitting element 1430, the insulating layer 1411, the sealing layer 1413, and the coloring layer 1459.

The light-emitting element 1430 includes the lower electrode 1431, the EL layer 1433, and the upper electrode 1435. The lower electrode 1431 is electrically connected to the source electrode or the drain electrode of the transistor 1440 via the conductive layer 1408. An end portion of the lower electrode 1431 is covered with the insulating layer 1411. The light-emitting element 1430 has a bottom emission structure. The lower electrode 1431 has a light-transmitting property and transmits light emitted from the EL layer 1433.

The coloring layer 1459 is provided to overlap with the light-emitting element 1430, and light emitted from the light-emitting element 1430 is extracted from the substrate 1303 side through the coloring layer 1459. A space between the light-emitting element 1430 and the substrate 1402 is filled with the sealing layer 1413. The substrate 1402 can be formed using a material similar to that of the substrate 1401.

<Specific Example 3>

Figure 13B:
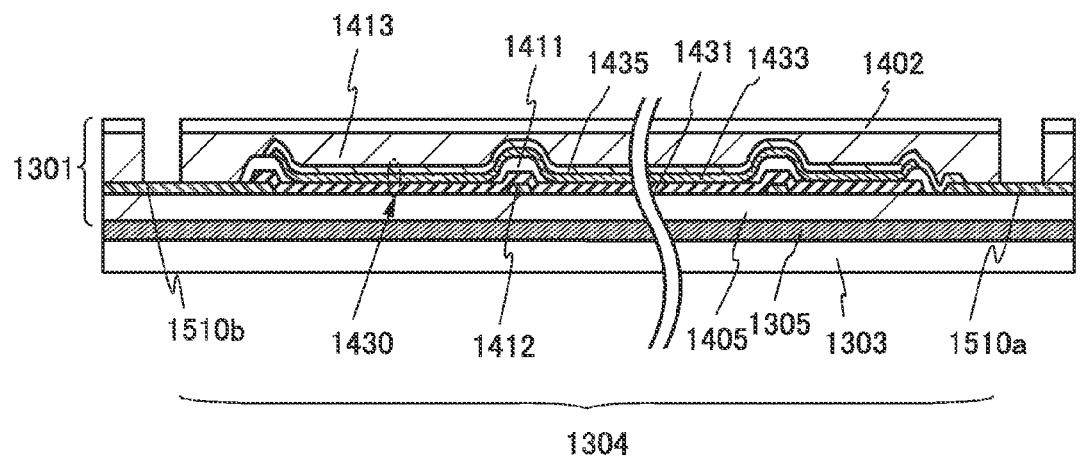

FIG. 13B illustrates another example of the light-emitting panel.

The light-emitting panel illustrated in FIG. 13B includes the element layer 1301, the adhesive layer 1305, and the substrate 1303. The element layer 1301 includes the substrate 1402, the insulating layer 1405, a conductive layer 1510a, a conductive layer 1510b, a plurality of light-emitting elements, the insulating layer 1411, a conductive layer 1412, and the sealing 1413.

The conductive layer 1510a and the conductive layer 1510b, which are external connection electrodes of the light-emitting panel, can each be electrically connected to an FPC or the like.

The light-emitting element 1430 includes the lower electrode 1431, the EL layer 1433, and the upper electrode 1435. An end portion of the lower electrode 1431 is covered with the insulating layer 1411. The light-emitting element 1430 has a bottom emission structure. The lower electrode 1431 has a light-transmitting property and transmits light emitted from the EL layer 1433. The conductive layer 1412 is electrically connected to the lower electrode 1431.

The substrate 1303 may have, as a light extraction structure, a hemispherical lens, a micro lens array, a film provided with an uneven surface structure, a light diffusing film, or the like. For example, a light extraction structure can be formed by attaching the above lens or film to a resin substrate with an adhesive or the like having substantially the same refractive index as the substrate or the lens or film.

The conductive layer 1412 is preferably, though not necessarily, provided because voltage drop due to the resistance of the lower electrode 1431 can be inhibited. In addition, for a similar purpose, a conductive layer electrically connected to the upper electrode 1435 may be provided over the insulating layer 1111.

The conductive layer 1412 can be a single layer or a stacked layer formed using a material selected from copper, titanium, tantalum, tungsten, molybdenum, chromium, neodymium, scandium, nickel, or aluminum, an alloy material containing any of these materials as its main component, or the like. The thickness of the conductive layer 1412 can be greater than or equal to 0.1 μm and less than or equal to 3 μm, preferably greater than or equal to 0.1 μm and less than or equal to 0.5 μm.

When a paste (e.g., silver paste) is used as a material for the conductive layer electrically connected to the upper electrode 1435, metal particles forming the conductive layer aggregate; therefore, the surface of the conductive layer is rough and has many gaps. Thus, it is difficult for the EL layer 1133 to completely cover the conductive layer; accordingly, the upper electrode and the conductive layer are electrically connected to each other easily, which is preferable.

<Examples of Materials>

Next, materials and the like that can be used for the light-emitting panel are described. Note that description of the components already described in this embodiment is omitted.

The element layer 1301 includes at least a light-emitting element. As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The element layer 1301 may further include a transistor for driving light-emitting element, a touch sensor, or the like.

The structure of the transistors in the light-emitting panel is not particularly limited. For example, a forward staggered transistor or an inverted staggered transistor may be used. A top-gate transistor or a bottom-gate transistor may be used. A semiconductor material used for the transistors is not particularly limited, and for example, silicon or germanium can be used. Alternatively, an oxide semiconductor containing at least one of indium, gallium, and zinc, such as an In—Ga—Zn-based metal oxide, may be used.

There is no particular limitation on the state of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be particularly used, in which case deterioration of the transistor characteristics can be suppressed.

The light-emitting element included in the light-emitting panel includes a pair of electrodes (the lower electrode 1431 and the upper electrode 1435); and the EL layer 1433 between the pair of electrodes. One of the pair of electrodes functions as an anode and the other functions as a cathode.

The light-emitting element may have any of a top emission structure, a bottom emission structure, and a dual emission structure. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stack of any of the above materials can be used as the conductive film. For example, a stacked film of ITO and an alloy of silver and magnesium is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Lanthanum, neodymium, germanium, or the like may be added to the metal material or the alloy. An alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, palladium, and, copper or an alloy of silver and magnesium can be used for the conductive film. An alloy of silver and copper is preferable because of its high heat resistance. Furthermore, when a metal film or a metal oxide film is stacked in contact with an aluminum alloy film, oxidation of the aluminum alloy film can be inhibited. Examples of a material for the metal film or the metal oxide film are titanium and titanium oxide. Alternatively, the above conductive film that transmits visible light and a film containing a metal material may be stacked. For example, a stacked film of silver and ITO or a stacked film of an alloy of silver and magnesium and ITO can be used.

Each of the electrodes can be formed by an evaporation method or a sputtering method. Alternatively, a discharging method such as an inkjet method, a printing method such as a screen printing method, or a plating method may be used.

When a voltage higher than the threshold voltage of the light-emitting element is applied between the lower electrode 1431 and the upper electrode 1435, holes are injected to the EL layer 1433 from the anode side and electrons are injected to the EL layer 1433 from the cathode side. The injected electrons and holes are recombined in the EL 1433 and a light-emitting substance contained in the EL layer 1433 emits light.

The EL layer 1433 includes at least a light-emitting layer. In addition to the light-emitting layer, the EL layer 1433 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron-transport property and a hole-transport property), and the like.

For the EL layer 1433, either a low molecular compound or a high molecular compound can be used, and an inorganic compound may also be used. Each of the layers included in the EL layer 1433 can be formed by any of the following methods: an evaporation method (including a vacuum evaporation method), a transfer method, a printing method, an inkjet method, a coating method, and the like.

In the element layer 1301, the light-emitting element is preferably provided between a pair of insulating films with low water permeability. Thus, an impurity such as water can be inhibited from entering the light-emitting element, leading to inhibition of a decrease in the reliability of the light-emitting device.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like can be used.

For example, the water vapor transmittance of the insulating film with low water permeability is lower than or equal to $1 \times 10^{-5}$ [g/m$^2$·day], preferably lower than or equal to $1 \times 10^{-6}$ [g/m$^2$·day], further preferably lower than or equal to $1 \times 10^{-7}$ [g/m$^2$·day], still further preferably lower than or equal to $1 \times 10$ [g/m$^2$·day].

The substrate 1303 has a light-transmitting property and transmits at least light emitted from the light-emitting element included in the element layer 1301. The substrate 1303 has flexibility. The refractive index of the substrate 1303 is higher than that of the air.

An organic resin, which has a specific gravity smaller than that of glass, is preferably used for the substrate 1303, in which case the light-emitting device can be more light-weight as compared with the case where glass is used.

Examples of a material having flexibility and a light-transmitting property with respect to visible light include glass that is thin enough to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose thermal expansion coefficient is low is preferred, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used.

The substrate 1303 may have a stacked-layer structure of a layer of any of the above-described materials and a hard coat layer (e.g., a silicon nitride layer) which protects a surface of the light-emitting device from damage or the like, a layer (e.g., an aramid resin layer) which can disperse pressure, or the like. Furthermore, to suppress a decrease in the lifetime of the light-emitting element due to moisture and the like, the insulating film with low water permeability may be included in the stacked structure.

The adhesive layer 1305 has a light-transmitting property and transmits at least light emitted from the light-emitting element included in the element layer 1301. The refractive index of the adhesive layer 1305 is higher than that of the air.

For the adhesive layer 1305, a resin that is curable at room temperature a two-component-mixture-type resin), a light curable resin, a thermosetting resin, or the like can be used. Examples of such resins include an epoxy resin, an acrylic resin, a silicone resin, and a phenol resin. In particular, a material with low moisture permeability, such as an epoxy resin, is preferred.

The resin may include a drying agent. For example, a substance that adsorbs moisture by chemical adsorption, such as oxide of an alkaline earth metal (e.g., calcium oxide or barium oxide), can be used. Alternatively, a substance that adsorbs moisture by physical adsorption, such as zeolite or silica, gel, may be used. The drying agent is preferably included because it can inhibit an impurity such as moisture from entering the light-emitting element, thereby improving the reliability of the light-emitting device.

In addition, it is preferable to mix a filler with a high refractive index (e.g., titanium oxide) into the resin, in which case the efficiency of light extraction from the light-emitting element can be improved.

The adhesive layer 1305 may also include a scattering member for scattering light. For example, the adhesive layer 1305 can be a mixture of the above-described resin and particles having a refractive index different from that of the resin. The particles function as the scattering member for scattering light.

The difference in refractive index between the resin and the particles with a refractive index different from that of the resin is preferably 0.1 or more, further preferably 0.3 or more. Specifically, an epoxy resin, an acrylic resin, an imide resin, a silicone resin, or the like can be used as the resin, and titanium oxide, barium oxide, zeolite, or the like can be used as the particles.

Particles of titanium oxide or barium oxide are preferable because they scatter light excellently. When zeolite is used, it can adsorb water contained in the resin and the like, thereby improving the reliability of the light-emitting element.

The insulating layer 1405 and the insulating layer 1455 can each be formed using an inorganic insulating material. It is particularly preferable to use the insulating film with low water permeability, in which case a highly reliable light-emitting panel can be provided.

The insulating layer 1407 has an effect of inhibiting diffusion of impurities into a semiconductor included in the transistor. As the insulating layer 1407, an inorganic insulating film such as a silicon oxide film, a silicon oxynitride film, or an aluminum oxide film can be used.

As each of the insulating layers 1409, 1409*a*, and 1409*b*, an insulating film with a planarization function is preferably selected in order to reduce surface unevenness due to the transistor or the like. For example, an organic material such as a polyimide resin, an acrylic resin, or a benzocyclobutene-based resin can be used. Other than such organic materials, it is also possible to use a low-dielectric constant material (a low-k material) or the like. Note that a plurality of insulating films formed of these materials or inorganic insulating films may be stacked.

The insulating layer 1411 is provided to cover an end portion of the lower electrode 1431. In order that the insulating layer 1411 be favorably covered with the EL layer 1433 and the upper electrode 1435 formed thereover, a side wall of the insulating layer 1411 preferably has a tilted surface with continuous curvature.

As a material for the insulating layer 1411, a resin or an inorganic insulating material can be used. As the resin, for example, a polyimide resin, a polyamide resin, an acrylic resin, a siloxane resin, an epoxy resin, or a phenol resin can be used. In particular, either a negative photosensitive resin or a positive photosensitive resin is preferably used for easy formation of the insulating layer 1411.

There is no particular limitation on the method for forming the insulating layer 1411; a photolithography method, a sputtering method, an evaporation method, a droplet discharging method (e.g., an inkjet method), a printing method (e.g., a screen printing method or an off-set printing method), or the like may be used.

For the sealing layer 1413, a resin that is curable at room temperature (e.g., a two-component-mixture-type resin), a light curable resin, a thermosetting resin, or the like can be used. For example, a polyvinyl chloride (PVC) resin, an acrylic resin, a polyimide resin, an epoxy resin, a silicone resin, a polyvinyl butyral (PVB) resin, an ethylene vinyl acetate (EVA) resin, or the like can be used. A drying agent may be contained in the sealing layer 1413. In the case where light emitted from the light-emitting element 1430 is extracted outside through the sealing layer 1413, the sealing layer 1413 preferably includes a filler with a high refractive index or a scattering member. Materials for the drying agent, the filler with a high refractive index, and the scattering member are similar to those that can be used for the adhesive layer 1305.

The conductive layer 1357 can be formed using the same material and the same step as a conductive layer included in the transistor or the light-emitting element. For example, the conductive layer can be formed to have a single-layer structure or a stacked-layer structure using any of metal materials such as molybdenum, titanium, chromium, tantalum, tungsten, aluminum, copper, neodymium, and scandium, and an alloy material containing any of these elements. Each of the conductive layers may be formed using a conductive metal oxide. As the conductive metal oxide, indium oxide (e.g., $In_2O_3$), tin oxide (e.g., $SnO_2$), zinc oxide (ZnO), ITO, indium zinc oxide (e.g., $In_2O_3$—ZnO) or any of these metal oxide materials in which silicon oxide is contained can be used.

Each of the conductive layers 1408, 1412, 1510a, and 1510b can also be formed using any of the above-described metal materials, alloy materials, and conductive metal oxides.

For the connector 1415, it is possible to use a paste-like or sheet-like material which is obtained by mixture of metal particles and a thermosetting resin and for which anisotropic electric conductivity is provided by thermocompression bonding. As the metal particles, particles in which two or more kinds of metals are layered, for example, nickel particles coated with gold are preferably used.

The coloring layer 1459 is a colored layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. Each coloring layer is formed in a desired position with any of various materials by a printing method, an inkjet method, an etching method using a photolithography method, or the like.

The light-blocking layer 1457 is provided between the adjacent coloring layers 1459. The light-blocking layer 1457 blocks light emitted from the adjacent light-emitting element, thereby inhibiting color mixture between adjacent pixels. Here the coloring layer 1459 is provided such that its end portion overlaps with the light-blocking layer 1457, whereby light leakage can be reduced. The light-blocking layer 1457 can be formed using a material that blocks light emitted from the light-emitting element, for example, a metal material a resin material including a pigment or a dye, or the like. Note that the light-blocking layer 1457 is preferably provided in a region other than the light extraction portion 1304, such as the driver circuit portion 1306, as illustrated in FIG. 12B, in which case undesired leakage of guided light or the like can be inhibited.

The insulating layer 1461 covering the coloring layer 1459 and the light-blocking layer 1457 is preferably provided because it can inhibit an impurity such as a pigment included in the coloring layer 1459 or the light-blocking layer 1457 from diffusing into the light-emitting element or the like. For the insulating layer 1461, a light-transmitting material is used, and an inorganic insulating material or an organic insulating material can be used. The insulating film with low water permeability may be used for the insulating layer 1461.

<Manufacturing Method Example>

Next, an example of a method for manufacturing a light-emitting device will be described with reference to FIGS. 14A to 14C and FIGS. 15A to 15C. Here, the manufacturing method is described using the light-emitting device of Specific Example 1 (FIG. 12B) as an example.

First, a separation layer 1503 is formed over a formation substrate 1501, and the insulating layer 1405 is formed over the separation layer 1503. Next, the transistor 1440, the conductive layer 1357, the insulating layer 1407, the insulating layer 1409, the light-emitting element 1430, and the insulating layer 1411 are formed over the insulating layer 1405. An opening is formed in the insulating layers 1411, 1409, and 1407 to expose the conductive layer 1357 (see FIG. 14A).

In addition, a separation layer 1507 is formed over a formation substrate 1505, and the insulating layer 1455 is formed over the separation layer 1507. Next, the light-blocking layer 1457, the coloring layer 1459, and the insulating layer 1461 are formed over the insulating layer 1455 (see FIG. 14B).

The formation substrate 1501 and the formation substrate 1505 can each be a rigid substrate such as a glass substrate, a quartz substrate, a sapphire substrate, a ceramic substrate, a metal substrate, or the like.

For the glass substrate, for example, a glass material such as aluminosilicate glass, aluminoborosilicate glass, or barium borosilicate glass can be used. When the temperature of heat treatment performed later is high, a substrate having a strain point of 730° C. or higher is preferably used. Alternatively, crystallized glass or the like may be used.

In the case where a glass substrate is used as the formation substrate, an insulating film such as a silicon oxide film, a silicon oxynitride film, a silicon nitride film, or a silicon nitride oxide film is preferably formed between the formation substrate and the separation layer, in which case contamination from the glass substrate can be prevented.

The separation layer 1503 and the separation layer 1507 each have a single-layer structure or a stacked-layer structure containing an element selected from tungsten, molybdenum, titanium, tantalum, niobium, nickel, cobalt, zirconium, zinc, ruthenium, rhodium, palladium, osmium, iridium, and silicon; an alloy material containing any of the elements; or a compound material containing any of the elements. A crystal structure of a layer containing silicon may be amorphous, microcrystal, or polycrystal.

The separation layer can be formed by a sputtering method, a plasma CVD method, a coating method, a printing method, or the like. Note that a coating method includes a spin coating method, a droplet discharge method, and a dispensing method.

In the case where the separation layer has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that the mixture of tungsten and molybdenum corresponds to an alloy of tungsten and molybdenum, for example.

In the case where the separation layer is formed to have a stacked-layer structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, nitrous oxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or nitrous oxide alone, or a mixed gas of any of these gasses and another gas. Surface condition of the separation layer is changed by the plasma treatment or heat treatment, whereby adhesion between the separation layer and the insulating layer formed later can be controlled.

Note that the insulating layer preferably has a single-layer structure or a stacked-layer structure including any of a silicon nitride film, a silicon oxynitride film, a silicon nitride oxide film, and the like.

Each of the insulating layers can be formed by a sputtering method, a plasma CVD method, a coating method, a printing method, or the like. For example, the insulating layer is formed at higher than or equal to 250° C. and lower than or equal to 400° C. by a plasma CVD method, whereby the insulating layer can be a dense film with very low water permeability.

Figure 14A:
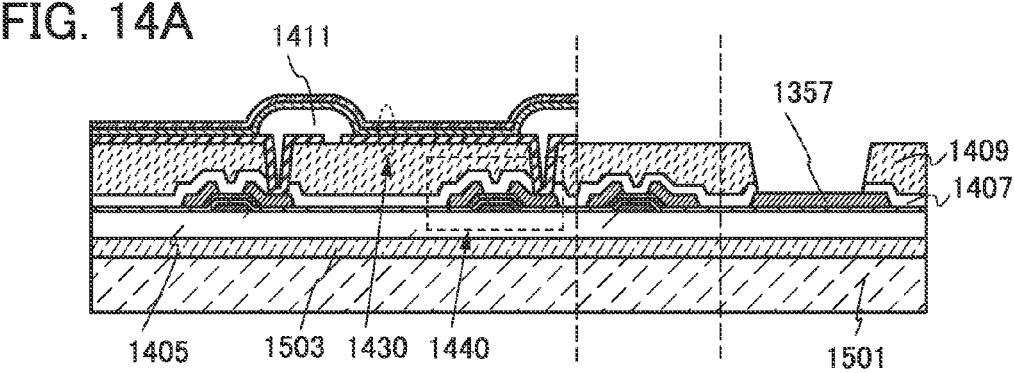
FIGS. 14A to 14C illustrate a method for manufacturing a light-emitting panel of one embodiment.
Figure 14B:
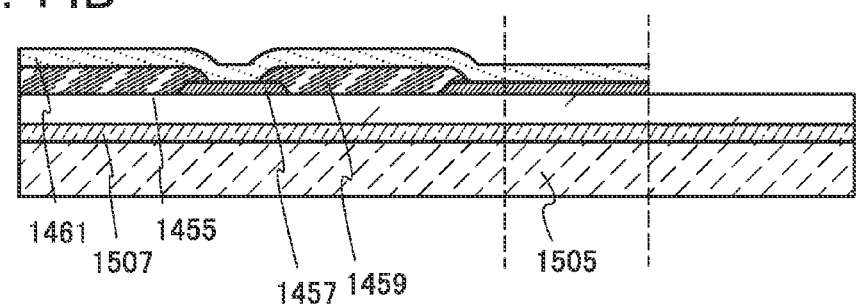
Figure 14C:
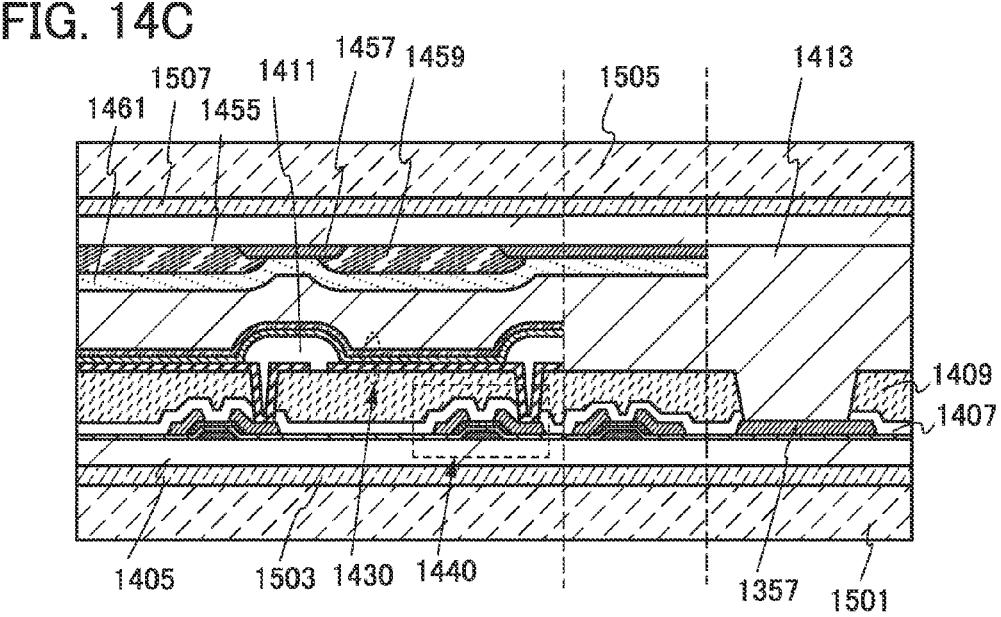

Then, a material for the sealing layer 1413 is applied to a surface of the formation substrate 1505 over which the coloring layer 1459 and the like are formed or a surface of the formation substrate 1501 over which the light-emitting element 1430 and the like are formed, and the formation substrate 1501 and the formation substrate 1505 are attached to each other with the sealing layer 1413 positioned therebetween (see FIG. 14C).

Next, the formation substrate 1501 is separated, and the exposed insulating layer 1405 and the substrate 1401 are attached to each other with the adhesion layer 1403. Furthermore, the formation substrate 1505 is separated, and the exposed insulating layer 1455 and the substrate 1303 are attached to each other with the adhesive layer 1305. Although the substrate 1303 does not overlap with the conductive layer 1357 in FIG. 15A, the substrate 1303 may overlap with the conductive layer 1357.

Here, the substrate 1401 corresponds to the first support 41 described in Embodiment 2 or 3, and the substrate 1303 corresponds to the second support 42.

In addition, the step of separating the formation substrate 1501, the step of attaching the substrate 1401, the step of separating the formation substrate 1505, and the step of attaching the substrate 1303 can be performed with any of the stack manufacturing apparatuses described in Embodiments 2 or 3.

Note that in the separation step using any of the stack manufacturing apparatuses that are embodiments of the present invention, various separation methods can be performed on the formation substrate. For example, when a layer including a metal oxide film is formed as the separation layer on the side in contact with the layer to be separated, the metal oxide film is embrittled by crystallization, whereby the layer to be separated can be separated from the formation substrate. Alternatively, when an amorphous silicon film containing hydrogen is formed as the separation layer between the formation substrate having high heat resistance and the layer to be separated, the amorphous silicon film is removed by laser light irradiation or etching, whereby the layer to be separated can be separated from the formation substrate. Alternatively, after a layer including a metal oxide film is formed as the separation layer on the side in contact with the layer to be separated, the metal oxide film is embrittled by crystallization, and part of the separation layer is removed by etching using a solution or a fluoride gas such as $NF_3$, $BrF_3$, or $ClF_3$, whereby the separation can be performed at the embrittled metal oxide film. Furthermore, a method may be used in which a film containing nitrogen, oxygen, hydrogen, or the like (for example, an amorphous silicon film containing hydrogen, an alloy film containing hydrogen, an alloy film containing oxygen, or the like) is used as the separation layer, and the separation layer is irradiated with laser light to release the nitrogen, oxygen, or hydrogen contained in the separation layer as a gas, thereby promoting separation between the layer to be separated and the formation substrate. Alternatively, it is possible to use a method in which the formation substrate provided with the layer to be separated is removed mechanically or by etching using a solution or a fluoride gas such as $NF_3$, $BrF_3$, or $ClF_3$, or the like, in this case, the separation layer is not necessarily provided.

Furthermore, the separation step can be conducted easily by combination of the above-described separation methods. In other words, separation can be performed with physical force (by a machine or the like) after performing laser light irradiation, etching on the separation layer with a gas, a solution, or the like, or mechanical removal with a sharp knife, scalpel or the like so that the separation layer and the layer to be separated can be easily separated from each other. The step corresponds to the step of forming the separation starting point in this specification. The separation starting point is preferably formed in each of the processed member and the stack which are processed with any of the stack manufacturing apparatuses that are embodiments of the present invention.

Separation of the layer to be separated from the formation substrate may be carried out by filling the interface between the separation layer and the layer to be separated with a liquid. Furthermore, the separation may be conducted while pouring a liquid such as water.

As another separation method, in the case where the separation layer is formed using tungsten, it is preferable that the separation be performed while etching the separation layer using a mixed solution of ammonium water and a hydrogen peroxide solution.

Note that the separation layer is not necessary in the case where separation at the interface between the formation substrate and the layer to be separated is possible. For example, glass is used as the formation substrate, an organic resin such as polyimide is formed in contact with the glass, and an insulating film, a transistor, and the like are formed over the organic resin. In this case, heating the organic resin enables the separation at the interface between the formation substrate and the organic resin. Alternatively, separation at the interface between a metal layer and the organic resin may be performed in the following manner: the metal layer is provided between the formation substrate and the organic resin and current is made to flow in the metal layer so that the metal layer is heated.

Figure 15A:
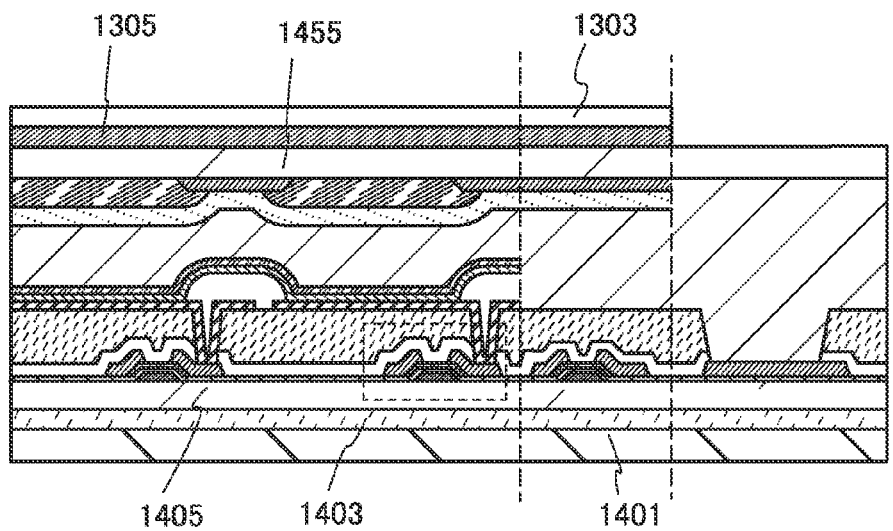
FIGS. 15A to 15C illustrate a, method for manufacturing a light-emitting panel of one embodiment.
Figure 15B:
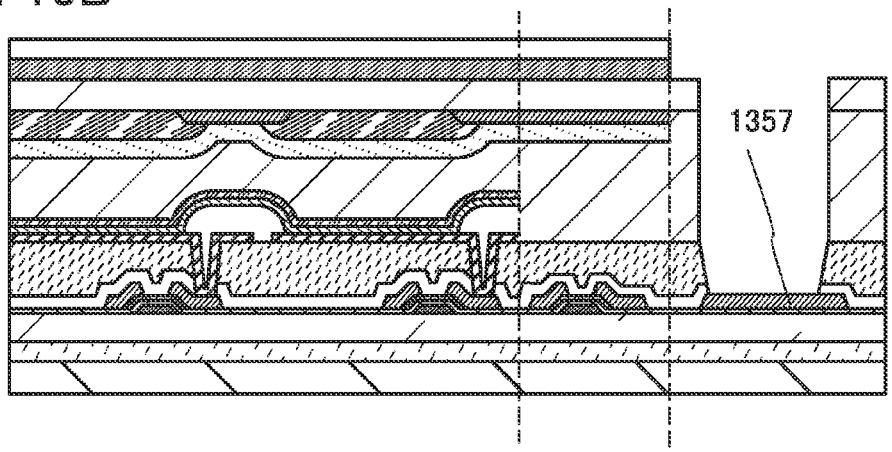
Figure 15C:
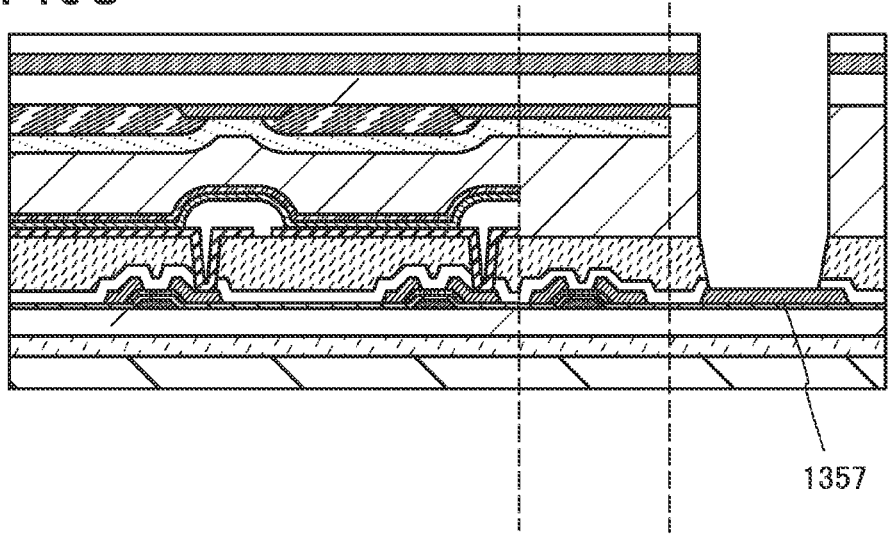

Lastly, an opening is formed in the insulating layer 1455 and the sealing layer 1413 to expose the conductive layer 1357 (see FIG. 15B). In the case where the substrate 1303 overlaps with the conductive layer 1357, the opening is formed also in the substrate 1303 and the adhesive layer 1305 (see FIG. 15C). The mechanism for forming the opening is not particularly limited and may be, for example, a laser ablation method, an etching method, an ion beam sputtering method, or the like. As another method, a slit may be made in a film over the conductive layer 1357 with a sharp knife or the like and part of the film may be separated by physical force.

In the above-described manner, the light-emitting panel can be manufactured.

Figure 17:
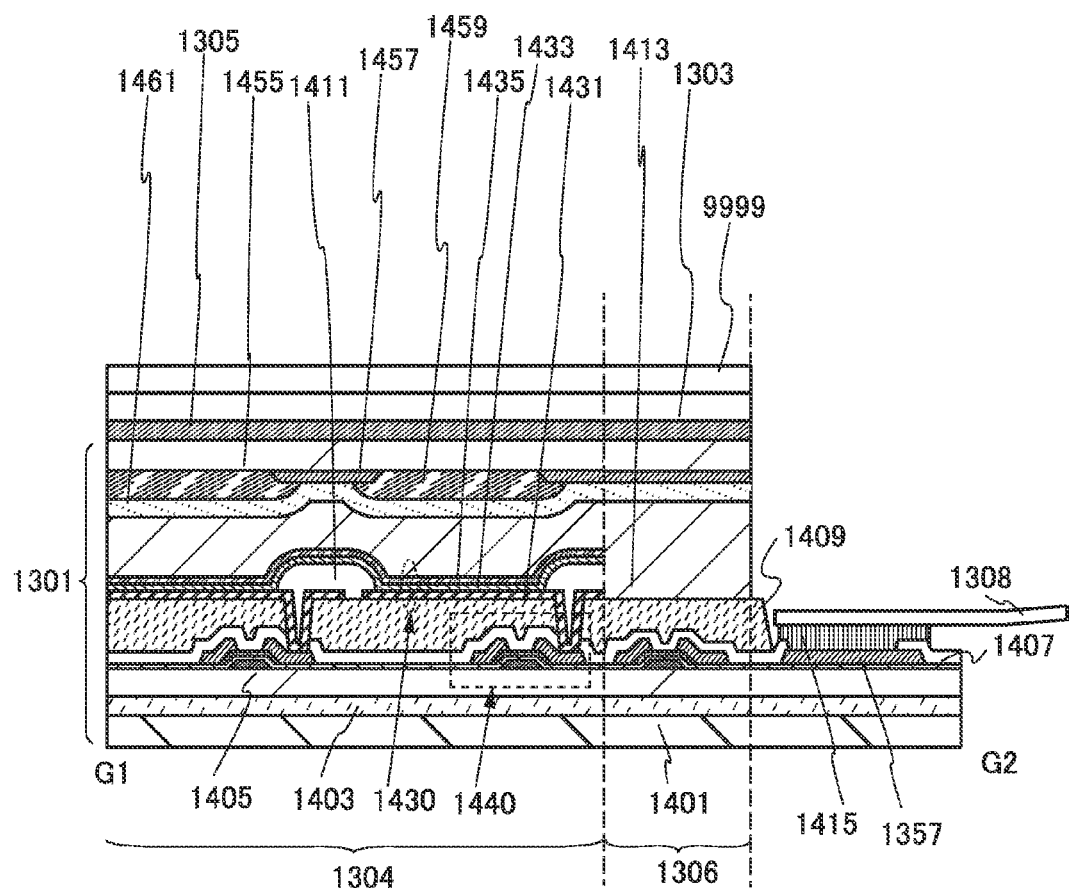
FIG. 17 illustrates a light-emitting panel of one embodiment.

Note that a touch sensor or a touch panel may be provided. For example, FIG. 17 illustrates a case where a touch panel 9999 is provided in the light-emitting panel in FIGS. 13A and 13B. A touch sensor may be directly formed on the substrate 1303; alternatively, the touch panel 9999 formed on another substrate may be placed over the substrate 1303.

Note that although the case where the light-emitting element is used as a display element is illustrated here, one embodiment of the present invention is not limited thereto. Various display elements can be used. For example, in this specification and the like, a display element, a display device which is a device including a display element, a light-emitting element, and a light-emitting device which is a device including a light-emitting element can employ a variety of modes or can include a variety of elements. Examples of a display element, a display device, a light-emitting element, or a light-emitting device include an EL (electroluminescent) element (e.g., an EL element including organic and inorganic materials, an organic EL element, or an inorganic EL element), an LED (e.g., a white LED, a red LED, a green LED, or a blue LED), a transistor (a transistor which emits light depending on current), an electron emitter, a liquid crystal element, electronic ink, an electrophoretic element, a grating light valve (GLV), a plasma display panel (PDP), a micro electro mechanical system (MEMS), a digital micromirror device (DMD), a digital micro shutter (DMS), MIRASOL (registered trademark), an interferometric modulator display (IMOD) element, an electrowetting element, a piezoelectric ceramic display, or a carbon nanotube, which are display media whose contrast, luminance, reflectivity, transmittance, or the like is changed by electromagnetic action. Examples of display devices having EL elements include an EL display. Examples of a display device including an electron emitter include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Display devices having electronic ink or electrophoretic elements include electronic paper and the like.

In this specification and the like, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, a metal insulator metal (MIM), a thin film diode (TFD), or the like can also be used. Since such an element has a small number of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or the yield can be improved. Alternatively, since an active element (a non-linear element) is not used, the aperture ratio can be improved, so that power consumption can be reduced or higher luminance can be achieved, for example.

As described above, a light-emitting panel of this embodiment includes two substrates; one is the substrate 1303 and the other is the substrate 1401. The light-emitting device can be formed with two substrates even when including a touch sensor. Owing to the use of the minimum number of substrates, improvement in light extraction efficiency and improvement in clarity of display can be easily achieved.

Examples of the electronic devices to which a flexible light-emitting device that can be manufactured by using any of the stack manufacturing apparatuses of embodiments of the present invention is applied include television sets (also referred to as televisions or television receivers), monitors of computers or the like, cameras such as digital cameras or digital video cameras, digital photo frames, mobile phones (also referred to as cellular phones or cellular phone devices), portable game machines, portable information terminals, audio reproducing devices, large-sized game machines such as pachinko machines, and the like.

As examples of electronic devices including a display device with flexibility, the following can be given: television devices (also referred to as televisions or television receivers), monitors of computers or the like, cameras such as digital cameras or digital video cameras, digital photo frames, mobile phones (also referred to as mobile phones or mobile phone devices), portable game machines, portable information terminals, audio reproducing devices, large game machines such as pachinko machines, and the like.

In addition, a lighting device or a display device can be incorporated along a curved inside/outside wall surface of a house or a building or a curved interior/exterior surface of a car.

Figure 18A:
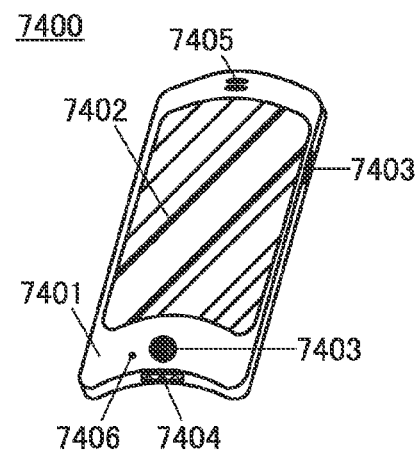
FIGS. 18A to 18D illustrate examples of electronic devices and lighting devices.

FIG. 18A illustrates an example of a mobile phone. A mobile phone 7400 is provided with a display portion 7402 incorporated in a housing 7401, an operation button 7403, an external connection port 7404, a speaker 7405, a microphone 7406, and the like. The mobile phone 7400 is fabricated using the display device for the display portion 7402.

When the display portion 7402 of the mobile phone 7400 illustrated in FIG. 18A is touched with a finger or the like, data can be input into the mobile phone 7400. Operations such as making a call and inputting a letter can be performed by touch on the display portion 7402 with a finger or the like.

With the operation button 7403, power ON or OFF can be switched. In addition, types of images displayed on the display portion 7402 can be switched; for example, switching images from a mail creation screen to a main menu screen is performed with the operation button 7403.

Here, the display portion 7402 includes the display device of one embodiment of the present invention. Thus, the mobile phone can have a curved display portion and high reliability.

Figure 18B:
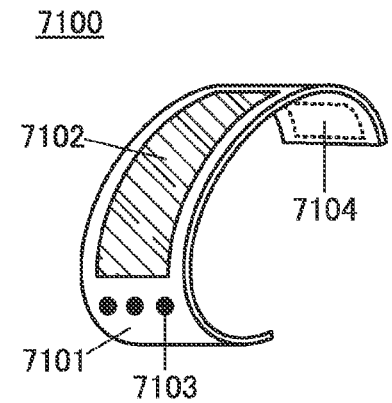

FIG. 18B is an example of a wristband-type display device. A portable display device 7100 includes a housing 7101, a display portion 7102, an operation button 7103, and a sending and receiving device 7104.

The portable display device 7100 can receive a video signal with the sending and receiving device 7104 and can display the received video on the display portion 7102. In addition, with the sending and receiving device 7104, the portable display device 7100 can send an audio signal to another receiving device.

With the operation button 7103, power ON/OFF, switching displayed videos, adjusting volume, and the like can be performed.

Here, the display portion 7102 includes the display device of one embodiment of the present invention. Thus, the portable display device can have a curved display portion and high reliability.

Figure 18C:
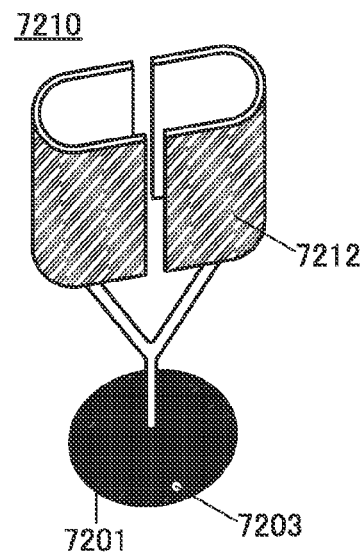
Figure 18D:
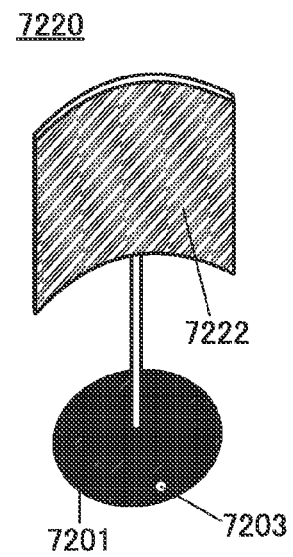

FIGS. 18C and 18D each illustrate an example of a lighting device. Lighting devices 7210 and 7220 each include a stage 7201 provided with an operation switch 7203 and a light-emitting portion supported by the stage 7201.

A light-emitting portion 7212 included in the lighting device 7210 illustrated in FIG. 18C has two convex-curved light-emitting portions symmetrically placed. Thus, all directions can be illuminated with the lighting device 7210 as a center.

The lighting device 7220 illustrated in FIG. 18D includes a concave-curved light-emitting portion 7222. This is suitable for illuminating a specific range because light emitted from the light-emitting portion 7222 is collected to the front of the lighting device 7220.

The light-emitting portion included in each of the lighting devices 7210 and 7220 is flexible; thus, the light-emitting portion may be fixed on a plastic member, a movable frame, or the like so that an emission surface of the light-emitting portion can be bent freely depending on the intended use.

The light-emitting portions included in the lighting devices 7210 and 7220 each include the display device of one embodiment of the present invention. Thus, the lighting devices can have curved display portions and high reliability.

Figure 19A:
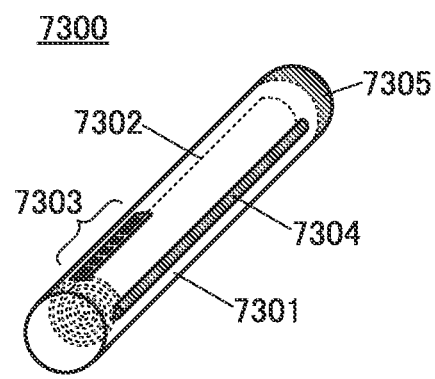
FIGS. 19A and 19B illustrate one example of an electronic device.

FIG. 19A illustrates an example of a portable display device. A display device 7300 includes a housing 7301, a display portion 7302, operation buttons 7303, a display portion pull 7304, and a control portion 7305.

The display device 7300 includes a rolled flexible display portion 7302 in the cylindrical housing 7301. The display portion 7302 includes a first substrate provided with a light-blocking layer and the like and a second substrate provided with a transistor and the like. The display portion 7302 is rolled so that the second substrate is positioned against an inner wall of the housing 7301.

The display device 7300 can receive a video signal with the control portion 7305 and can display the received video on the display portion 7302. In addition, a battery is included in the control portion 7305. Moreover, a connector may be included in the control portion 7305 so that a video signal or power can be supplied directly.

With the operation buttons 7303, power ON/OFF, switching of displayed videos, and the like can be performed.

Figure 19B:
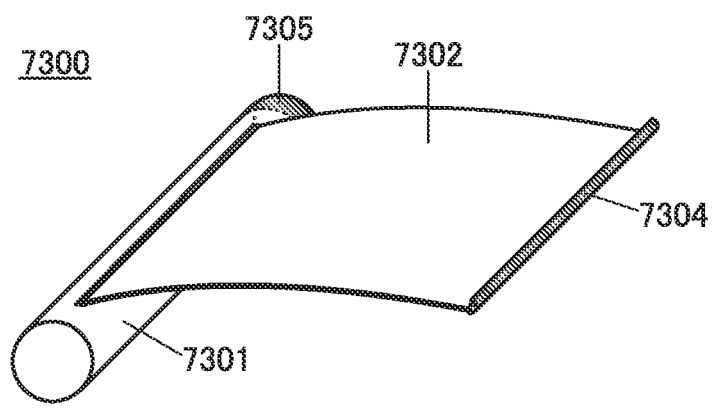

FIG. 19B illustrates a state in which the display portion 7302, is pulled out with the display portion pull 7304. Videos can be displayed on the display portion 7302 in this state. In addition, the operation buttons 7303 on the surface of the housing 7301 allow one-handed operation.

Note that a reinforcement frame may be provided for an edge portion of the display portion 7302 in order to prevent the display portion 7302 from being curved when pulled out.

Note that in addition to this structure, a speaker may be provided for the housing so that sound is output with an audio signal received together with a video signal.

The display portion 7302 includes the display device of one embodiment of the present invention. Thus, the display portion 7302 is a display device which is flexible and highly reliable, which makes the display device 7300 lightweight and highly reliable.

It is needless to say that one embodiment of the present invention is not limited to the above-described electronic devices and lighting devices as long as the display device of one embodiment of the present invention is included.

This embodiment can be implemented in an appropriate combination with any of the structures described in the other embodiments.

(Embodiment 6)

In this embodiment, a structure of the device for forming the separation starting point that is one embodiment of the present invention is described with reference to FIGS. 21A to 21D and FIGS. 22A to 22C.

Figure 21A:
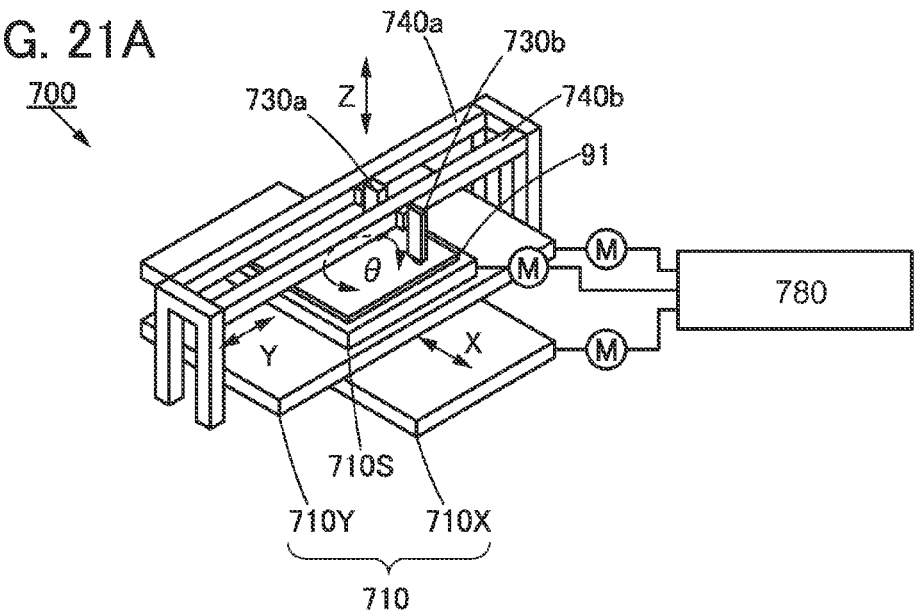
FIGS. 21A to 21D are schematic views illustrating a device for forming a separation starting point of one embodiment.
Figure 21B:
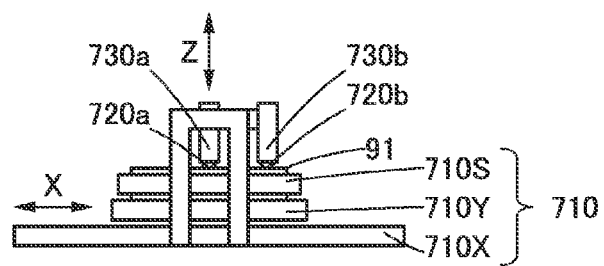
Figure 21C:
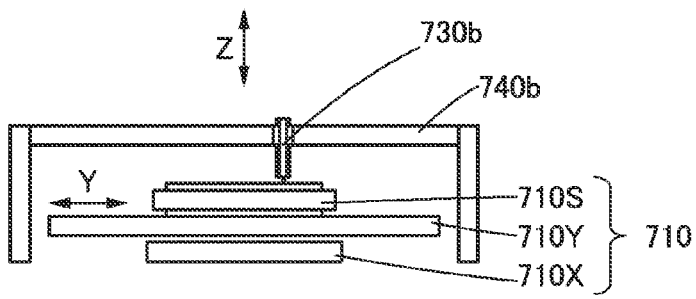
Figure 21D:
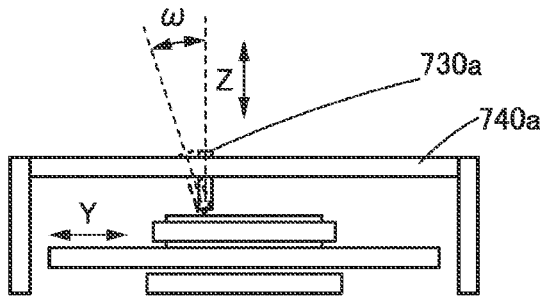

FIGS. 21A to 21D illustrates a structure of the forming device 700 that is one embodiment of the present invention. FIG. 21A is a projection view of the forming device that is one embodiment of the present invention. FIG. 21B is a front view, FIG. 21C is a right side view of FIG. 21B, and FIG. 21D is a left side view of FIG. 21B.

Figure 22A:
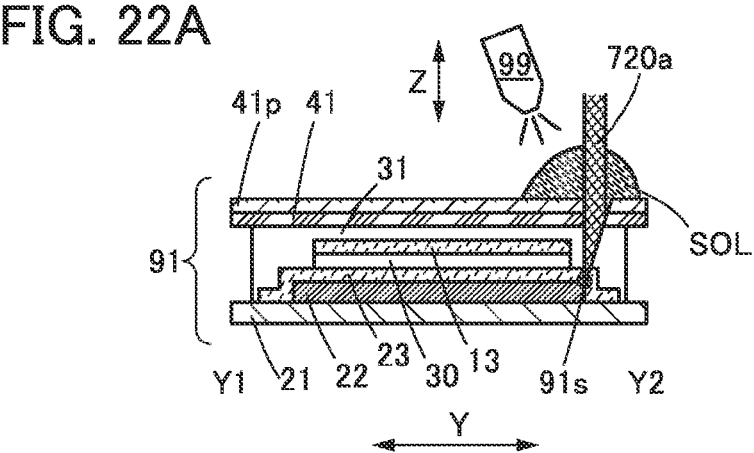
FIGS. 22A to 22C are schematic views illustrating a method for forming a separation starting point of one embodiment.
Figure 22B:
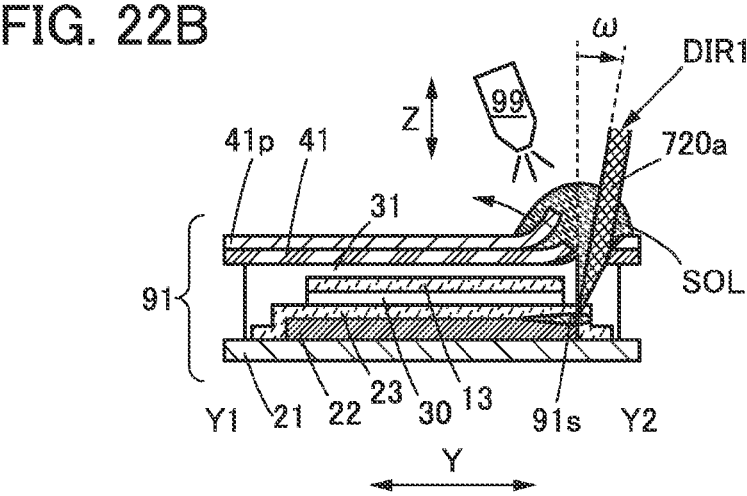
Figure 22C:
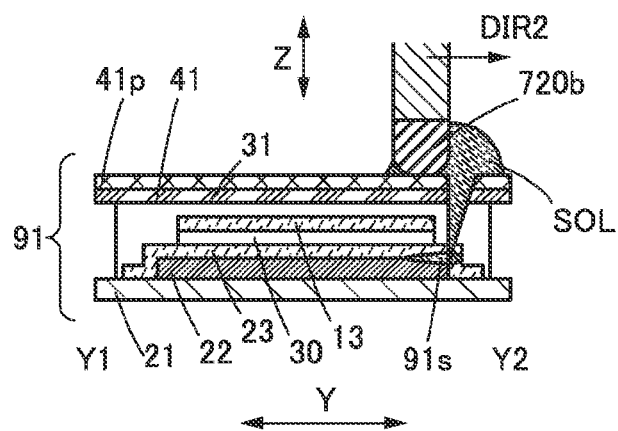

FIGS. 22A to 22C are cross-sectional views illustrating a structure of the first stack 91 in which the separation starting point can be formed with the use of the forming device 700 that is one embodiment of the present invention.

<Structure Example of Device for Forming Separation Starting Point>

The forming device 700 described in this embodiment includes a stage 710 capable of supporting the first stack 91, a cutter 720a facing the stage 710, a first head portion 730a holding the cutter 720a, a first arm portion 740a holding the first head portion 730a, a pressing tool 720b facing the stage 710, a second head portion 730b holding the pressing tool 720b, a second arm portion 740b holding the second head portion 730b, and the moving mechanism 780 that can relatively determine the positions of the cutter 720a and the pressing tool 720b to the stage 710 (see FIG. 21A).

The moving mechanism 780 can determine the position of the cutter 720a with respect to the stage 710 so that the first stack 91 is cut while leaving part of the first stack 91 and the cut portion is peeled from the remaining part.

In addition, the moving mechanism 780 can determine the position of the pressing tool 720b with respect to the stage 710 so that the vicinity of the cut portion of the first stack 91 is pressed onto the stage 710.

The stage 710 may support the first stack 91 in which the second substrate 21, the second separation layer 22, the second layer 23, the first support 41, and a protective film 41p are placed in this order (see FIG. 22A).

The forming device 700 of one embodiment of the present invention includes the cutter 720a with which the first stack 91 is cut while leaving part of the first stack 91 and the cut portion is peeled from the remaining part, and the pressing tool 720b that can be moved so as to press the remaining part of the first stack 91 onto the stage 710.

With such a structure, in a step in which the cut portion is peeled from the separation starting point 91s formed by cutting the first stack 91 while leaving part of the first stack 91 to carry on the separation, the protective film 41p which is unintentionally separated from the first support 41 can be in close contact with the first support 41. Consequently, a novel device for forming a separation starting point can be provided.

Note that the stage 710 may include a rotation stage 710S, a Y-axis stage 710Y, and an X-axis stage 710X so that the cutter 720a and the pressing tool 720b can be relatively moved to the stage 710 (see FIG. 21A).

The rotation stage 710S can rotate the first stack 91 in a plane where the first stack 91 is supported.

The Y-axis stage 710Y can move the first stack 91 in the Y-axis direction of the plane where the first stage 91 is supported, and the X-axis stage 710X can move the first stack 91 in the X-axis direction of the plane where the first stack 91 is supported.

Each component included in the forming device 700 will be described below. Note that these components cannot be clearly distinguished and one element also serves as another element or include part of another element in some cases.

For example, the rotation stage 710S, the Y-axis stage 710Y, and the X-axis stage 710X are part of the stage that supports the first stack 91, and are also part of the moving mechanism 780 that can relatively move the cutter 720a and the pressing tool 720b to the stage 710.

<<Structure>>

The forming device 700 includes the stage 710, the cutter 720a facing the stage 710, the first head portion 730a holding the cutter 720a, the first arm portion 740a holding the first head portion 730a, the pressing tool 720b facing the stage 710, the second head portion 730b holding the pressing tool 720b, the second arm portion 740b holding the second head portion 730b, and the moving mechanism 780 that can relatively determine the positions of the cutter 720a and the pressing tool 720b to the stage 710 (see FIG. 21A).

<<Stage 710>>

The stage 710 can support the first stack 91 in which the separation starting point is formed.

The stage 710 includes a supporting mechanism that supports the first stack 91.

Examples of the supporting mechanism are a vacuum chuck and an electrostatic chuck.

A structure which allows the stage 710 to be moved with respect to the cutter 720a and the pressing tool 720b may be employed so that the cutter 720a and the pressing tool 720b can be relatively moved to the stage 710.

<<Cutter 720a>>

The cutter 720a can cut the first stack 91 while leaving part of the first stack 91.

Examples of the cutter 720a are a knife with a sharp tip and a laser beam.

Specifically, a knife including a round blade which is capable of rotating and made of steel or a fixed tip can be used as the cutter 720a.

<<First Head Portion 730a and First Arm Portion 740a>>

The first head portion 730a has a function of holding the cutter 720a.

The first head portion 730a may include a mechanism for controlling the pressing depth or the pressing force at the time of pressing the cutter 720a.

Furthermore, a mechanism for adjusting the pressing angle of the cutter 720a may be included. Specifically, a mechanism that allows the cutter 720a to be pressed onto the first stack 91 at an angle smaller than an angle between the plane of the stage 710 holding the first stack 91 and a line perpendicular to the plane by ω (see FIG. 21D). Note that ω is greater than or equal to 0° and less than or equal to 80°, preferably greater than or equal to 30° and less than or equal to 50°.

The first arm portion 740a has a function of holding the first head portion 730a in a predetermined position.

Note that the first arm portion 740a may have a structure which allows the first head portion 730a to be moved with respect to the stage 710 so that the cutter 720a can be relatively moved to the stage 710.

The first arm portion 740a has a function of holding the second head portion 730b in a predetermined position. In this case, the first arm portion 740a serves as the second arm portion 740b, <<Pressing Tool 720b>>

The pressing tool 720b is placed to face the stage 710, and can press the first stack 91 onto the stage 710 with the use of its tip in contact with the first stack 91.

For the tip of the pressing tool 720b, an organic material, an inorganic material, a composite material containing an organic material and an inorganic material, or the like can be used.

For example, an inorganic material such as glass, a ceramic, or a metal can be used for the tip of the pressing tool 720b. Specifically, a metal plate of SUS or the like can be used.

For example, an organic material such as a resin or plastic can be used for the tip of the pressing tool 720b.

Specifically, polyester, polyolefin, polyimide, polyimide, polycarbonate, resin such as an acrylic resin can be used for the tip of the pressing tool 720b.

For the pressing tool 720b, a raw material that is soft enough to prevent a surface of the first stack 91 from being scratched can be used. Specifically, a resin, a rubber, a silicone rubber, or the like that is soft enough to prevent the first support 41 from being scratched can be used.

In addition, the first stack 91 is sprayed with a compressed air or the like, and thus can be pressed onto the stage 710.

<<Second Head Portion 730b and Second Arm Portion 740b>=>

The second head portion 730b has a function of holding the pressing tool 720b.

The second head portion 730b may include a mechanism for controlling the pressing depth or the pressing force at the time of pressing the pressing tool 720b.

Furthermore, a media for adjusting the pressing angle of the pressing tool 720b may be included.

The second arm portion 740b has a function of holding the second head portion 730b in a predetermined position.

Note that the second arm portion 740b may have a structure which allows the second head portion 730b to be moved with respect to the stage 710 so that the pressing tool 720b can be relatively moved to the stage 710.

The second arm portion 740b has a function of holding the first head portion 730a in a predetermined position. In this case, the second arm portion 740b serves as the first arm portion 740a, <<Moving Mechanism 780>>

The moving mechanism 780 can relatively determine the positions of the cutter 720a and the pressing tool 720b to the stage 710.

As the mechanism, an air cylinder, an electric motor such as a servomotor or a stepper motor, or the like can be used, for example.

For example, the stage holding the first stack 91 can be moved with respect to the cutter 720a and the pressing tool 720b which are fixed.

For example the cutter 720*a* and the pressing tool 720*b* can be moved with respect to the stage holding the first stack 91 which is fixed.

This embodiment can be combined with any of the other embodiments in this specification as appropriate.

(Embodiment 7)

In this embodiment, a method for forming a separation starting point that is one embodiment of the present invention is described with reference to FIGS. 22A to 22C.

FIGS. 22A to 22C are the cross-sectional views illustrating the structure of the first stack 91 in which the separation starting point can be formed with the use of the forming device 700 that is one embodiment of the present invention, and a method for forming the separation starting point 91*s*.

<Example 1 of Method for Forming Separation Starting Point>

The method for forming a separation starting point described in this embodiment includes the following steps.

<<First Stack 91>>

In the first stack 91 that can be provided with the separation starting point 91*s*, for example, the second substrate 21, the second separation layer 22, the second layer 23, the first support 41, and the protective film 41*p* are placed in this order. In addition, between the second layer 23 and the first support 41, the bonding layer 30 and the first layer 13 are placed in this order from the second layer 23.

For example, the first stack 91 may include a pressure-sensitive adherence layer between the protective film 41*p* and the first support 41. Thus, the protective film 41*p* which is unintentionally separated in the second step can be easily attached to the first support 41 again. For the pressure-sensitive adherence layer, a resin can be used. Specifically, an acrylic resin, a flexible silicone resin, or the like can be used.

For example, a material that is hardly attached to the second separation layer 22 again once it is separated from the second separation layer 22 can be used for the second layer 23. Specifically, a material in which a layer containing tungsten and a layer containing an oxide of tungsten are stacked can be used for the second separation layer 22, and a film containing a metal oxide can be used as the second layer 23.

<<First Step>>

In the first step, the first stack 91 is cut while leaving the second substrate 21, whereby an end portion of the second layer 23 is formed (see FIG. 22A).

For example, part of the first stack 91 is swept while a sharp tip of the cutter 720*a* is pressed to the first stack 91 at a controlled depth; thus, the first stack 91 can be cut while leaving the second substrate 21.

Specifically, a depth at which the cutter 720*a* is pressed in the Z-axis direction can be adjusted with the use of the first head portion 730*a* included in the forming device 700 (see FIGS. 21A and 22A). In addition, to sweep part of the first stack 91, the cutter 720*a* is relatively moved in the X-axis direction with respect to the stage 710. Thus, the second layer 23 is cut and the end portion can be newly formed in the second layer 23.

Alternatively, a material which is hardly cut with the cutter 720*a* may be used for the second substrate 21 to cut the first stack 91 while leaving the second substrate 21.

Note that part of the second layer 23 is peeled off the second substrate 21 when the second layer 23 is cut, so that the separation starting point 91*s* is formed.

<<Second Step>>

In the second step, the end portion peeled from the second substrate 21 (see FIG. 22B).

For example, part of the first stack 91 is swept with the sharp tip of the cutter 720*a* at a controlled angle, whereby the end portion can be peeled from the second substrate 21.

Specifically, an angle at which the cutter 720*a* forms with the stage 710 is adjusted with the use of the first head portion 730*a* included in the forming device 700, so that part of the first stack 91 is swept with the cutter 720*a* in the X-axis direction at an angle smaller than an angle between the plane of the stage supporting the first stack and a line perpendicular to the plane by ω (see FIGS. 21A and 22B). Note that ω is greater than or equal to 0° and less than or equal to 80°, preferably greater than or equal to 30° and less than or equal to 50°. Thus, the tip of the cutter 720*a* can be pressed between the second layer 23 and the second substrate 21. Consequently, a stress can be applied in a direction in which the second layer 23 is peeled from the second substrate 21. Further, the cutter 720*a* may be pressed in a direction DIR1 while being inclined.

Note that when the second layer 23 is peeled from the second substrate 21, a stress is also applied to the components placed on the side opposite to the second substrate 21 side of the second layer 23. Accordingly, the protective film 41*p* might be peeled from the first support 41, for example (see FIG. 22B).

<<Third Step>>

In the third step, the vicinity of the end portion is pressed onto the second substrate 21 (see FIG. 22C).

For example, the tip of the pressing tool 720*b* is placed in the vicinity of the end portion and pushed, whereby the vicinity of the end portion can be pressed onto the second substrate 21.

Specifically, the vicinity of the end portion is pushed onto the second substrate 21 by any of the following methods: a method in which the pressing tool 720*b* is pushed toward the stage 710 with the use of an elastic body such as a spring, a method in which the pressing tool 720*b* is pushed toward the stage 710 with the use of an electric motor or the like, a method in which a stress generated at the time of pushing is detected and the pressing tool 720*b* is pushed while controlling the stress, a method in which the distance between the pressing tool 720*b* and the stage 710 is controlled, and the like.

The above-described method for forming the separation starting point includes the first step in which the first stack 91 is cut while leaving the second substrate 21 to form the end portion in the second layer 23, the second step in which the end portion is peeled from the second substrate 21, and the third step in which the vicinity of the end portion is pressed onto the second substrate 21.

In the step in which the end portion formed by cutting the second layer 23 is peeled from the second substrate 21, the protective film 41*p* which is unintentionally separated from the first support 41 can be in close contact with the first support 41. Consequently, a novel device for forming a separation starting point can be provided.

Note that these steps cannot be clearly distinguished and one step also serves as another step or includes part of other steps in some cases. For example, the step of forming the end portion of the second layer 23 with the use of the inclined cutter 720*a* serves as the second step in addition to the first step.

<Example 2 of Method for Forming Separation Starting Point>

A method for forming a separation starting point that is one embodiment of the present invention is described with reference to FIG. 22C.

The method for forming the separation starting point described in this example is similar to the above-described method for forming the separation starting point except that in the third step, the vicinity of the end portion is pressed onto the second substrate 21 while a position where the vicinity of the end portion is pressed is shifted in a direction opposite to a direction in which the end portion is peeled from the second substrate 21 and the separation is carried on.

Specifically, the pressing tool 720b is moved in a direction DIR2 that is opposite to the direction in which the separation is carried on, whereby the position where the vicinity of the end portion is pressed onto the substrate is shifted.

Thus, for example, in the first step or the second step, a gas or a liquid which enters between the first support 41 and the protective film 41p in the first stack 91 is pushed, so that the protective film 41p can be in close contact with the first support 41. This makes it possible to prevent unintentional separation of the protective film 41p from the first support 41. Consequently, a novel device for forming a separation starting point can be provided.

<Example 3 of Method for Forming Separation Starting Point>

A method for forming a separation starting point that is one embodiment of the present invention is described with reference to FIGS. 22A to 22C.

The method for forming the separation starting point described in this example is similar to the above-described method for forming the separation starting point except that in the first step and/or the second step, a liquid SOL is supplied to the end portion.

Thus, a force required for the separation and/or static electricity incident to the separation can be reduced. Consequently, a novel method for forming a separation starting point can be provided.

(Embodiment 8)

In this embodiment, a structure of a foldable touch panel that can be used in a display portion and a positional information input portion of an information processor that can be formed using the device for forming the separation starting point that is one embodiment of the present invention will be described with reference to FIGS. 23A to 23C.

Figure 23A:
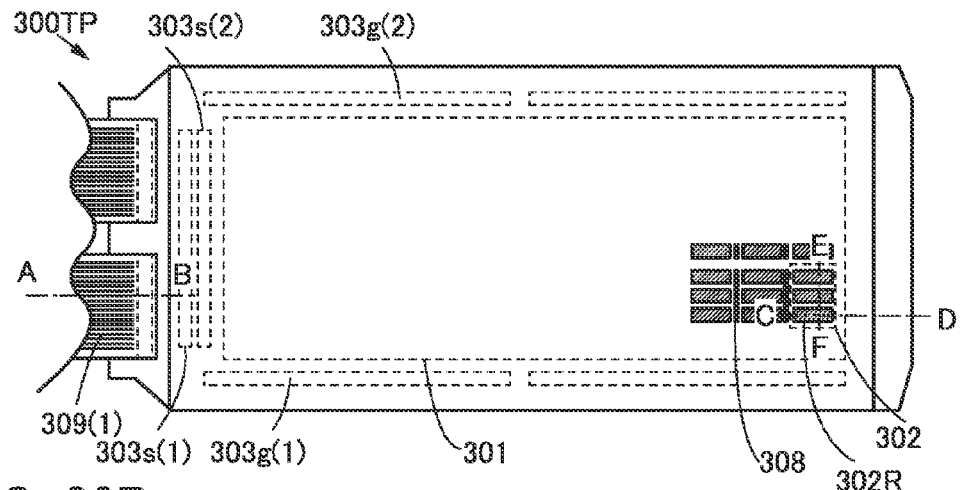
FIGS. 23A to 23C illustrate a structure of a touch panel that can be used in an information processor of one embodiment.
Figure 23B:
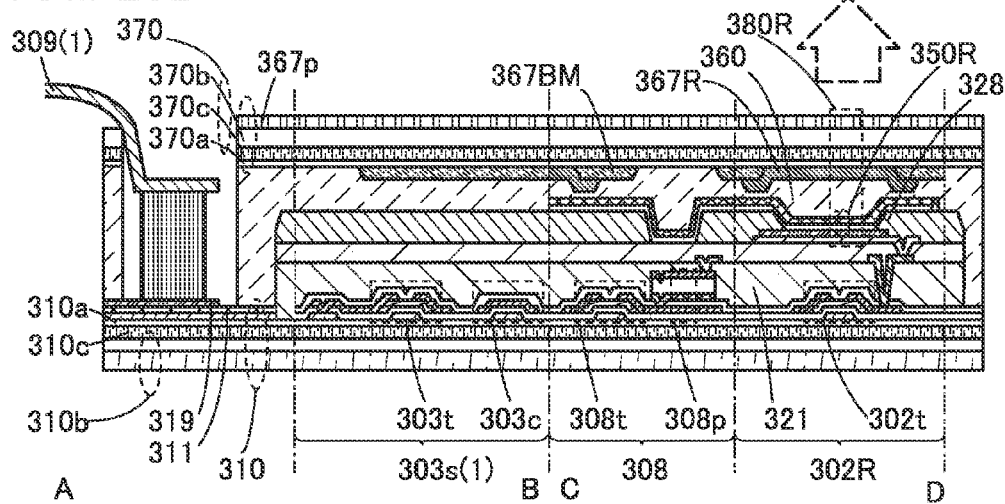
Figure 23C:
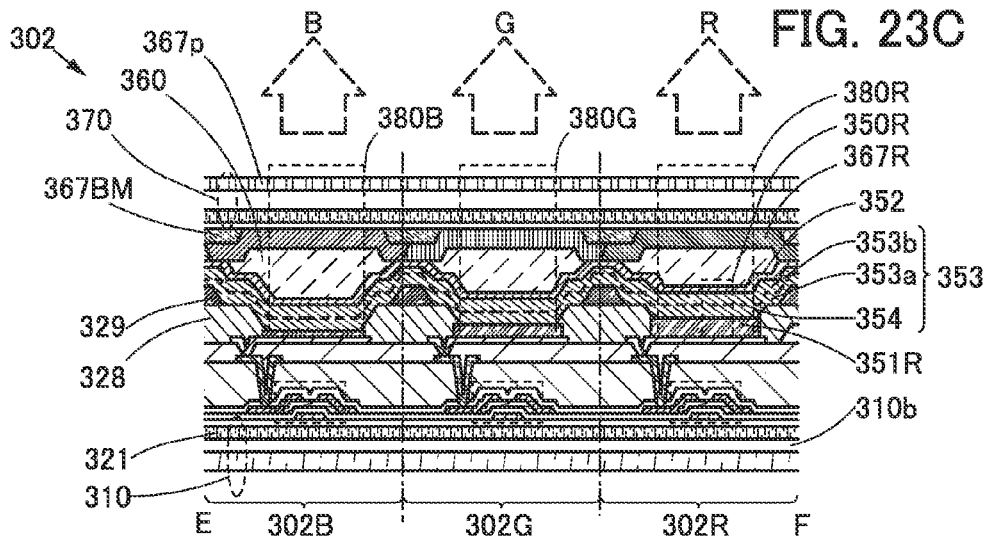

FIGS. 23A to 23C illustrate the structure of a touch panel that can be used in a data processing device in one embodiment of the present invention.

FIG. 23A is a plan view and FIG. 23B is a cross-sectional view taken along line A-B and line C-D in FIG. 23A.

FIG. 23C is a cross-sectional view taken along line F-F in FIG. 23A.

<Plan View>

A touch panel 300TP described as an example in this embodiment, includes a display portion 301 (see FIG. 23A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the touch panel 300TP is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The touch panel 300TP is provided with an imaging pixel driver circuit 303g(2) that can supply control signals to the imaging pixels 308 and an imaging signal line driver circuit 303s(2) that reads out imaging signals.

<Cross-Sectional View>

The touch panel 300TP includes a substrate 310 and a counter substrate 370 that faces the substrate 310 (see FIG. 23B).

By using a flexible material as the substrate 310 and the counter substrate 370, the touch panel 300TP can have flexibility.

Note that when the flexible touch panel 300TP is bent, stress is applied to a function element provided in the touch panel 300TP. A function element is preferably positioned in the center between the substrate 310 and the counter substrate 370 because a change in shape of the function element can be prevented.

Furthermore, the substrate 310 is preferably formed using a material whose coefficient of linear expansion is substantially equal to that of the counter substrate 370. For example, the coefficient of linear expansion of the materials are preferably lower than or equal to $1 \times 10^{-3}$/K, further preferably lower than or equal to $5 \times 10^{-5}$/K, and still further preferably lower than or equal to $1 \times 10^{-5}$/K.

For example, materials that include polyester, polyolefin, polyamide nylon, aramid), polyimide, polycarbonate, or a resin having an acrylic bond, an urethane bond, an epoxy bond, or a siloxane bond can be used for the substrate 310 and the counter substrate 370.

The substrate 310 is a stacked body in which a flexible substrate 310b, a barrier film 310a that prevents diffusion of unintentional impurities to the light-emitting elements, and a resin layer 310c that attaches the barrier film 310a to the substrate 310b are stacked.

The counter substrate 370 is a stacked body including a flexible substrate 370b, a barrier film 370a that prevents diffusion of unintentional impurities to the light-emitting elements, and a resin layer 370c that attaches the barrier film 370a to the substrate 370b (see FIG. 23B.

A sealant 360 attaches the counter substrate 370 to the substrate 310. The sealant 360 also serving as an optical adhesive layer has a refractive index higher than that of air. The pixel circuits and the light-emitting elements (e.g., a first light-emitting element 350R) are provided between the substrate 310 and the counter substrate 370.

<<Structure of Pixel>>

Each of the pixels 302 includes a sub-pixel 302R, a sub-pixel 302G, and a sub-pixel 302B (see FIG. 23C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 23B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 23C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. Alternatively, a region that transmits light emitted from the light-emitting element as it is may be provided as well.

The emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 23B and 23C.

<<Structure of Display Panel>>

The touch panel 300TP includes a light-blocking layer 367BM on the counter substrate 370. The light-blocking layer 367BM is provided so as to surround the coloring layer (e.g., the first coloring layer 367R).

The touch panel 300TP includes an anti-reflective layer 367p positioned in a region overlapping with the display portion 301. As the anti-reflective layer 367p, a circular polarizing plate can be used, for example.

The touch panel 300TP includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The touch panel 300TP includes the light-emitting elements (the first light-emitting element 350R) over the insulating film 321.

The touch panel 300TP includes, over the insulating film 321, a partition wall 328 that overlaps with an end portion of the first lower electrode 351R (see FIG. 23C). In addition, a spacer 329 that controls the distance between the substrate 310 and the counter substrate 370 is provided on the partition wall 328.

<<Structure of Image Signal Line Driver Circuit>>

The image signal line driver circuit 303s(1) includes a transistor 303t and a capacitor 303c. Note that the driver circuit can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Structures>>

The touch panel 300TP includes a wiring 311 through which a signal can be supplied. The wiring 311 is provided with a terminal 319. Note that an FPC 309(1) through which a signal such as an image signal or a synchronization signal can be supplied is electrically connected to the terminal 319.

Note that a printed wiring board (PWB) may be attached to the FPC 309(1).

Transistors formed in the same process can be used as the transistor 302t, the transistor 303t, the transistor 308t, and the like.

Transistors of a bottom-gate type, a top-gate type, or the like can be used.

Any of various kinds of semiconductors can be used in the transistors. For example, an oxide semiconductor, single crystal silicon, polysilicon, amorphous silicon, or the like can be used.

This embodiment can be implemented in appropriate combination with any of the other embodiments in this specification.

(Embodiment 9)

In this embodiment, a structure of a foldable touch panel that can be formed with the use of the device for forming the separation starting point that is one embodiment of the present invention will be described with reference to FIGS. 24A and 24B and FIGS. 25A to 25C.

Figure 24A:
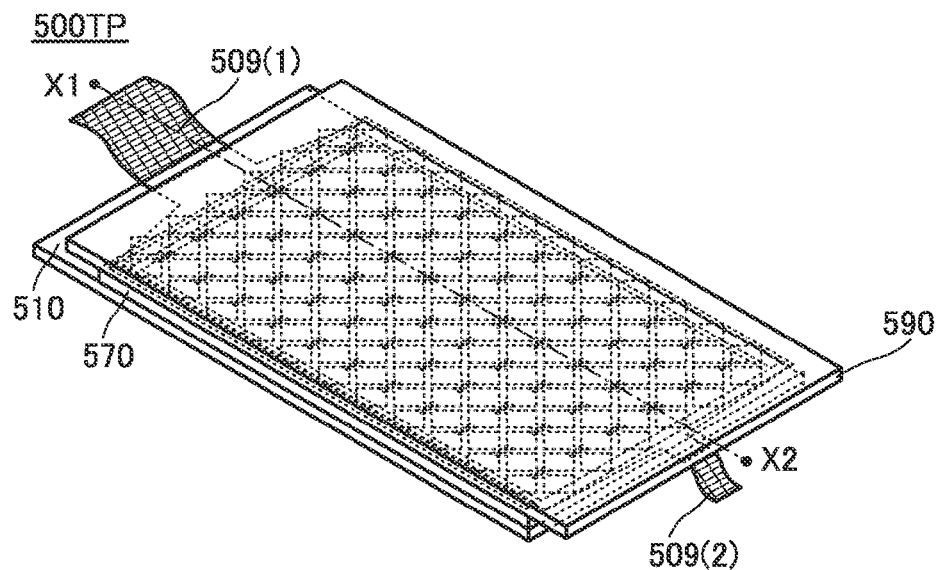
FIGS. 24A and 24B illustrate a structure of a touch panel that can be used in an information processor of one embodiment.
Figure 24B:
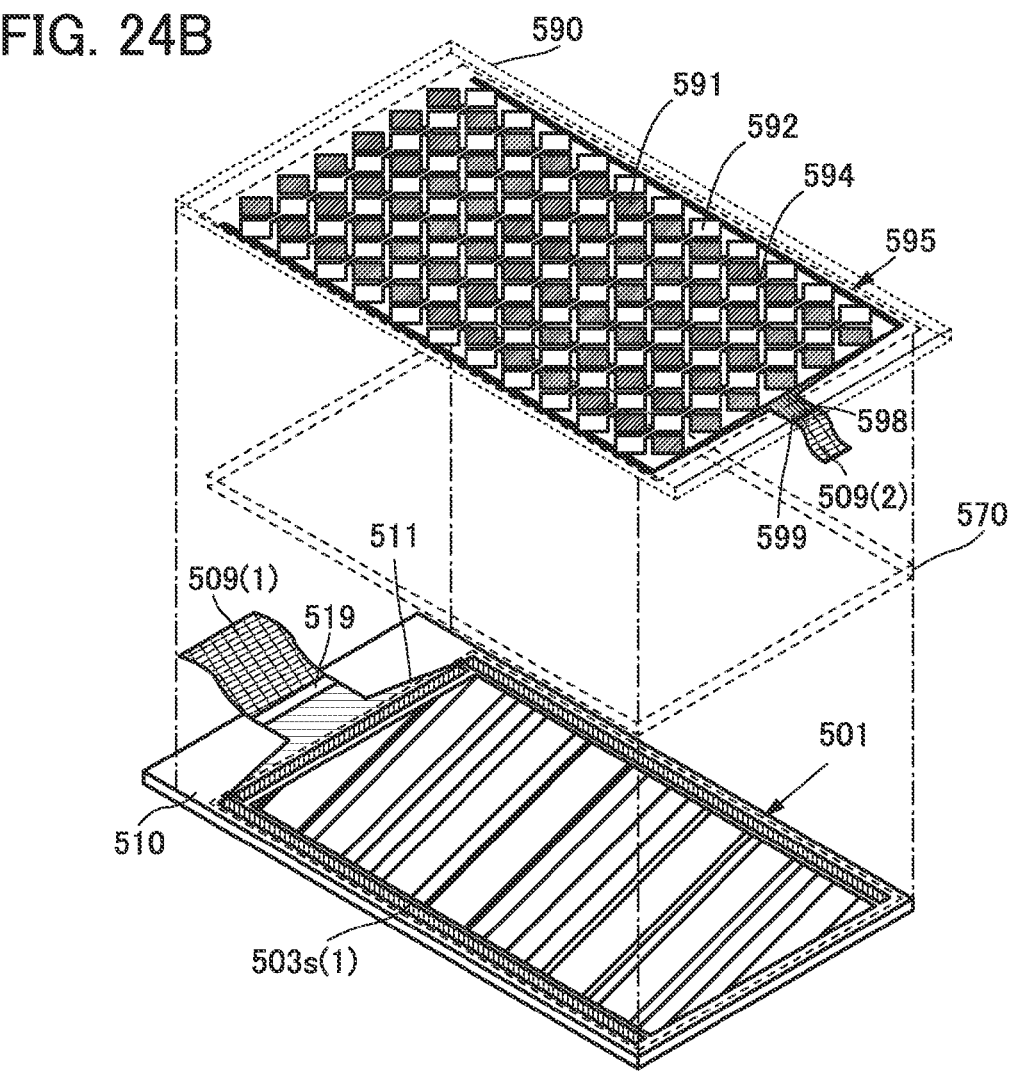

FIGS. 24A and 24B are perspective views illustrating typical components of a touch panel in one embodiment of the present invention. FIG. 24A is a perspective view of a touch panel 500TP, and FIG. 24B is a perspective view illustrating the components of the touch panel 500TP in a separated state.

Figure 25A:
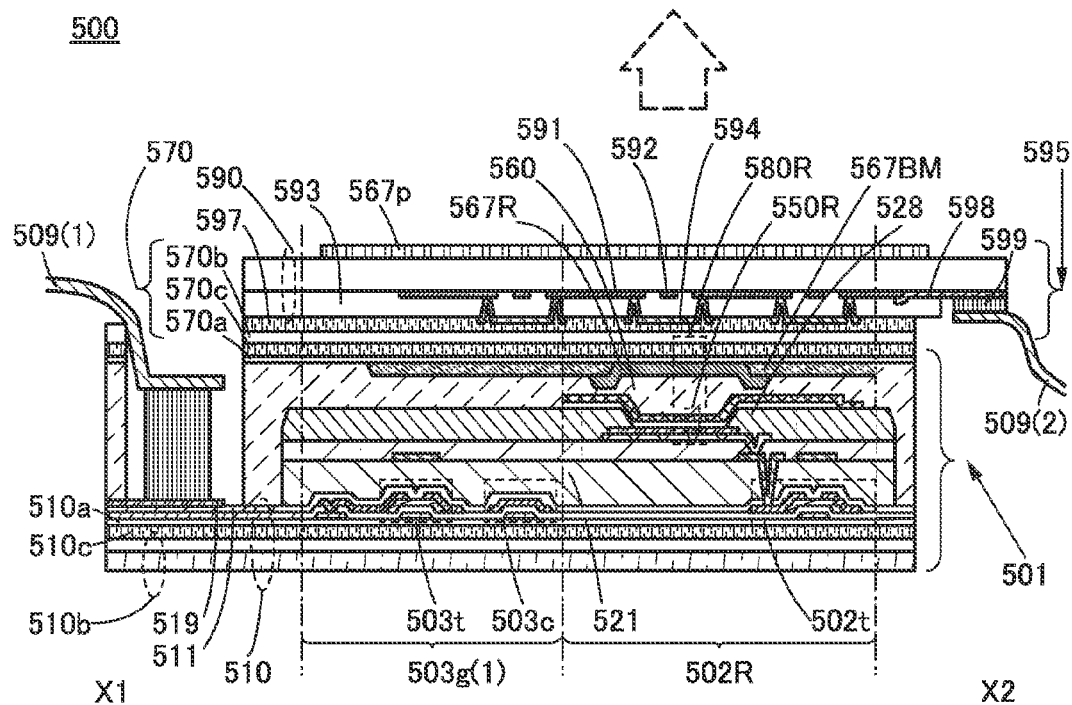
FIGS. 25A to 25C illustrate a structure of a touch panel that can be used in an information processor of one embodiment.
Figure 25B:
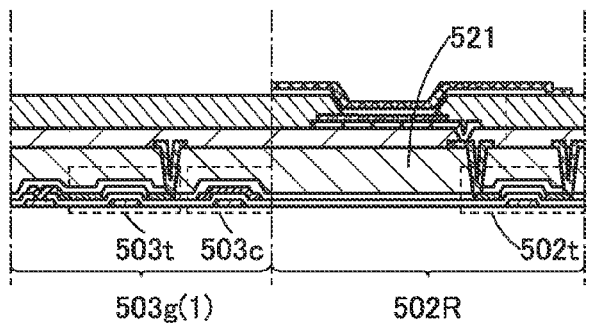
Figure 25C:
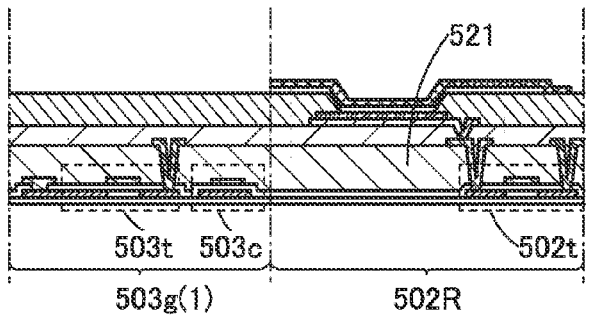

FIGS. 25A to 25C are cross-sectional views of the touch panel 500TP taken along line X1-X2 in FIG. 24A.

The touch panel 500TP includes a display portion 501 and a touch sensor 595 (see FIG. 24B). Furthermore, the touch panel 500TP includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal. The terminal is electrically connected to an FPC 509(2). Note that in FIG. 24B, electrodes, wirings, and the like of the touch sensor 595 provided on the back side of the substrate 590 (the side opposite to the viewer side) are indicated by solid lines for clarity.

As the touch sensor 595, a capacitive touch sensor can be used. Examples of the capacitive touch sensor are a surface capacitive touch sensor and a projected capacitive touch sensor.

Examples of the projected capacitive touch sensor are a self capacitive touch sensor and a mutual capacitive touch sensor, which differ mainly in the driving method. The use of a mutual capacitive touch sensor is preferable because multiple points can be sensed simultaneously.

An example of using a projected capacitive touch sensor will be described below with reference to FIG. 24B.

Note that a variety of sensors that can sense the closeness or the contact of a sensing target such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 24A and 24B.

A plurality of electrodes 591 each have a quadrangular shape and are arranged in a direction intersecting with the direction in which the electrodes 592 extend.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592, are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

A structure of the touch sensor 595 will be described with reference to FIGS. 25A to 25C.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

A resin layer 597 attaches the substrate 590 to the substrate 570 so that the touch sensor 595 overlaps with the display portion 501.

The electrodes 591 and the electrodes 592, are formed using a light-transmitting conductive material. As the light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide. As a reducing method, a method with application of heat or the like can be employed.

The electrodes 591 and the electrodes 592 may be formed by depositing a light-transmitting conductive material on the substrate 590 by a sputtering method and then removing an unnecessary portion by any of various patterning techniques such as photolithography.

Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and 592 can be favorably used because electric resistance can be reduced.

One electrode 592 extends in one direction, and a plurality of electrodes 592 is provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore a connection layer 599 electrically connects the wiring 598 to the FPC 509(2).

As the connection layer 599, any of various anisotropic conductive films (ACF), anisotropic conductive pastes (ACP), or the like can be used.

The resin layer 597 has a light-transmitting property. For example, a thermosetting resin or an ultraviolet curable resin can be used; specifically, a resin such as acrylic, urethane, epoxy resin, or a resin having a siloxane bond can be used,
<Display Portion>

The display portion 501 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

For example, organic electroluminescent elements that emit light of different colors may be included in sub-pixels so that the light of different colors can be emitted from the respective sub-pixels.

Other than organic electroluminescent elements, any of various display elements such as display elements (electronic ink) that perform display by an electrophoretic method, an electronic liquid powder method, an electrowetting method, or the like; MEMS shutter display elements; optical interference type MEMS display elements; and liquid crystal elements can be used. Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. A structure suitable for employed display elements can be selected from among a variety of structures of pixel circuits.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. Since these elements can be formed with a smaller number of manufacturing steps, manufacturing cost can be reduced or yield can be improved. Furthermore, since the size of these elements is small, the aperture ratio can be improved, so that power consumption can be reduced or higher luminance can be achieved.

As a method other than an active matrix method, a passive matrix method in which an active element (a non-linear element) is not used can also be used. Since an active element (a non-linear element) is not used, the number of manufacturing steps is small, so that manufacturing cost can be reduced or yield can be improved. Furthermore, since an active element (a non-linear element) is not used, the aperture ratio can be improved, so that power consumption can be reduced or higher luminance can be achieved, for example.

Flexible materials can be favorably used in the substrate 510 and the substrate 570.

Materials with which unintended passage of impurities is inhibited can be favorably used in the substrate 510 and the substrate 570. For example, materials with a vapor permeability of lower than or equal to $10^{-5}$ g/m$^2$·day, preferably lower than or equal to $10^{-6}$ g/m$^2$·day can be favorably used.

The substrate 510 can be favorably formed using a material whose coefficient of linear expansion is substantially equal to that of the substrate 570. For example, the coefficient of linear expansion of the materials are preferably lower than or equal to $1\times10^{-3}$/K, further preferably lower than or equal to $5\times10^{-5}$/K, and still further preferably lower than or equal to $1\times10^{-5}$/K.

The substrate 510 is a stacked body in which a flexible substrate 510b, a barrier film 510a that prevents diffusion of unintentional impurities to light-emitting elements, and a resin layer 510c that attaches the barrier film 510a to the substrate 510b are stacked.

For example, materials that include polyester, polyolefin, polyamide (e.g., nylon, aramid), polyimide, polycarbonate, or a resin having an acrylic bond, an urethane bond, an epoxy, bond, or a siloxane bond can be used for the resin layer 510c.

The substrate 570 is a stacked body in which a flexible substrate 570b, a barrier film 570a that prevents diffusion of unintentional impurities to the light-emitting elements, and a resin layer 570c that attaches the barrier film 570a to the substrate 570b are stacked.

A sealant 560 attaches the substrate 570 to the substrate 510. The sealant 560 has a refractive index higher than that of air. In the case of extracting light, to the sealant 560 side, the sealant 560 serves as an optical adhesive layer. The pixel circuits and the light-emitting elements (e.g., a first light-emitting element 550R) are provided between the substrate 510 and the substrate 570.

<<Structure of Pixel>>

A pixel includes a sub-pixel 502R, and the sub-pixel 502R includes a. light-emitting module 580R.

The sub-pixel 502R includes the first light-emitting element 550R and the pixel circuit that can supply electric power to the first light-emitting element 550R and includes a transistor 502t. Furthermore, the light-emitting module 5808 includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 5808 includes the first coloring layer 567R on the light extraction side. The coloring layer transmits light of a particular wavelength and is, for example, a layer that selectively transmits light of red, green, or blue color. Note that in another sub-pixel, a region that, transmits light emitted from the light-emitting element as it is may be provided as well.

In the case where the sealant 560 is provided on the light extraction side, the sealant 560 is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the first coloring layer 567R and is emitted to the outside of the light-emitting module 580R as indicated by an arrow in FIG. 25A.

<<Structure of Display Portion>>

The display portion 501 includes a light-blocking layer 567BM on the light extraction side. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. A stacked film including a layer that can prevent diffusion of impurities can be used as the insulating film 521. This can prevent the reliability of the transistor 502t or the like from being lowered by diffusion of unintentional impurities.

The display portion 501 includes the light-emitting elements (e.g., the first light-emitting element 550R) over the insulating film 521.

The display portion 501 includes, over the insulating film 521, a partition wall 528 that overlaps with an end portion of the first lower electrode 351R. In addition, a spacer that controls the distance between the substrate 510 and the substrate 570 is provided on the partition wall 528.

<<Structure of Scan Line Driver Circuit>>

A scan line driver circuit 503g(1) includes a transistor 503t and a capacitor 503c. Note that the driver circuit can be formed in the same process and over the same substrate as those of the pixel circuits.

<<Other Structures>>

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

The display portion 501 includes wirings such as scan lines, signal lines, and power supply lines. Any of various conductive films can be used as the wirings.

Specifically, a metal element selected from aluminum, chromium, copper, tantalum, titanium, molybdenum, tungsten, nickel, yttrium, zirconium, silver, and manganese; an alloy including any of the above-described metal elements; an alloy including any of the above-described metal elements in combination; or the like can be used. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked structure in which an alloy film or a nitride film which contains one or more elements selected from titanium, tantalum, tungsten, molybdenum, chromium, neodymium, and scandium is stacked over an aluminum film can be used.

Alternatively, a light-transmitting conductive material including indium oxide, tin oxide, or zinc oxide may be used.

<Modification Example 1 of Display Portion>

Any of various kinds of transistors can be used in the display portion 501.

A structure in the case of using bottom-gate transistors in the display portion 501 is illustrated in FIGS. 25A and 25B.

For example, a semiconductor layer containing an oxide semiconductor, amorphous silicon, or the like can be used in the transistor 502t and the transistor 503t illustrated in FIG. 25A.

For example, a film represented by an In—M-Zn oxide that contains at least indium (In), zinc (Zn), and M (M is a metal such as Al, Ga, Ge, Y, Zr, Sn, La, Ce, or Hf) is preferably included. Moreover, both in and Zn are preferably contained.

As a stabilizer, gallium (Ga), tin (Sn), hafnium (Hf), aluminum (Al), zirconium (Zr), or the like can be used. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be used.

As an oxide semiconductor included in an oxide semiconductor film, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, for example, an "In—Ga—Zn-based oxide" means an oxide containing In, Ga, and Zn as its main components and there is no limitation on the ratio of In:Ga:Zn. The In—Ga—Z-based oxide may contain another metal element in addition to In, Ga, and Zn.

For example, a semiconductor layer containing polycrystalline silicon that is obtained by crystallization process such as laser annealing can be used in the transistor 502t and the transistor 503t illustrated in FIG. 25B.

A structure in the case of using top-gate transistors in the display portion 501 is illustrated in FIG. 25C.

For example, a semiconductor layer including polycrystalline silicon, a single crystal silicon film that is transferred from a single crystal silicon substrate, or the like can be used in the transistor 502t and the transistor 503t illustrated in FIG. 25C.

This embodiment can be implemented in appropriate combination with any of the other embodiments in this specification.

(Embodiment 10)

In this embodiment, a structure of a foldable touch panel that can be formed with the use of the device for forming the separation starting point that is one embodiment of the present invention will be described with reference to FIGS. 26A to 26C.

Figure 26A:
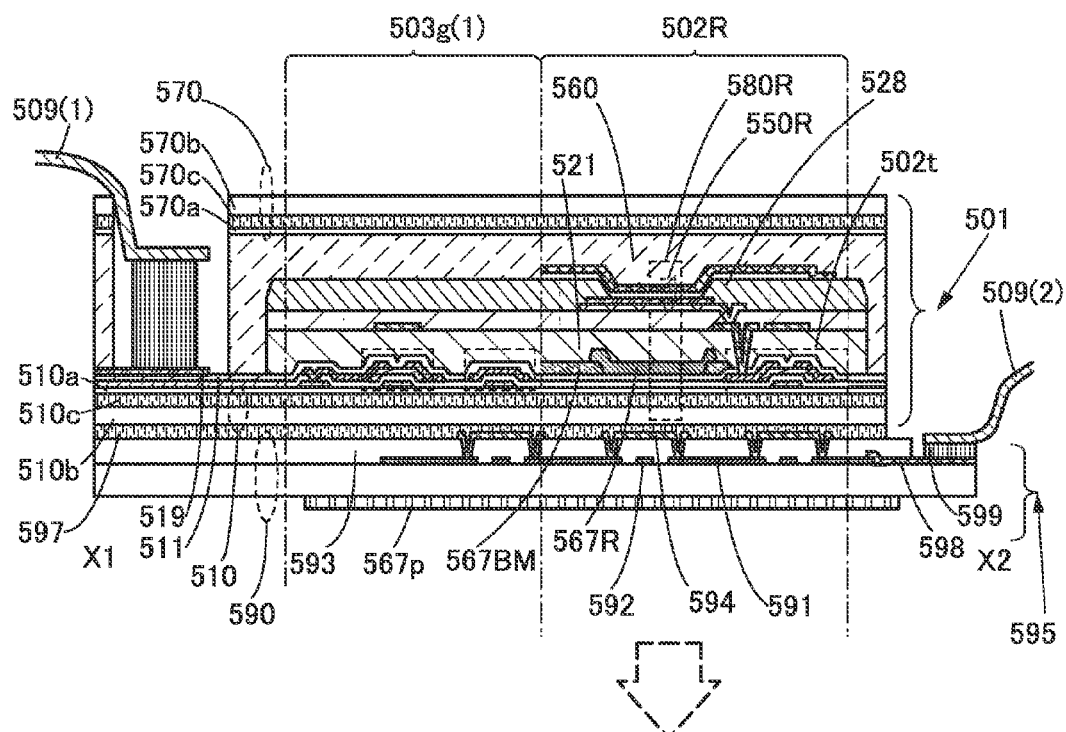
FIGS. 26A to 26C illustrate a structure of a touch panel that can be used in an information processor of one embodiment.
Figure 26B:
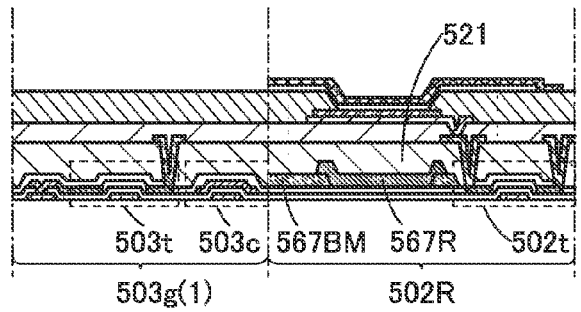
Figure 26C:
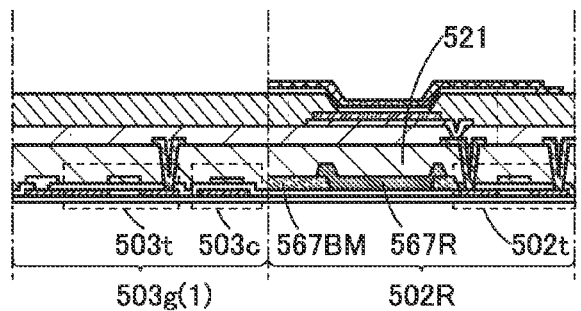

FIGS. 26A to 26C are cross-sectional views illustrating a structure of a touch panel 500B.

The touch panel 500B described ire this embodiment is different from the touch panel 500TP described in Embodiment 9 in that the display portion 501 displays received image data to the side where the transistors are provided and that the touch sensor is provided on the substrate 510 side of the display portion. Different structures will be described in detail below, and the above description is referred to for the other similar structures.

<Display Portion>

The display portion 501 includes a plurality of pixels arranged in a matrix. Each of the pixels includes a display element and a pixel for driving the display element.

<<Structure of Pixel>>

A pixel includes the sub-pixel 502R, and the sub-pixel 502R includes a light-emitting module 5808.

The sub-pixel 502R includes the first light-emitting element 550R and the pixel circuit that can supply electric power to the first light-emitting element 550R and includes the transistor 502t.

The light-emitting module 580R includes the first light-emitting element 550R and an optical element (e.g., the first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

The first coloring layer 567R is positioned in a region overlapping with the first light-emitting element 550R. The first light-emitting element 550R illustrated in FIG. 26A emits light to the side where the transistor 502t is provided.

Accordingly, part of light emitted from the first light-emitting element 550R passes through the first coloring layer 567R and is emitted to the outside of the light-emitting module 580R as indicated by an arrow in FIG. 26A.

<<Structure of Display Portion>>

The display portion 501 includes a light-blocking layer 567BM on the light extraction side. The light-blocking layer 567BM is provided so as to surround the coloring layer (e.g., the first coloring layer 567R).

The display portion 501 includes an insulating film 521. The insulating film 521 covers the transistor 502t. Note that the insulating film 521 can be used as a layer for planarizing unevenness caused by the pixel circuits. A stacked film including a layer that can prevent diffusion of impurities can be used as the insulating film 521. This can prevent reliability of the transistor 502t or the like from being lowered by diffusion of unintentional impurities from the first coloring layer 567R.

<Touch Sensor>

The touch sensor 595 is provided on the substrate 510 side of the display portion 501 (see FIG. 26A).

The resin layer 597 is provided between the substrate 510 and the substrate 590 and attaches the touch sensor 595 to the display portion 501.

<Modification Example 1 of Display Portion>

Any of various kinds of transistors can be used in the display portion 501.

A structure in the case of using bottom-gate transistors in the display portion 501 is illustrated in FIGS. 26A and 26B.

For example, a semiconductor layer containing an oxide semiconductor, amorphous silicon, or the like can be used in the transistor 502t and the transistor 503t illustrated in FIG. 26A. In the transistors, a channel formation region may be sandwiched between upper and lower gate electrodes, in which case variations in characteristics of the transistors can be prevented and thus the reliability can be increased.

For example, a semiconductor layer containing polycrystalline silicon or the like can be used in the transistor 502t and the transistor 503t illustrated in FIG. 26B.

A structure in the case of using top-gate transistors in the display portion 501 is illustrated in FIG. 26C.

For example, a semiconductor layer including polycrystalline silicon, transferred single crystal silicon film, or the like can be used in the transistor 502t and the transistor 503t illustrated in FIG. 26C.

This embodiment can be implemented in appropriate combination with any of the other embodiments in this specification.

This application is based on Japanese Patent Application serial no. 2013-179697 filed with Japan Patent Office on Aug. 30, 2013, and Japanese Patent Application serial no. 2014-043408 filed with Japan Patent Office on Mar. 6, 2014, the entire contents of which are hereby incorporated by reference.

What is claimed is:

1. A device for forming a separation starting point comprising:
   a stage configured to support a processed member to be provided with the separation starting point that allows separation of a surface layer of the processed member to form a remaining portion;
   a cutter that faces the stage;
   a head portion that supports the cutter;
   an arm portion that supports the head portion;
   a camera configured to take an image of a cut portion of the processed member;
   an image processing portion configured to process the image taken by the camera; and
   a moving mechanism configured to determine a relative position of the cutter to the stage,
   wherein the cutter is configured to cut the processed member while leaving part of the processed member,
   wherein the moving mechanism relatively moves the cutter along the stage,
   wherein the stage is configured to support the processed member in which a marker is formed near the cut portion, and
   wherein the image processing portion is configured to detect a change in the image of the marker and determine whether the separation starting point is formed along the cut portion or not.

2. The device for forming the separation starting point according to claim 1,
   wherein the moving mechanism places the cutter so that the processed member is cut to a predetermined depth while leaving the part of the processed member.

3. A stack manufacturing apparatus comprising:
   a device for forming a separation starting point comprising:
      a stage configured to support a processed member to be provided with the separation starting point that allows separation of a surface layer of the processed member to form a remaining portion;
      a cutter that faces the stage;
      a head portion that supports the cutter;
      an arm portion that supports the head portion; and
      a moving mechanism configured to determine a relative position of the cutter to the stage,
   a loader unit configured to feed the processed member to be provided with the separation starting point that allows the separation of one surface layer of the processing member to form the remaining portion;
   a starting point forming unit configured to form the separation starting point by cutting the processed member while leaving part of the processed member;
   a separating unit configured to separate the one surface layer of the processed member to form the remaining portion;
   an attaching unit to which a support is fed and which is configured to attach the support to the remaining portion with an adhesive layer;
   a support feeding unit configured to feed the support; and
   an unloader unit configured to transport a stack including the remaining portion and the support attached to each other with the adhesive layer,
   wherein the starting point forming unit comprises the device for forming the separation starting point,
   wherein the cutter is configured to cut the processed member while leaving the part of the processed member, and
   wherein the moving mechanism relatively moves the cutter along the stage.

4. A stack manufacturing apparatus comprising:
   a device for forming a separation starting point comprising:
      a stage configured to support a processed member to be provided with the separation starting point that allows separation of a surface layer of the processed member to form a remaining portion;
      a cutter that faces the stage;
      a head portion that supports the cutter;
      an arm portion that supports the head portion; and a moving mechanism configured to determine a relative position of the cutter to the stage, a first loader unit configured to feed the processed member provided with the separation starting point that allows separation of one surface layer of the processed member to form a first remaining portion and allows separation of other surface layer which is cut while leaving part of the other surface layer to form a second remaining portion;

a first separating unit configured to separate the one surface layer of the processed member to form the first remaining portion;

a first attaching unit to which a first support is fed and which is configured to attach the first support to the first remaining portion with a first adhesive layer;

a support feeding unit configured to feed the first support and a second support;

a first unloader unit configured to transport a first stack including the first remaining portion and the first support attached to each other with the first adhesive layer;

a second loader unit configured to feed the first stack;

a starting point forming unit configured to form the separation starting point by cutting the first stack while leaving part of the first stack;

a second separating unit configured to separate one surface layer of the first stack to form the second remaining portion;

a second attaching unit to which the second support is fed and which is configured to attach the second support to the second remaining portion with a second adhesive layer;

a second unloader unit configured to transport a second stack including the second remaining portion and the second support attached to each other with the second adhesive layer, wherein the starting point forming unit comprises the device for forming the separation starting point, wherein the cutter is configured to cut the processed member while leaving part of the processed member, and wherein the moving mechanism relatively moves the cutter along the stage.

5. A stack manufacturing apparatus comprising:

a device for forming a separation starting point comprising:
  a stage configured to support a first stack;
  a cutter that faces the stage;
  a first head portion that holds the cutter;
  a first arm portion that holds the first head portion;
  a pressing tool that faces the stage;
  a second head portion that holds the pressing tool;
  a second arm portion that holds the second head portion; and
  a moving mechanism that is configured to determine a relative position of the cutter and a position of the pressing tool to the stage, a first loader unit configured to feed a processed member;

a first separating unit configured to separate one surface layer of the processed member to form a first remaining portion;

a first attaching unit to which a first support is fed and which is configured to attach the first support to the first remaining portion with a first adhesive layer;

a support feeding unit configured to feed the first support and a second support;

a first unloader unit configured to transport the first stack including the first remaining portion and the first support attached to each other with the first adhesive layer;

a second loader unit fed with and configured to feed the first stack;

a starting point forming unit configured to form the separation starting point by cutting the first stack while leaving part of the first stack;

a second separating unit configured to separate one surface layer of the first stack to form a second remaining portion;

a second attaching unit to which the second support is fed and which is configured to attach the second support to the second remaining portion with a second adhesive layer; and a second unloader unit configured to transport a second stack including the second remaining portion and the second support attached to each other with the second adhesive layer, wherein the starting point forming unit comprises the device for forming the separation starting point, wherein the moving mechanism is configured to determine the relative position of the cutter and the cutter is configured to cut the first stack while leaving part of the first stack so that a cut portion is peeled from a remaining part, and wherein the moving mechanism is configured to determine the relative position of the pressing tool so that a vicinity of the cut portion of the first stack is pressed onto the stage.

6. The device for forming the separation starting point according to claim 5, wherein the stage supports the first stack in which a substrate, a separation layer, a layer to be separated, the first support, and a protective film are placed in this order.

* * * * *